(12) United States Patent
Thakkar et al.

(10) Patent No.: US 9,577,845 B2
(45) Date of Patent: Feb. 21, 2017

(54) MULTIPLE ACTIVE L3 GATEWAYS FOR LOGICAL NETWORKS

(71) Applicant: Nicira, Inc., Palo Alto, CA (US)

(72) Inventors: Pankaj Thakkar, Santa Clara, CA (US); Ethan J. Jackson, San Francisco, CA (US); Benjamin C. Basler, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 18 days.

(21) Appl. No.: 14/166,447

(22) Filed: Jan. 28, 2014

(65) Prior Publication Data

US 2015/0063364 A1    Mar. 5, 2015

Related U.S. Application Data

(60) Provisional application No. 61/873,829, filed on Sep. 4, 2013, provisional application No. 61/921,388, filed on Dec. 27, 2013.

(51) Int. Cl.
*H04L 12/66* (2006.01)
*H04L 12/713* (2013.01)
(Continued)

(52) U.S. Cl.
CPC .............. *H04L 12/66* (2013.01); *H04L 45/586* (2013.01); *H04L 45/22* (2013.01); *H04L 45/7453* (2013.01)

(58) Field of Classification Search
CPC ..................................................... H04L 12/66
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| EP | 1653688 | 5/2006 |
| EP | 2849395 | 3/2015 |

(Continued)

OTHER PUBLICATIONS

Portions of prosecution history of EP14182599.2, Mar. 23, 2015 (mailing date), Nicira, Inc.

(Continued)

*Primary Examiner* — Brian D Nguyen
*Assistant Examiner* — Toan Nguyen
(74) *Attorney, Agent, or Firm* — Adeli LLP

(57) ABSTRACT

Some embodiments provide a method for a network controller in a network control system that manages a plurality of logical networks. The method receives a specification of a logical network that comprises a logical router with a logical port that connects to an external network. The method selects several host machines to host a L3 gateway that implements the connection to the external network for the logical router from a set of host machines designated for hosting logical routers. The method generates data tuples for provisioning a set of managed forwarding elements that implement the logical network to send data packets that require processing by the L3 gateway to the selected host machines. The data tuples specify for the managed forwarding elements to distribute the data packets across the selected host machines.

21 Claims, 22 Drawing Sheets

(51) Int. Cl.
*H04L 12/743* (2013.01)
*H04L 12/707* (2013.01)

(56) References Cited

U.S. PATENT DOCUMENTS

| | | | |
|---|---|---|---|
| 5,751,967 A | 5/1998 | Raab et al. | |
| 6,006,275 A | 12/1999 | Picazo, Jr. et al. | |
| 6,104,699 A | 8/2000 | Holender et al. | |
| 6,219,699 B1 | 4/2001 | McCloghrie et al. | |
| 6,359,909 B1 | 3/2002 | Ito et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,941,487 B1 | 9/2005 | Balakrishnan et al. | |
| 6,950,428 B1 | 9/2005 | Horst et al. | |
| 6,963,585 B1 | 11/2005 | Le Pennec et al. | |
| 6,999,454 B1 | 2/2006 | Crump | |
| 7,046,630 B2 | 5/2006 | Abe et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,260,648 B2 | 8/2007 | Tingley et al. | |
| 7,283,473 B2 | 10/2007 | Arndt et al. | |
| 7,342,916 B2 | 3/2008 | Das et al. | |
| 7,391,771 B2 | 6/2008 | Orava et al. | |
| 7,428,220 B1 | 9/2008 | Caronni et al. | |
| 7,450,498 B2 | 11/2008 | Golia et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,483,411 B2 | 1/2009 | Weinstein et al. | |
| 7,519,734 B1 | 4/2009 | Dumitriu et al. | |
| 7,555,002 B2 | 6/2009 | Arndt et al. | |
| 7,606,260 B2 | 10/2009 | Oguchi et al. | |
| 7,643,488 B2 | 1/2010 | Khanna et al. | |
| 7,647,426 B2 | 1/2010 | Patel et al. | |
| 7,649,851 B2 | 1/2010 | Takashige et al. | |
| 7,710,874 B2 | 5/2010 | Balakrishnan et al. | |
| 7,764,599 B2 | 7/2010 | Doi et al. | |
| 7,792,987 B1 | 9/2010 | Vohra et al. | |
| 7,802,000 B1 * | 9/2010 | Huang | G06F 9/5077 455/404.2 |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,166,201 B2 | 4/2012 | Richardson et al. | |
| 8,194,674 B1 | 6/2012 | Pagel et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,239,572 B1 | 8/2012 | Brandwine et al. | |
| 8,259,571 B1 | 9/2012 | Raphel et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,650 B2 | 1/2013 | Foxworthy et al. | |
| 8,351,418 B2 | 1/2013 | Zhao et al. | |
| 8,370,834 B2 | 2/2013 | Edwards et al. | |
| 8,456,984 B2 | 6/2013 | Ranganathan et al. | |
| 8,504,718 B2 | 8/2013 | Wang et al. | |
| 8,565,108 B1 | 10/2013 | Marshall et al. | |
| 8,611,351 B2 | 12/2013 | Gooch et al. | |
| 8,612,627 B1 | 12/2013 | Brandwine | |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,627,313 B2 | 1/2014 | Edwards et al. | |
| 8,644,188 B1 | 2/2014 | Brandwine et al. | |
| 8,660,129 B1 * | 2/2014 | Brendel | H04L 12/4641 370/397 |
| 8,705,513 B2 | 4/2014 | Van Der Merwe et al. | |
| 8,958,298 B2 | 2/2015 | Zhang et al. | |
| 8,997,094 B2 | 3/2015 | Bosch et al. | |
| 9,059,999 B2 | 6/2015 | Koponen et al. | |
| 9,203,703 B2 | 12/2015 | Koponen et al. | |
| 2001/0043614 A1 | 11/2001 | Viswanadham et al. | |
| 2002/0093952 A1 | 7/2002 | Gonda | |
| 2002/0095498 A1 | 7/2002 | Chanda et al. | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2004/0073659 A1 | 4/2004 | Rajsic et al. | |
| 2004/0098505 A1 | 5/2004 | Clemmensen | |
| 2004/0267866 A1 | 12/2004 | Carollo et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0083953 A1 | 4/2005 | May | |
| 2005/0120160 A1 | 6/2005 | Plouffe et al. | |
| 2005/0132044 A1 | 6/2005 | Guingo et al. | |
| 2006/0002370 A1 | 1/2006 | Rabie et al. | |
| 2006/0018253 A1 | 1/2006 | Windisch et al. | |
| 2006/0026225 A1 | 2/2006 | Canali et al. | |
| 2006/0029056 A1 | 2/2006 | Perera et al. | |
| 2006/0056317 A1 | 3/2006 | Manning et al. | |
| 2006/0056412 A1 | 3/2006 | Page | |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0187908 A1 | 8/2006 | Shimozono et al. | |
| 2006/0193266 A1 | 8/2006 | Siddha et al. | |
| 2006/0291388 A1 | 12/2006 | Amdahl et al. | |
| 2007/0043860 A1 | 2/2007 | Pabari | |
| 2007/0064673 A1 | 3/2007 | Bhandaru et al. | |
| 2007/0140128 A1 | 6/2007 | Klinker et al. | |
| 2007/0140235 A1 | 6/2007 | Aysan et al. | |
| 2007/0156919 A1 | 7/2007 | Potti et al. | |
| 2007/0201357 A1 | 8/2007 | Smethurst et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0013474 A1 | 1/2008 | Nagarajan et al. | |
| 2008/0031263 A1 | 2/2008 | Ervin et al. | |
| 2008/0049621 A1 | 2/2008 | McGuire et al. | |
| 2008/0049646 A1 | 2/2008 | Lu | |
| 2008/0059556 A1 | 3/2008 | Greenspan et al. | |
| 2008/0071900 A1 | 3/2008 | Hecker et al. | |
| 2008/0086726 A1 | 4/2008 | Griffith et al. | |
| 2008/0151893 A1 | 6/2008 | Nordmark et al. | |
| 2008/0159301 A1 | 7/2008 | de Heer | |
| 2008/0189769 A1 | 8/2008 | Casado et al. | |
| 2008/0225853 A1 | 9/2008 | Melman et al. | |
| 2008/0240122 A1 | 10/2008 | Richardson et al. | |
| 2008/0253366 A1 | 10/2008 | Zuk et al. | |
| 2008/0291910 A1 | 11/2008 | Tadimeti et al. | |
| 2009/0031041 A1 | 1/2009 | Clemmensen | |
| 2009/0043823 A1 | 2/2009 | Iftode et al. | |
| 2009/0083445 A1 | 3/2009 | Ganga | |
| 2009/0092137 A1 | 4/2009 | Haigh et al. | |
| 2009/0122710 A1 | 5/2009 | Bar-Tor et al. | |
| 2009/0150527 A1 | 6/2009 | Tripathi et al. | |
| 2009/0161547 A1 | 6/2009 | Riddle et al. | |

(56) References Cited

U.S. PATENT DOCUMENTS

| | | |
|---|---|---|
| 2009/0249470 A1 | 10/2009 | Litvin et al. |
| 2009/0249472 A1* | 10/2009 | Litvin ............... H04L 63/0263 726/14 |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1* | 12/2010 | Yevmenkin ....... H04L 29/12405 709/227 |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0102009 A1* | 4/2012 | Peterson ............ G06F 17/30067 707/705 |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0233331 A1 | 9/2012 | Voccio et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0250951 A1* | 9/2013 | Koganti ............... H04L 49/356 370/390 |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0195666 A1 | 7/2014 | Dumitriu et al. |
| 2014/0229945 A1 | 8/2014 | Barkai et al. |
| 2014/0269705 A1 | 9/2014 | DeCusatis et al. |
| 2014/0301391 A1 | 10/2014 | Krishnan et al. |
| 2015/0009831 A1 | 1/2015 | Graf |

FOREIGN PATENT DOCUMENTS

| | | |
|---|---|---|
| JP | 2003-069609 | 3/2003 |
| JP | 2003-124976 | 4/2003 |
| JP | 2003-318949 | 11/2003 |
| WO | WO 2005/112390 | 11/2005 |
| WO | WO 2008/095010 | 8/2008 |

OTHER PUBLICATIONS

Agarwal, Sugam, et al., "Traffic Engineering in Software Defined Networks," 2013 Proceedings IEEE INFOCOM, Apr. 14, 2013, pp. 2211-2219, Bell Labs, Alcatel-Lucent, Holmdel, NJ, USA.

Aggarwal, R., et al., "Data Center Mobility based on E-VPN, BGP/MPLS IP VPN, IP Routing and NHRP; draft-raggarwa-data-center-mobility-05.txt," Jun. 10, 2013, pp. 1-24, Internet Engineering Task Force, IETF, Standardworkingdraft, Internet Society (ISOC) 4, Rue Des Falaises CH-1205 Geneva, Switzerland.

Al-Fares, Mohammad, et al., "A Scalable, Commodity Data Center Network Architecture," Aug. 17-22, 2008, pp. 63-74, Seattle, Washington, USA.

Andersen, David, et al., "Resilient Overlay Networks," Oct. 2001, 15 pages, 18th ACM Symp. on Operating Systems Principles (SOSP), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Anwer, Muhammad Bilal, et al., "Building a Fast, Virtualized Data Plane with Programmable Hardware," Aug. 17, 2009, pp. 1-8, VISA'09, Barcelona, Spain, ACM.

Author Unknown, "Cisco VN-Link: Virtualization-Aware Networking," Month Unknown, 2009, 10 pages, Cisco Systems, Inc.

Author Unknown, "Citrix Launches New XenServer Release as Market Share Growth Continues," Oct. 6, 2010, 3 pages, Citrix Systems, Inc. (http://www.citrix.com/English/ne/news/news.asp?newsID=2304355).

Author Unknown, "HP Web Jetadmin Integration into HP OpenView Network Node Manager," Feb. 2004, pp. 1-12, HP.

Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.

Author Unknown, "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.

Author Unknown, "Open vSwitch, An Open Virtual Switch," Dec. 30, 2010, 2 pages, Cisco Systems, Inc.

Author Unknown, "Single Root I/O Virtualization and Sharing Specification, Revision 1.0," Sep. 11, 2007, pp. 1-84, PCI-SIG.

Author Unknown, "VMware for Linux Networking Support," month unknown, 1999, 5 pp., VMware, Inc.

Author Unknown, "HP OpenView Enterprise Management Starter Solution," Jun. 2006, p. 1-4, Hewlett-Packard Development Company, HP.

Author Unknown, "HP OpenView Operations 8.0 for UNIX Developer's Toolkit," Month Unknown, 2004, pp. 1-4, Hewlett-Packard Development Company, HP.

Author Unknown, "Intel 82599 10 Gigabit Ethernet Controller: Datasheet, Revision: 2.73," Dec. 2011, 930 pages, Intel Corporation.

Author Unknown, "OpenFlow Switch Specification, Version 0.9.0 (Wire Protocol 0x98)," Jul. 20, 2009, pp. 1-36, Open Networking Foundation.

(56) References Cited

OTHER PUBLICATIONS

Author Unknown, OpenFlow Switch Specification, Version 1.0.0 (Wire Protocol 0x01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown, "Virtual Machine Device Queues," White Paper, Month Unknown, 2007, pp. 1-4, Intel Corporation.
Ballani, Hitesh, et al., "Making Routers Last Longer with ViAggre," NSDI'09: 6th USENIX Symposium on Networked Systems Design and Implementation. Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," Roads'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation , Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," month unknown, 2008, pp. 1-6.
Casado, Martin, et al., "SANE: A Protection Architecture for Enterprise Networks," Proceedings of the 15th USENIX Security Symposium, Jul. 31, 2006, pp. 137-151.
Casado, Martin, et al., "Scaling Out: Network Virtualization Revisited," month unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Das, Suarav, et al. "Simple Unified Control for Packet and Circuit Networks," Month Unknown, 2009, pp. 147-148, IEEE.
Das, Suarav, et al., "Unifying Packet and Circuit Switched Networks with OpenFlow," Dec. 7, 2009, 10 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Davoli, Renzo, "VDE: Virtual Distributed Ethernet," Feb. 2005, pp. 1-8, TRIDENTCOM'05, IEEE Computer Society.
Dixon, Colin, et al., "An End to the Middle," Proceedings of the 12th conference on Hot topics in operating systems USENIX Association, May 2009, pp. 105, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Dumitriu, Dan Mihai, et al. (U.S. Appl. No. 61/514,990), filed Aug. 4, 2011.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)-Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Foster, Nate, et al., "Frenetic: A Network Programming Language," ICFP '11, Sep. 19-21, 2011, 13 pages, Tokyo, Japan.

Greenberg, Albert, et al., "A Clean Slate 4D Approach to Network Control and Management," Oct. 2005, 12 pp., vol. 35, No. 5, ACM SIGCOMM Computer Communication Review.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and The Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," Jul. 2008, pp. 105-110, vol. 38, No. 3, ACM SIGCOMM Computer communication Review.
Guo, Chanxiong, et al., "BCube: A High Performance, Server-centric Network Architecture for Modular Data Centers," SIGCOMM'09, Aug. 17-21, 2009, 12 pages, ACM, Barcelona, Spain.
Hamilton, James, et al., "Datacenter Networks are in My Way," Principals of Amazon Series, Oct. 28, 2010, pp. 1-14.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," month unknown, 2010, pp. 1-6.
Kim, Changhoon, et al., "Floodless in SEATTLE: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, pp. 1-34, vol. 18, No. 3.
Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Loo, Boon Thau, et al., "Declarative Routing: Extensible Routing with Declarative Queries," In Proc. of SIGCOMM, Aug. 21-26, 2005, 12 pages, Philadelphia, PA, USA.
Loo, Boon Thau, et al., "Implementing Declarative Overlays," In Proc. of SOSP, Oct. 2005, 16 pages. Brighton, UK.
Luo, Jianying, et al., "Prototyping Fast, Simple, Secure Switches for Ethane," Month Unknown, 2007, pp. 1-6.
Maltz, David A., et al. "Routing Design in Operational Networks: A Look from the Inside," SIGCOMM'04, Aug. 30-Sep. 3, 2004, 14 pages, ACM, Portland, Oregon, USA.
Mann, Vijay, Etal., "Crossroads: Seamless VM Mobility Across Data Centers Through Software Defined Networking," IEEE Network Operations and Management Symposium (NOMS), Apr. 16-20, 2012, pp. 88-96, IEEE, Piscataway, NJ, US.
McKeown, Nick, et al., "OpenFlow: Enabling Innovation in Campus Networks," Mar. 14, 2008, 6 pages.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. of SIGCOMM, Aug. 17-21, 2009, pp. 1-12.
Pelissier, Joe, "Network Interface Virtualization Review," Jan. 2009, pp. 1-38.
Pelissier, Joe, "VNTag 101," May 2008, pp. 1-87.
Pettit, Justin, et al., "Virtual Switching in an Era of Advanced Edges," Sep. 2010, 7 pages.
Pfaff, Ben, et al., "Extending Networking into the Virtualization Layer," Proc. of HotNets, Oct. 2009, pp. 1-6.

(56) References Cited

OTHER PUBLICATIONS

Rosen, E., et al., "Applicability Statement for BGP/MPLS IP Virtual Private Networks (VPNs)," The Internet Society, RFC 4365, Feb. 2006, pp. 1-32.
Shenker, Scott, et al., "The Future of Networking, and the Past of Protocols," Dec. 2, 2011, pp. 1-30, USA.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, OPENFLOW-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," month unknown, 2009, 6 pp., Proceedings of HotNets.
Touch, J., et al., "Transparent Interconnection of Lots of Links (TRILL): Problem and Applicability Statement," May, 2009, pp. 1-17, IETF Trust, RFC 5556.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Turner, Jonathan S., "A Proposed Architecture for the GENI Backbone Platform," ANC'06, Dec. 3-5, 2006, 10 pages, ACM, San Jose, California, USA.
Wang, Anjing, et al., "Network Virtualization: Technologies, Perspectives, and Frontiers," Journal of Lightwave Technology, Feb. 15, 2013, 15 pages, IEEE.
Wang, Wei-Ming, et al., "Analysis and Implementation of an Open Programmable Router Based on Forwarding and Control Element Separation," Journal of Computer Science and Technology, Sep. 2008, pp. 769-779, vol. 23, No. 5.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Yang, L., et al., "Forwarding and Control Element Separation (ForCES) Framework," Apr. 2004, pp. 1-41, The Internet Society RFC(3746).
Yu, Minlan, et al., "Scalable Flow-Based Networking with DIFANE," Aug. 2010, pp. 1-16, In Proceedings of SIGCOMM.
Updated portions of prosecution history of EP14182599.2, Sep. 16, 2015 (mailing date), Nicira, Inc.
Lin, Pingping, et al., "Seamless Interworking of SDN and IP," SIGCOMM '13, Aug. 12-16, 2013, pp. 475-476, ACM, Hong Kong, China.
Mechtri, Marouen, et al., "Inter and Intra Cloud Networking Gateway as a Service," 2013 IEEE 2nd International Conference on Cloud Networking (CloudNet), Nov. 11, 2013, pp. 156-163, IEEE.

* cited by examiner

MULTIPLE ACTIVE L3 GATEWAYS FOR LOGICAL NETWORKS

CLAIM OF BENEFIT TO PRIOR APPLICATION

This application claims the benefit of U.S. Provisional Application 61/873,829, filed Sep. 4, 2013; and U.S. Provisional Application 61/921,388, filed Dec. 27, 2013. U.S. Applications 61/873,829 and 61/921,388 are incorporated herein by reference.

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine.

In virtualized networks, virtual machines on different subnets may need to communicate with each other as well. In this case, tenants may define a network for virtualization that includes both logical switches and logical routers. Methods for implementing the logical routers to adequately serve virtualized networks in datacenters are needed.

BRIEF SUMMARY

Some embodiments provide a network control system that enables the implementation of logical networks which include logical router connections to external physical networks. In some embodiments, these connections to external physical networks are implemented through the use of high-availability gateways. The gateways, in some embodiments, are responsible for both sending data traffic from the managed network (which implements the logical network in a distributed fashion across a set of managed forwarding elements) to the external unmanaged physical network and processing traffic sent from the external unmanaged physical network into the managed network.

The logical router, in some embodiments, connects a set of logical switches, to which virtual machines logically attach. Each logical switch is implemented in the managed network across a set of managed forwarding elements to which the virtual machines physically connect. Different embodiments implement the logical routers in different fashions. In some embodiments, the entire routing table of a logical router is implemented in two or more centralized high-availability gateways. In these centralized embodiments, the managed forwarding elements do not implement the logical router, instead sending any packets that require logical router processing to one of the gateways implementing the logical router. Specifically, in some embodiments, a network controller responsible for managing the logical router designates one of the gateways that implements the logical router as an active (or master) gateway and another gateway (or multiple other gateways) as standby gateways.

In other embodiments, the managed forwarding elements implement the logical router in a distributed manner. That is, the managed forwarding element that first receives a packet from a virtual machine performs logical forwarding of the packet to identify its destination logical port. For traffic from a first virtual machine on a first logical switch to a second virtual machine on a second logical switch, the managed forwarding element to which the first virtual machine connects does not send the traffic to the gateway. However, for traffic sent to an external destination (i.e., not connected to either logical switch), the managed forwarding element sends the packet to one of the gateways on which the logical router is implemented. In such embodiments, only the portion of the routing table required for north-south routing (i.e., packets sent in and out of the managed network) resides on the gateway. As in the centralized embodiments, in some embodiments the network controller responsible for managing the logical router designates one gateway as an active gateway for the logical router and one or more additional gateways as standby gateways.

In either of these situations, the network controller of some embodiments provisions both the active gateway and each standby gateway to be fully functional to perform its required routing for the logical network. When generating flow entries for provisioning the managed forwarding elements that operate on the host machines along with the virtual machines, the network controller generates entries that bundle the tunnels to these gateways together. In some embodiments, the flow entry that instructs the managed forwarding element to send a packet to the gateway over a tunnel provides an ordered list of tunnels. If the first tunnel (to the active gateway) is active, then the managed forwarding element uses this tunnel. If the first tunnel is not active (i.e., keep-alive messages sent over the tunnel have not received responses), then the managed forwarding element uses the second tunnel, and so on if additional tunnels to additional standby gateways are listed in the flow entry.

The above logical router implementations use a single active gateway with one or more standby gateways. Some embodiments utilize a different distributed implementation, in which the network controller provisions multiple active gateways for handling north-south routing. In this case, the flow entries used by the managed forwarding elements to send packets to the gateways do not provide a prioritized list of the gateways. Instead, the flow entries list the gateways without order and specify a function to use in order to determine over which tunnel to send the packet. In some embodiments, this function takes as input various properties as a packet (e.g., the transport layer 5-tuple of IP source and destination address, transport protocol, and source and destination transport layer port numbers). Specifically, some embodiments use a hash function, the result of which determines to which of the multiple gateways to send the packet.

In some embodiments, the gateways on which the logical routers are implemented are host machines in clusters, allocated for hosting logical routers and other services for logical networks (e.g., DHCP service). These gateway machines also include managed forwarding elements, which serve as tunnel endpoints for packets sent to/from the managed forwarding elements on which the VMs reside. These managed forwarding elements on the gateways receive packets and send the packets to the logical routers on the gateways. Some embodiments allow multiple logical routers for multiple different logical networks (e.g., for different tenants) to operate on a single gateway host machine. In some embodiments, the logical routers operate in namespaces, or other containers (e.g., as VMs) with the ability to store a routing table. One or more daemons operating on the gateway (e.g., in the virtualization software of the gateway) receive data tuples that define the routing tables and convert these data tuples into the routing table for a particular logical router, then provision the appropriate namespace with the routing table in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system that enables the implementation of logical networks which include logical router connections to external physical networks. In some embodiments, these connections to external physical networks are implemented through the use of high-availability gateways. The gateways, in some embodiments, are responsible for both sending data traffic from the managed network (which implements the logical network in a distributed fashion across a set of managed forwarding elements) to the external unmanaged physical network and processing traffic sent from the external unmanaged physical network into the managed network.

Figure 1:
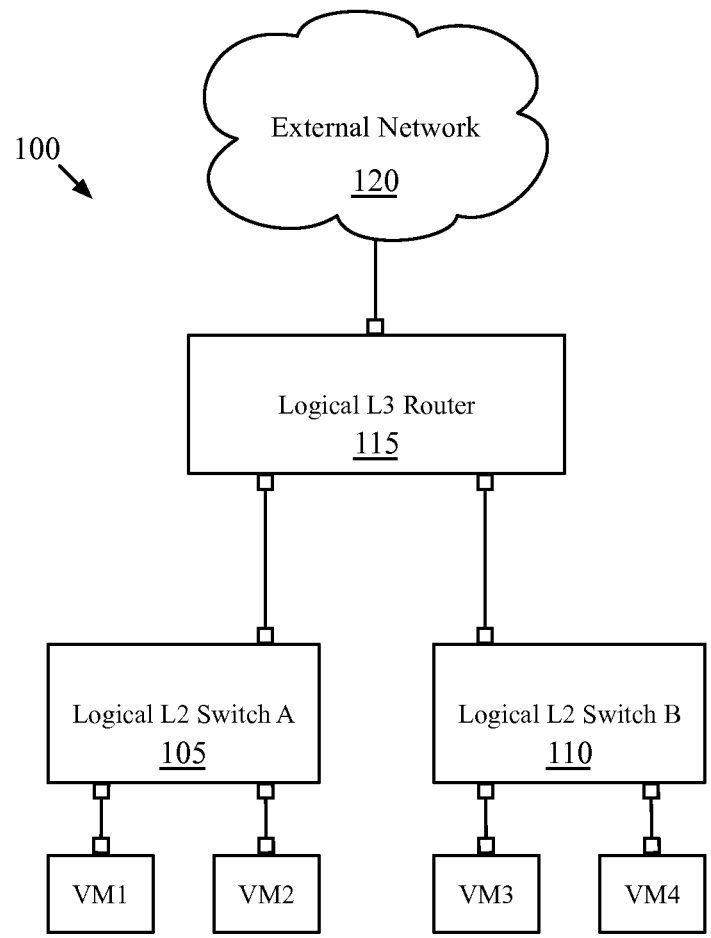
FIG. 1 conceptually illustrates a logical network architecture of some embodiments that includes a logical router.

FIG. 1 conceptually illustrates an example of such a logical network architecture 100. The logical network 100 includes two logical switches 105 and 110 and a logical router 115. Each of the logical switches 105 and 110 connects several virtual machines (in this case, two virtual machines (VMs) are connected by each logical switch, and the logical router 115 connects the two logical switches (i.e., logical layer 2 domains) together. In addition, the logical router connects the logical network to an external network 120. While in this example, the logical router 115 has a single port connecting to the external network, in some embodiments the logical router may have several uplink ports to connect to the external networks.

In some embodiments, the logical network is an abstract conception of a network generated by an administrator, and the logical network is implemented in a virtualized, distributed manner in a managed physical infrastructure (e.g., in a multi-tenant datacenter). That is, the virtual machines that connect to the logical switches may reside on various different host machines within the infrastructure, and physical managed forwarding elements (e.g., software virtual switches) operating on these host machines implement some or all of the logical forwarding elements (logical switches, logical routers, etc.).

Figure 2:
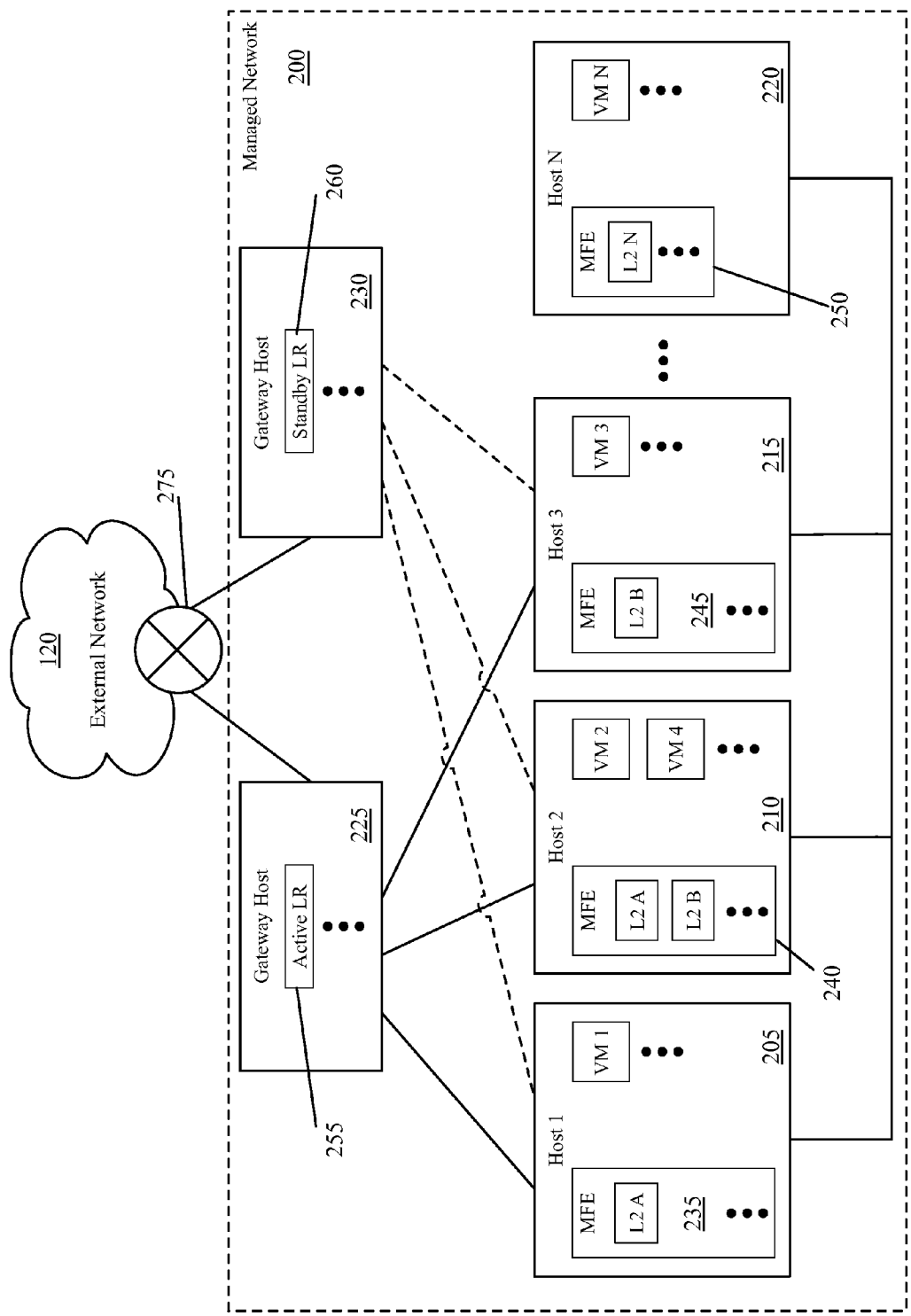
FIG. 2 conceptually illustrates a centralized logical router implementation of the logical network of FIG. 1 in a managed network of some embodiments.
Figure 3:
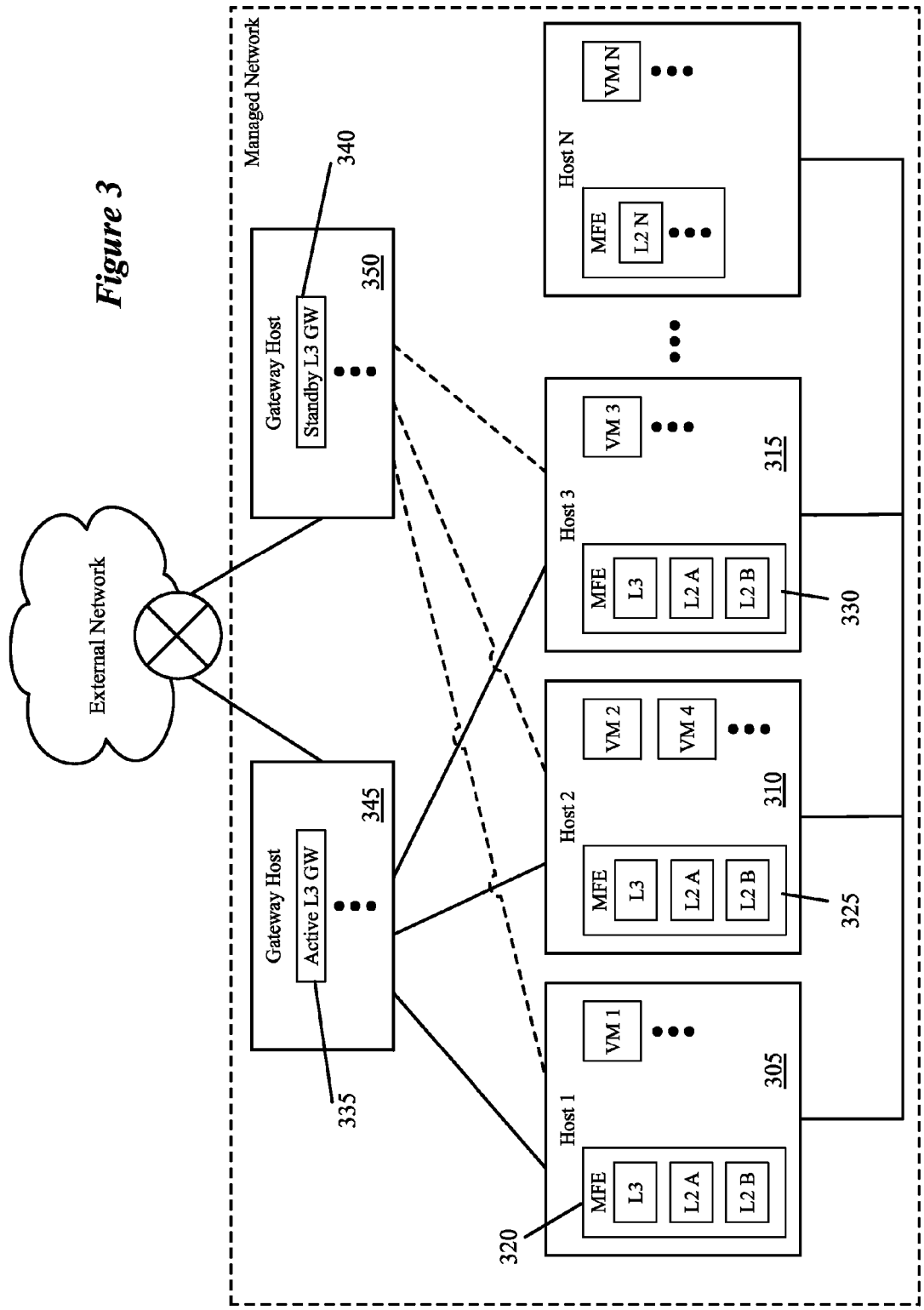
FIG. 3 conceptually illustrates a distributed logical router implementation of the logical network of FIG. 1 with active and standby L3 gateways in a managed network of some embodiments.
Figure 4:
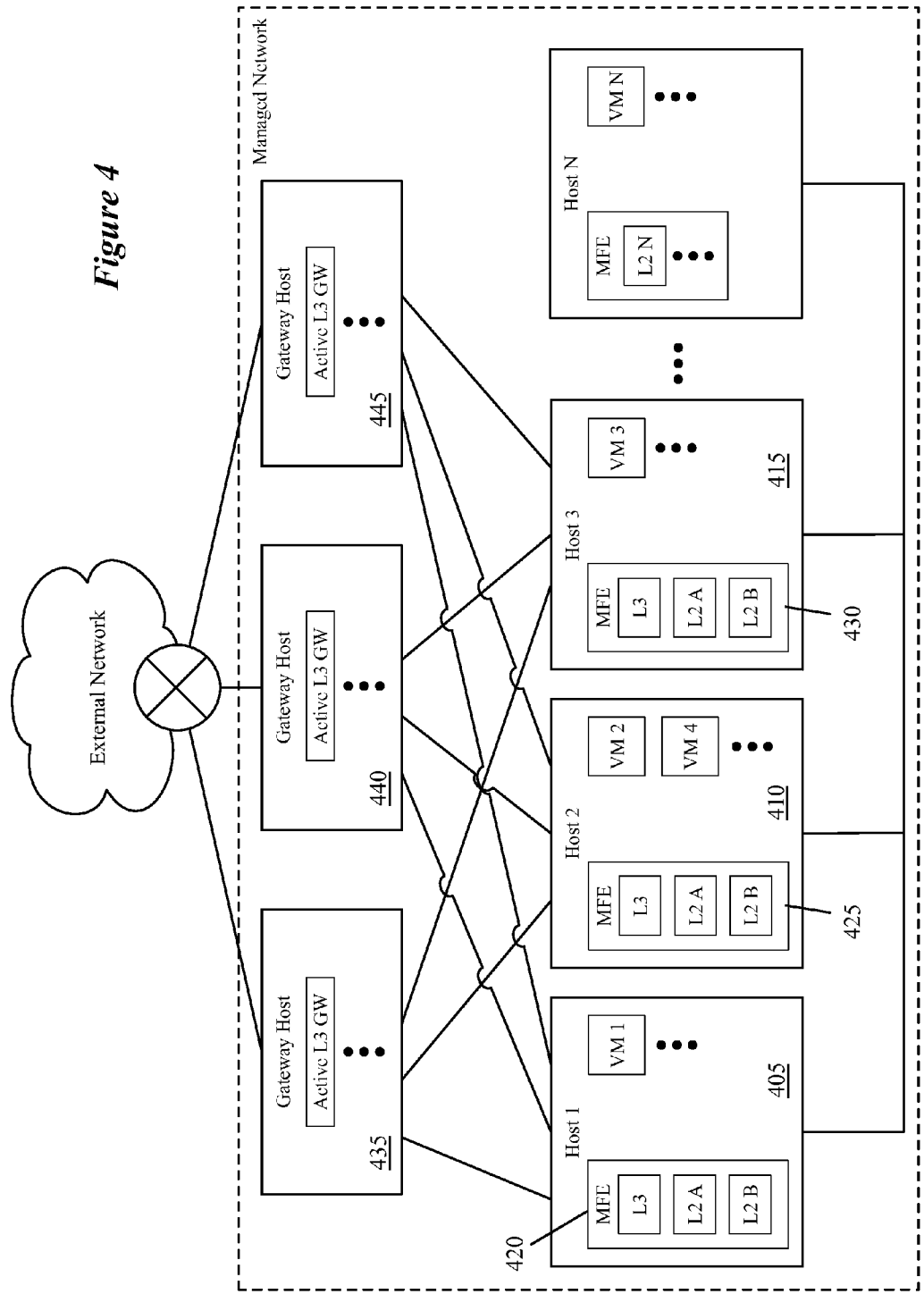
FIG. 4 conceptually illustrates a distributed logical router implementation of the logical network of FIG. 1 with multiple active L3 gateways in a managed network of some embodiments.

FIGS. 2-4 conceptually illustrate three different implementations for the logical network 100, all of which utilize multiple gateway host machines to implement various different portions of the logical router. FIG. 2 illustrates a centralized logical router implementation in a managed network 200 of some embodiments. In this case, two or more gateway host machines (referred to herein as gateways, gateway hosts, or logical router hosts) each implements the entire routing table of the logical router 115. The gateway hosts have connections outside the managed network to at least one physical router 275 that is part of the external network 120.

As shown, the physical infrastructure of the managed network 200 includes four host machines 205-220 for hosting virtual machines, and two gateway host machines 225 and 230. The VMs of the logical network 100 reside on the hosts 205-215, implemented on top of virtualization software (e.g., a hypervisor, virtual machine monitor, etc.) that operates in the host. Additional virtual machines that connect to other logical networks may also reside on some or all of these hosts 205-220 in the physical infrastructure of the managed network.

In addition to the virtual machines, each of the hosts 205-220 operates a managed forwarding element (MFE) 235-250. In some embodiments, this MFE is a virtual switch that operates within the virtualization software of the host (e.g., Open VSwitch, or another software forwarding element). In the implementation illustrated in FIG. 2, the managed forwarding elements in the hosts 205-215 implement the logical switches 105 and 110. As shown, because only VM 1 resides on the first host 205, only the logical switch 105 to which this VM connects is implemented by the MFE 235 (though other logical switches for other logical networks may also be implemented by the MFE). Similarly, the MFE 245 only implements the second logical switch 110, while the MFE 240 implements both logical switches 105 and 110. In other embodiments, each of these MFEs 235-245 implements both logical switches.

In this centralized implementation of the logical network 100, none of the MFEs 235-245 that run in the VM hosts 205-215 implement the logical router 115. Instead, the entire routing table of the logical router resides in the gateway hosts 225. As shown, the first gateway host 225 implements an active logical router 255 and the second gateway host 230 implements a standby logical router 260. In some embodiments, the network controller provisions both of these logical routers 255 and 260 in the same manner, though designating one as active and the other as standby. When one of the MFEs 235-245 determines that a packet sent by one of the VMs for logical network 100 requires logical router processing, the MFE sends the packet out to one of the logical routers 255 or 260. Some embodiments utilize tunnels between the MFEs 235-245 and MFEs located in the gateway hosts 225 and 230 (MFEs in gateway hosts not shown). In some embodiments, the MFEs 235-245 are provisioned such that when a packet is logically forwarded to a logical router, the MFE identifies whether the tunnel to the active router is currently active, and sends the packet via this tunnel if the tunnel is active. Only when the first tunnel is not active will the MFE encapsulate the packet in the second tunnel to the standby logical router implementation.

In some embodiments, the network controller provisions the MFEs 235-245 by generating flow entries, or data tuples that the MFE converts into flow entries. These flow entries specify matching conditions (e.g., physical ingress port, logical ingress port, destination MAC or IP addresses, transport layer 5-tuples, etc.) and actions to take on a packet that matches the conditions (e.g., assign packet to a logical forwarding element, assign a logical egress port, write data to register, encapsulate in a particular tunnel, etc.). In some embodiments, the flow entries for the MFEs 235-245 that specify to encapsulate a packet in a tunnel to a logical router bundle the tunnels to the active and standby gateways together. Specifically, these flow entries provide an ordered list of tunnels. If the first tunnel (to the active gateway 225) is not active (i.e., keep-alive messages sent over the tunnel have not received responses), then the MFE uses the second tunnel to the standby gateway 230. In some embodiments, the network controller may provision multiple standby gateways for a logical router, and the flow entry would specify these multiple backups in a designated order.

In other embodiments, the managed forwarding elements in the VM host machines implement the logical router in a distributed manner, with the logical routers implemented in the gateways functioning to route packets sent to addresses outside the logical network. FIG. 3 conceptually illustrates such a distributed implementation in a managed network 300. In this case, two or more gateway host machines only implement the routing table for packets entering or egressing the managed network, rather than the entire routing table for the logical router 115.

As in the previous figure, the portion of the physical infrastructure of the managed network 300 that implements the logical network 100 includes three host machines 305 for hosting virtual machines and two gateway host machines 345 and 350 that host L3 gateways 335 and 340. In this case, the managed forwarding elements 320-330 that operate on the hosts 305-315 (e.g., within the virtualization software of these hosts) not only implement the logical switches 105 and 110, but also the logical router 115. This enables first-hop logical processing in some embodiments, in which all or most of the logical processing for a packet is performed at the first MFE that receives the packet. Thus, a packet sent from VM 1 to VM 4 would be processed, at the MFE 320, through logical switch 105 to logical router 115 and then to logical switch 110. The MFE 320 would identify the logical egress port of logical switch 110 for the packet as the port to which VM 4 attaches, and map this egress port to a tunnel to the MFE 325 at host 310.

However, for traffic sent to an external destination (i.e., not connected to either logical switch), the MFE identifies a logical egress port of the logical router as the port that connects to the external network. The MFE then sends this traffic to one of the gateways 345 or 350 on which the L3 gateway is implemented (i.e., the north-south routing portion of the routing table, for packet sent into and out of the managed network). As in the centralized embodiments, in some embodiments the network controller responsible for managing the logical router designates one gateway as an active gateway for the L3 gateway and one or more additional gateways as standby gateways. In this case, the host 345 is designated as the active and the host 350 is designated as the standby. In some embodiments, the MFEs 305-310 send packets to the gateways via the same bundling flow entries as described above for the centralized implementation.

Both of the above logical router implementations use a single active gateway with one or more standby gateways. However, some embodiments utilize a different distributed implementation, in which the network controller provisions multiple active gateways for handling north-south routing (i.e., traffic ingressing and egressing the managed network). FIG. 4 conceptually illustrates such an implementation in the managed network 400. As in the previous two examples, the VMs of the logical network 100 are distributed across three host machines 405-415, on which MFEs 420-430 operate.

However, instead of one active L3 gateway operating on one gateway host machine with one (or more) standby L3 gateways, this example includes three active L3 gateway host machines 435-445. Some logical networks may utilize more or fewer active L3 gateways than the illustrated three (e.g., based on an administrator determination). In this case, the MFEs 420-430 operate in nearly the same manner as those in FIG. 3 when processing packets for the logical network 100. For packets between VMs, the operation is the same. For packets sent to the external network, the operation is the same up until the MFE encapsulates a packet in a tunnel.

As shown in this figure, all of the tunnels between the VM hosts 420-430 and the gateway hosts 435-445 are illustrated as solid lines, as compared to the dashed lines for the backup tunnels in the previous figures. Rather than having flow entries that specify a prioritized list of two or more tunnel encapsulations, the corresponding tunneling flow entries list the gateways (or the encapsulations to the gateways) without a specific order, and specify a function to use in order to determine over which tunnel to send the packet. In some embodiments, this function takes as input various properties as a packet (e.g., the transport layer 5-tuple of IP source and destination address, transport protocol, and source and destination transport layer port numbers). Specifically, some embodiments use a hash function, the result of which determines to which of the multiple gateways to send the packet.

In some embodiments, the gateways (e.g., gateways 225 and 230, 435-445, etc.) are host machines in clusters, and are specifically allocated for hosting logical routers and other services for logical networks (e.g., DHCP service). These gateway machines also include their own MFEs in some embodiments, which serve as tunnel endpoints for packets sent to/from the MFEs on which the VMs reside. These MFEs on the gateways receive packets and send the packets to the logical routers implemented on the gateways. Some embodiments allow multiple logical routers for multiple different logical networks (e.g., for different tenants) to operate on a single gateway host machine. In some embodiments, the logical routers operate in namespaces, or other containers (e.g., as VMs) with the ability to store a routing table. One or more daemons operating on the gateway (e.g., in the virtualization software of the gateway) receive data tuples that define the routing tables and convert these data tuples into the routing table for a particular logical router, then provision the appropriate namespace with the routing table in some embodiments.

The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

The above description introduces the different physical implementations of logical networks of some embodiments. Several more detailed embodiments are described below. First, Section I describes the provisioning of logical routers on gateways by the network control system of some embodiments. Section II then describes both centralized and distributed logical router implementations that use an active-standby configuration. Next, Section III describes a distributed logical router implementation that uses multiple active L3 gateways. Section IV describes the software architecture of the gateway host machines that implement the logical routers and L3 gateways. Finally, Section V describes an electronic system with which some embodiments of the invention are implemented.

I. Provisioning Gateways by Network Controllers

As mentioned, in some embodiments a network control system sets up and configures the logical routers in one or more gateways for a logical network. One or more network controllers in the network control system receive the network configuration input by an administrator and convert this information into data tuples that can be read by the gateway host machines, in addition to selecting the one or more gateway host machines to use for the logical routers. The network control system also distributes the data tuples to these host machines.

Figure 5:
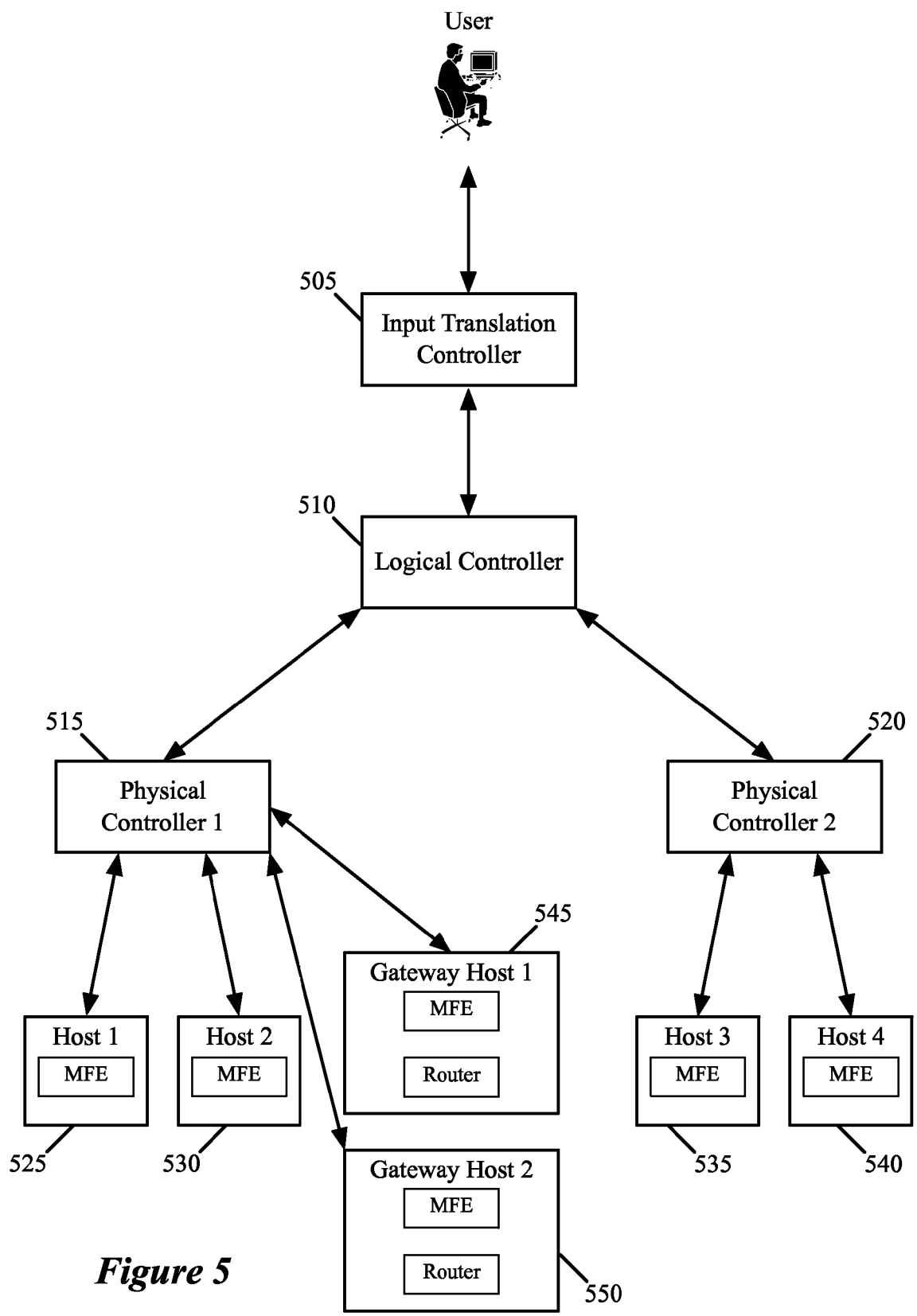
FIG. 5 conceptually illustrates a network control system of some embodiments for provisioning managed forwarding elements and gateway logical routers in order to implement logical networks.

FIG. 5 conceptually illustrates such a network control system 500 of some embodiments for provisioning managed forwarding elements and gateway logical routers (whether these gateways implement an entire logical router routing table or only the network ingress/egress portion of the routing table) in order to implement logical networks. As shown, the network control system 500 includes an input translation controller 505, a logical controller 510, physical controllers 515 and 520, host machines 525-540, and two gateway host machines 545 and 550. As shown, the hosts 525-540, as well as the gateway hosts 545 and 550, include managed forwarding elements, which may implement logical forwarding elements as shown in the above figures. The gateway hosts 545 and 550 also each include logical routers, which may be full implementations of logical routers or only the L3 gateways for ingress and egress of the managed network, in different embodiments. One of ordinary skill in the art will recognize that many other different combinations of the various controllers and hosts are possible for the network control system 500.

In some embodiments, each of the controllers in a network control system is a computer (e.g., with an x86-based processor) with the capability to function as an input translation controller, logical controller, and/or physical controller. Alternatively, in some embodiments a given controller may only have the functionality to operate as a particular one of the types of controller (e.g., as a physical controller). In addition, different combinations of controllers may run in the same physical machine. For instance, the input translation controller 505 and the logical controller 510 may run in the same computing device, with which a data center management application interacts (or with which an administrator interacts directly).

The input translation controller 505 of some embodiments includes an input translation application that translates network configuration information received from a user. While shown as receiving the information directly from the user in FIG. 5, in some embodiments a user interacts with a data center management application, which in turn passes the network configuration information to the input translation controller.

For example, a user may specify a network topology such as that shown in FIG. 1. For each of the logical switches, the user specifies the machines that connect to the logical switch (i.e., to which logical ports of the logical switch the VMs are assigned). The user may also specify which logical switches attach to any logical routers, a logical port of the logical router for connection to external networks, and any configuration details for the logical router. The input translation controller 505 translates the received network topology into logical control plane data that describes the network topology as a set of data tuples in some embodiments. For example, an entry might state that a particular MAC address A is located at a first logical port X of a particular logical switch, that a logical router Q is located at a second logical port Y of the particular logical switch, or that a logical port G of the logical router Q is a gateway port to an external network.

In some embodiments, each logical network is governed by a particular logical controller (e.g., logical controller 510). The logical controller 510 of some embodiments translates the logical control plane data that defines the logical network and the logical forwarding elements (e.g., logical routers, logical switches) that make up the logical network into logical forwarding plane data, and the logical forwarding plane data into physical control plane data. The logical forwarding plane data, in some embodiments, consists of flow entries described at a logical level. For the MAC address A at logical port X, logical forwarding plane data might include a flow entry specifying that if the destination of a packet matches MAC A, to forward the packet to port X. The port of the logical router Q will also have a MAC address, and similar flow entries are created for forwarding packets with this MAC address to port Y of the logical switch.

In some embodiments, the logical controller translates the logical forwarding plane data into universal physical control plane data. The universal physical control plane data enables the network control system of some embodiments to scale even when the network includes a large number of managed forwarding elements (e.g., thousands) to implement a logical forwarding element, and when the network implements a large number of logical networks. The universal physical control plane abstracts common characteristics of different MFEs in order to express physical control plane data without considering differences in the MFEs and/or location specifics of the MFEs.

As stated, the logical controller 510 of some embodiments translates logical control plane data into logical forwarding plane data (e.g., logical flow entries that include a match over logical network parameters, such as logical addresses, logical ingress ports, etc.), then translates the logical forwarding plane data into universal physical control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., nLog tables), and the controller applications use a table mapping engine (e.g., an nLog engine) to translate between the planes (e.g., by applying join operations on the tables). The input and output tables, in some embodiments, store sets of data tuples that define the different planes of data.

Each of the physical controllers 515 and 520 is a master of one or more managed forwarding elements (e.g., located within host machines). In this example, each of the two physical controllers is a master of two managed forwarding elements located at the VM host machines 525-540. Furthermore, the physical controller 515 is a master of two gateway hosts 545 and 550, which host MFEs as well as the active and standby logical routers for a particular logical network. In some embodiments, the active and standby hosts for a logical router are managed by the same physical controller (as in this figure), while in other embodiments separate physical controllers manage the different gateway hosts of a logical network.

In some embodiments, a physical controller receives the universal physical control plane data for a logical network and translates this data into customized physical control plane data for the particular MFEs that the physical controller manages and which require data for the particular logical network. In other embodiments, the physical controller passes the appropriate universal physical control plane data to the MFEs, which have the ability (e.g., in the form of a chassis controller running on the host machine) to perform this conversion themselves.

The universal physical control plane to customized physical control plane translation involves a customization of various data in the flow entries. For the example noted above, the universal physical control plane would involve several flow entries (i.e., several data tuples). The first entry states that if a packet matches the particular logical data path set (e.g., based on the packet being received at a particular physical ingress port), and the destination address matches MAC A, then forward the packet to logical port X. This entry will be the same in the universal and customized physical control planes, in some embodiments. Additional entries are generated to match a physical ingress port (e.g., a virtual interface of the host machine) to the logical ingress port X (for packets received from the VM having MAC A), as well as to match a destination logical port X to the physical egress port of the physical MFE (e.g., again the virtual interface of the host machine). However, these physical ingress and egress ports are specific to the host machine on which the MFE operates. As such, the universal physical control plane entries include abstract physical ports while the customized physical control plane entries include the actual physical interfaces (which, in many cases are virtual interfaces) of the specific MFEs.

In some embodiments, as shown, the logical router hosts also operate managed forwarding elements (e.g., using the same packet processing/virtual switching software as the VM hosts 525). These MFEs also receive physical control plane data from the physical controller that enables the MFEs to implement the logical forwarding elements. In addition, some embodiments distribute the routing table data to the logical routers operating in the gateway hosts through the hierarchical network control system. The logical controller 510 that manages the logical network selects the active and standby hosts (or several active hosts, depending on the implementation) for the logical router (e.g., using a load balancing algorithm that spreads the logical routers for various logical networks across a set of hosts).

The logical controller identifies the physical controller(s) that manages each of these selected gateway hosts, and distributes the routing table to the identified physical controllers. In some embodiments, the routing table is distributed as a set of data tuples. The physical controllers then distribute these data tuples to the gateway hosts. Both the active and standby hosts (or multiple active hosts) receive the same routing table for the logical router, in some embodiments. As described in detail below, the gateway hosts convert these data tuples into a routing table for use by a container (e.g., a VM, a namespace) that operates on the gateway host as a logical router.

Figure 6:
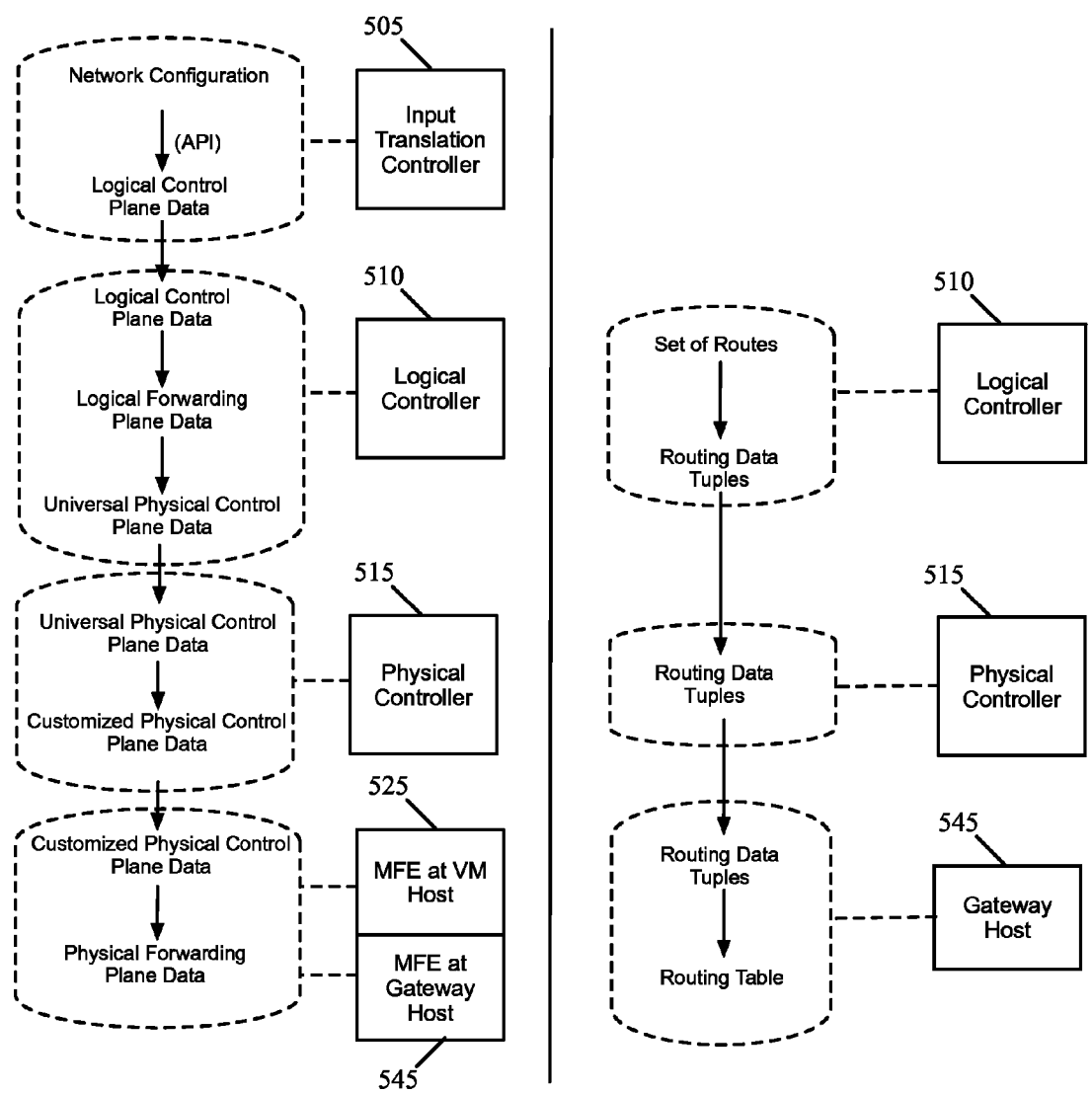
FIG. 6 conceptually illustrates the propagation of data through the hierarchical network control system of some embodiments.

The above describes the hierarchical network control system of some embodiments, although the network control system of other embodiments includes only a single controller (or a controller cluster with one active and one or more standby controllers). FIG. 6 conceptually illustrates the propagation of data through the hierarchical network control system of some embodiments. The left side of this figure shows the data flow to the managed forwarding elements to implement the logical forwarding elements (either the logical switches, or the logical switches and logical routers) of the logical network, while the right side of the figure shows the propagation of routing table data to the gateway hosts in order to provision the logical routers (either the entire logical router or only the gateway logical router functionality).

On the left side, the input translation controller 505 receives a network configuration through an API, which is converted into logical control plane data. This network configuration data includes a logical topology such as that shown in FIG. 1. The network configuration specifies attachments of logical switches to logical service nodes in some embodiments, with MAC addresses assigned to each logical router port that connects to a logical switch, and each logical switch having an associated IP subnet.

As shown, the logical control plane data is converted by the logical controller 510 (specifically, by a control application of the logical controller) to logical forwarding plane data, and then subsequently (by a virtualization application of the logical controller) to universal physical control plane data. In some embodiments, these conversions generate a flow entry at the logical forwarding plane (or a data tuple that defines a flow entry), then add a match over the logical data path set (e.g., the logical switch or router) at the universal physical control plane. The universal physical control plane also includes additional flow entries (or data tuples) for mapping generic physical ingress ports (i.e., a generic abstraction of a port not specific to any particular MFE) to logical ingress ports as well as for mapping logical egress ports to generic physical egress ports. For instance, for the mapping to a logical router port, the flow entries at the universal physical control plane for a logical switch would include a forwarding decision to send a packet to the logical port to which the logical router connects when the destination MAC address matches that of the logical router port. In addition, for the centralized logical router, the universal physical control plane entries would include a mapping of the logical port to a generic physical port of a host machine that connects to the gateway host on which the logical router resides, and generic tunneling entries for encapsulating the packet in a tunnel bundle to the gateway hosts (e.g., listing the gateway host with the active logical router first and the gateway host with the standby logical router second).

The physical controller 515 (one of the several physical controllers in the hierarchical network control system 500), as show, translates the universal physical control plane data into customized physical control plane data for the particular MFEs that it manages at hosts 525, 530, #8045, and 550. This conversion involves substituting specific data (e.g., specific physical ports) for the generic abstractions in the universal physical control plane data. For instance, in the example of the above paragraph, the port integration entries are configured to specify the physical layer port appropriate for the particular logical router connection (e.g., an actual physical port of the particular host machine on which the MFE operates).

The MFE at host 525 (one of several MFEs managed by the physical controller 515) performs a translation of the customized physical control plane data into physical forwarding plane data, in some embodiments. The physical forwarding plane data, in some embodiments, are the flow entries stored within a MFE (e.g., within a software virtual switch such as Open VSwitch) against which the MFE actually matches received packets. In addition, the MFEs at both of the gateway hosts 545 and 550 perform such a translation in order to forward packets between the logical routers and the other network entities (e.g., VMs).

The right side of FIG. 6 illustrates data propagated to the gateway hosts (e.g., host 545) to implement a logical router (either a centralized logical router or a L3 gateway for a distributed logical router), rather than to the MFEs. As shown, the logical controller 510 receives a set of routes, and generates a set of routing data tuples from these routes.

In some embodiments, the set of routes is generated by either the logical controller or the input translation controller from the network configuration input by the user (e.g., the administrator). When a user designs the logical network (such as network 100), each logical switch has an associated IP subnet. From this, the logical controller automatically generates routes to each of these logical router ports that attach to the logical switches (e.g., if IP=10.1.1/24, send to Port J). In addition, when the logical router includes a gateway port to external networks the logical controller of some embodiments generates a low priority default route to send packets that do not match any other routes to the external network. In addition, the logical controller may have data in some embodiments that identifies a physical router in the external network, so that the default route sends packets to the identified router.

In the centralized logical router implementation of some embodiments, all of the routes are converted into routing data tuples at the logical controller. This may be performed by the table mapping engine in some embodiments, or by a separate route processor in other embodiments that traverse a set of routes with priorities to generate a routing table. In the distributed implementation, much of the routing table is implemented within the logical forwarding plane data and converted into physical control plane data (as shown on the left side of FIG. 6). In this case, the routing data tuples for distribution to the L3 gateways will still include the routes to the external physical router(s), as well as routes for processing incoming packets received via the connection with these external routers.

In addition to the routes themselves, the logical controller 510 also generates a set of data tuples that defines the logical routers. For instance, when a logical router is created, the logical controller of some embodiments selects an active gateway host and at least one standby gateway host (or multiple active gateway hosts), then creates a new data tuple (i.e., a record) that specifies the new namespace (or other container) on the host for the logical router. In addition, some embodiments specify in the data tuple that routing is enabled for the namespace (as opposed to, or in addition to, other services such as DHCP).

Once the logical controller 510 creates the data tuples and identifies the gateway hosts that will receive the data tuples, the logical controller then identifies the physical controller or controllers that manage the gateway hosts. As mentioned, like the VM hosts 525-540, each of the gateway hosts has an assigned master physical controller. In the example of FIG.

5, both of the gateway hosts are managed by the physical controller 515, so the other physical controller 520 does not receive the logical router data tuples.

In order to supply the logical router configuration data to the gateway hosts, the logical controller 510 of some embodiments pushes the data to the physical controller 515. In other embodiments, the physical controllers request the configuration data (e.g., in response to a signal that the configuration data is available) from the logical controller.

The physical controller 515 passes the data to the gateway hosts, including 545, much as they pass the physical control plane data. In some embodiments, the routing data tuples are sent to a database running on the host that is part of the software associated with the MFE, and used to configure certain aspects of the MFE (e.g., its port information and other non-flow entry configuration data). The namespace or other container implementing the logical router retrieves the appropriate information from the database, or has the appropriate information passed to it.

In some embodiments, a process on the gateway host 545 translates the data tuples stored in the database into a routing table (e.g., a standard Linux routing table) for the namespace. This process is described in further detail below in Section IV.

The above description describes the conversion, by the network control system, of the network configuration into a set of physical forwarding plane flow entries that the physical controller passes to the host (e.g., via a protocol such as OpenFlow). In other embodiments, however, the data for defining flow entries is passed in other forms, such as more abstract data tuples, and the MFEs or processes running on the hosts with the MFEs convert these data tuples into flow entries for use in processing data traffic.

II. Active-Standby Gateway Setup

As described above, different embodiments use different implementations for logical routers. Some embodiments centralize the logical router, such that the namespace operating on the gateway performs all routing for the logical network, irrespective of whether a packet travels between two VMs or between a VM in the logical network and an external source/destination. Other embodiments distribute the logical router into the MFEs to which the VMs directly connect, such that the logical switch and logical router pipelines are performed by the first-hop MFEs. Nevertheless, for data traffic between VMs operating in the managed network and external packet source/destinations, the logical router is implemented in part within an L3 gateway, in a similar fashion to the centralized case (though without as much of the routing table).

In both of these implementations, some embodiments implement the logical router or L3 gateway in an active-standby fashion. That is, the network control system implements each logical router on two gateway host machines, designating one of these gateways as active and the other as standby. Some embodiments implement the logical router or L3 gateway as fully functional on both of the gateways, and implement the active/standby designation through the flow entries that are used to send packets to the gateways from the MFEs located at the hosts with the VMs.

A. Provisioning by Network Control System

Figure 7:
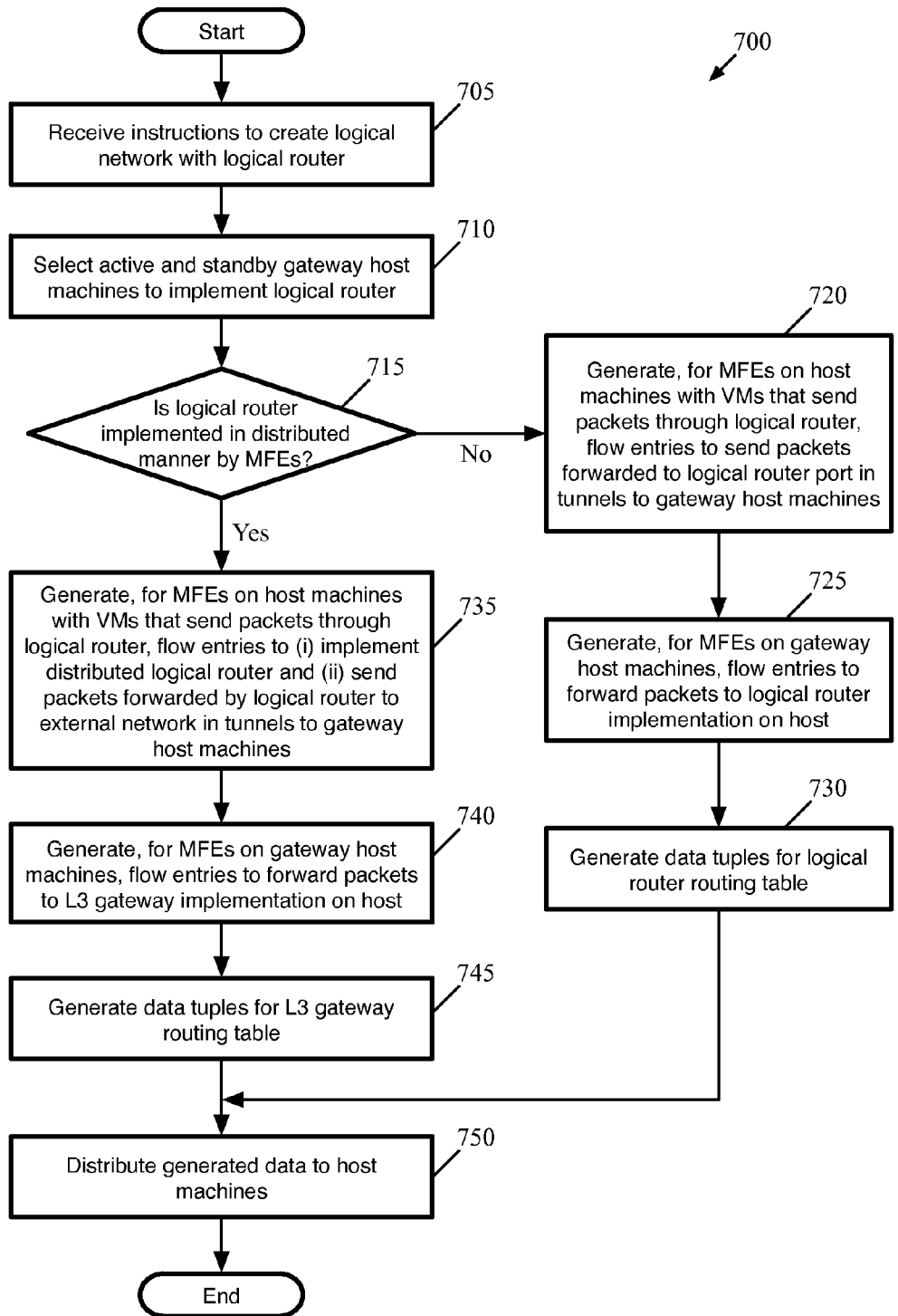
FIG. 7 conceptually illustrates a process of some embodiments for implementing a logical router in a managed network.

FIG. 7 conceptually illustrates a process 700 of some embodiments for implementing a logical router in a managed network. In some embodiments, the process 700 is performed by a network controller (e.g., by a logical controller) upon receiving a network configuration that includes a logical router. As shown, the process 700 begins by receiving (at 705) instructions to create a logical network with a logical router. As mentioned, these instructions may be the result of a network administrator designing a logical network (e.g., through a cloud management application) that passes the logical network configuration through controller APIs.

Next, the process selects (at 710) active and standby gateways on which to implement the logical router. In some embodiments, the managed network physical infrastructure includes one or more clusters of gateway host machines on which the logical routers may be implemented, and from which the network controller selects an active and a standby machine. In some embodiments, part of selecting the gateways for the active and standby logical routers involves the controller generating data tuples that define the containers for these logical routers on the gateways and activate routing on these containers.

Different embodiments perform this selection of the active and standby gateway hosts differently. Some embodiments allow the administrator to influence the selection process in different ways. For instance, in some embodiments the administrator can request specific gateway hosts upon which to implement the logical router, which removes most of the selection functionality from the network controller. In other embodiments, the administrator identifies a first cluster of gateways for the active logical router implementation and a second cluster of gateways for the standby logical router implementation (or just identifies two clusters, and the network controller selects which cluster will have the active and which will have the standby).

With a cluster of gateways selected for a logical router implementation (either active or standby), some embodiments select the particular gateway in the cluster by using a hash function of a property of the logical router (e.g., a logical router UUID assigned by the controller), modulo the number of gateway hosts in the cluster. This assigns the logical routers to gateways within a cluster effectively at random (even if the algorithm itself is not randomized), and therefore will load balance the logical routers across the gateway hosts over the long run. Other embodiments may use other methods to load balance the logical routers across gateways in a cluster. For instance, rather than using the hash algorithm to choose between all gateways in a cluster, some embodiments choose between only those gateways with the fewest number of logical routers currently operating, and modulo the result of the hash function by this smaller number of gateways. Other embodiments analyze the number of logical routers on each gateway and the operational load of the gateways (e.g., based on number of packets processed over a particular timeframe) in order to determine to which gateway host a particular logical router should be assigned.

Figure 8:
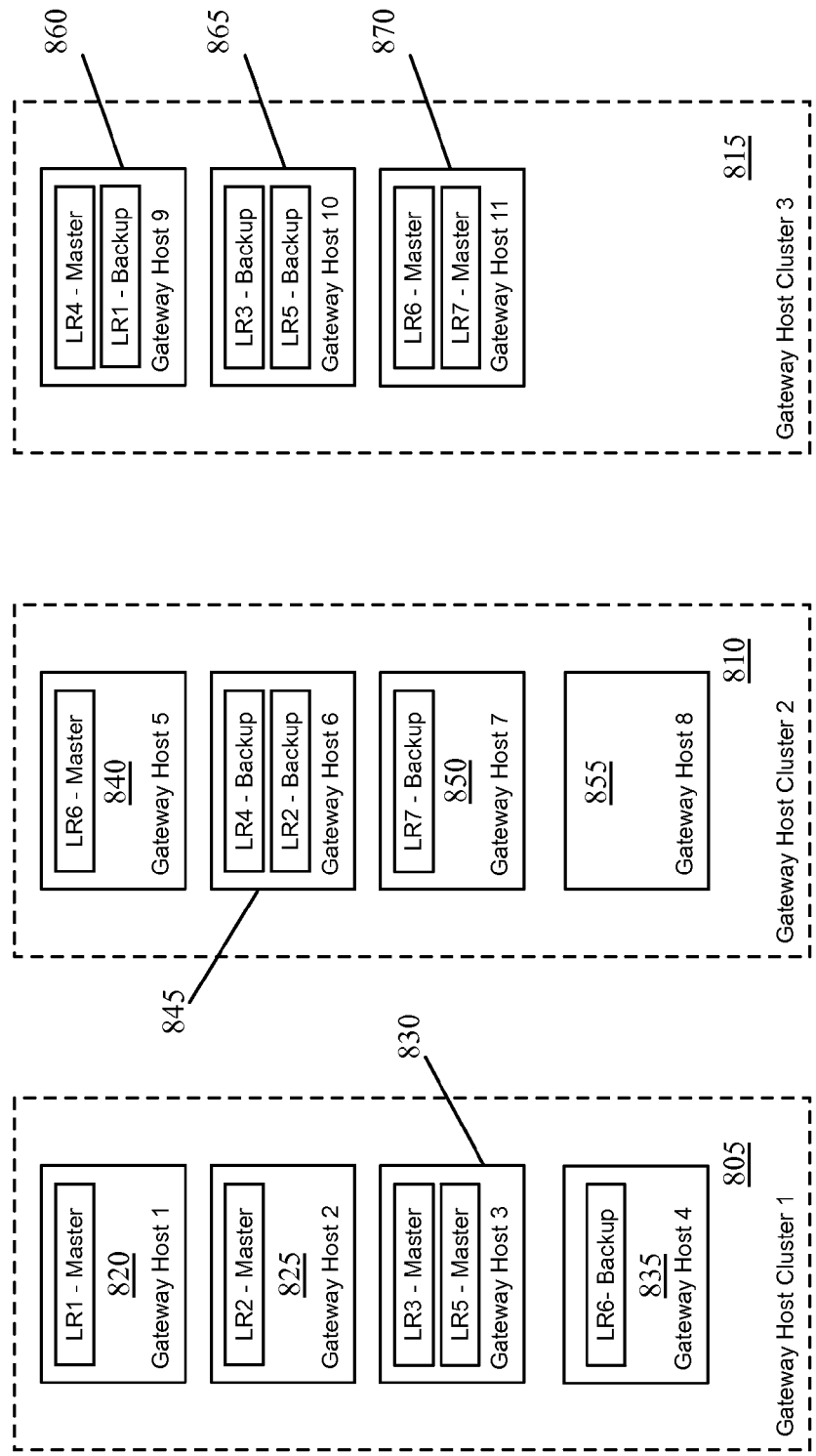
FIG. 8 conceptually illustrates three separate clusters of gateway hosts, and the logical routers implemented on those gateway hosts.

FIG. 8 conceptually illustrates three separate clusters 805-815 of gateway hosts, and the logical routers implemented on those gateway hosts. Specifically, the first cluster 805 includes four gateways 820-835, the second cluster 810 includes four gateways 840-855, and the third cluster 815 includes three gateways 860-870. In this example, each of seven different logical routers are implemented across the clusters 805-815. Each logical router (which may be a centralized logical router or just a L3 gateway for a distributed logical router) has one implementation in a first one of the clusters and a second implementation in a second one of the clusters. For instance, the logical router LR1 has a master implementation in the first gateway 820 of the first cluster 805 and a backup implementation in the gateway 860 of the cluster 815. The logical router LR2 has a master implementation in the gateway 825 of the first cluster 805 and a backup implementation in the gateway 845 of the second cluster 810.

In this example, no explicit load balancing is used to assign the logical routers to the gateways within a cluster, and therefore in the second cluster 810, the fourth gateway 855 has no logical routers, even though the second gateway 845 implements two logical routers. In addition, not all of the cluster have the same number of gateways. This may be due to the cluster simply having a different number of physical machines, or the third cluster 815 having a gateway offline due to connection or other problems. In some embodiments, when an application running on a gateway identifies a problem with the gateway, the application notifies a network controller (e.g., the physical controller that manages the gateway machine) of the issue so that the gateway can be taken out of use until the issue is resolved.

In the above example, each of the logical routers is implemented in two different clusters. This provides the benefit that if one of the clusters goes down completely, each of these logical routers will still be up and running. However, there may be advantages to assigning both the master and backup implementations of a particular logical router to the same cluster (though not the same gateway). For instance, if all of the VMs for the logical network to which a logical router belongs are located in the same rack or zone of a datacenter, then implementing the logical router in a cluster of gateways located in that rack or zone will improve latency. As simply hashing the logical router UUID would result in assigning the master and backup implementations to the same gateway, different embodiments utilize different techniques to assign a logical router to multiple gateways in the same cluster. Some embodiments assign the master to a first gateway by using the UUID hash modulo the number of available gateways, then assign the backup to a second gateway by removing the first gateway from the pool of available gateways and using the same algorithm, as the hash will now be modulo a smaller number of gateways. Other embodiments use various load balancing techniques, such as ensuring the same number of logical routers are implemented on each gateway host in the cluster, or evaluating the load (e.g., based on number of packets processed) on each gateway. Some embodiments attempt to have an equal number of master and backup logical routers on a given gateway host, so as to minimize the number of master logical routers on any one machine in case of a failure and subsequent failover to the backups. In addition, the master logical router implementation receives substantially more traffic than the backups, and therefore require more resources.

Figure 9:
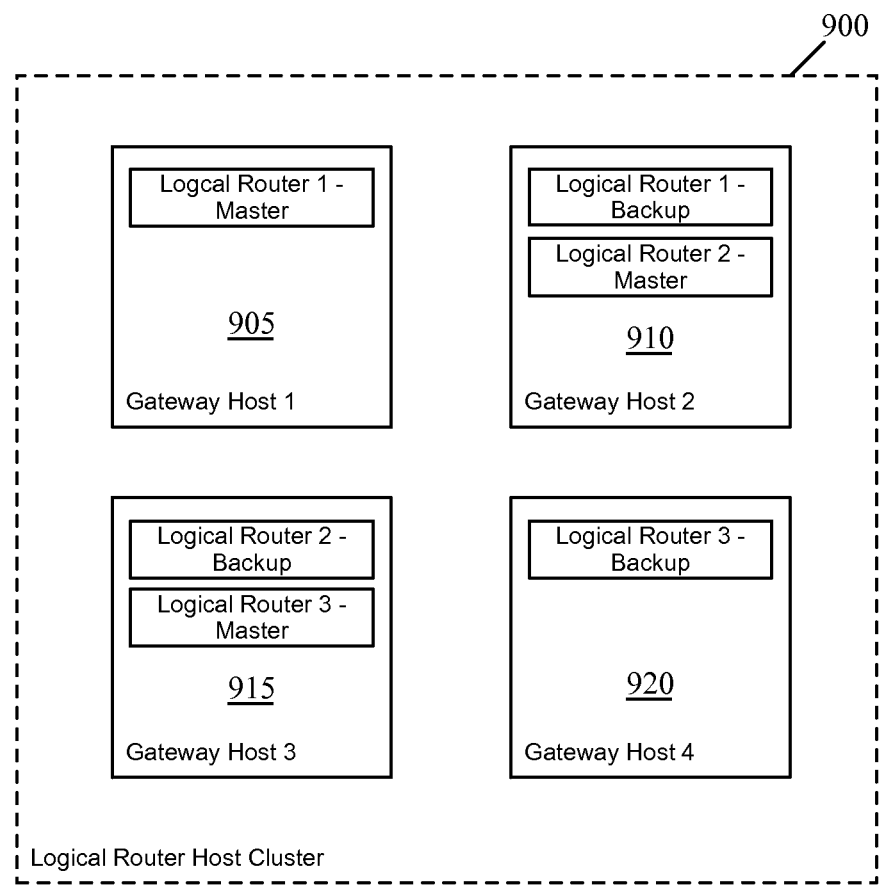
FIG. 9 conceptually illustrates a gateway host cluster that includes four gateway host machines.

FIG. 9 conceptually illustrates a gateway host cluster 900 that includes four gateway host machines 905-920. As shown, three logical routers have been created on this cluster, with two instances (one master and one backup) for each. The first host 905 hosts the master for logical router 1, the second host 910 hosts the backup for logical router 1 and the master for logical router 2, the third host 915 hosts the backup for logical router 2 and the master for logical router 3, and the fourth host 920 hosts the backup for logical router 3. If the controller cluster that manages this service host cluster 900 receives instructions to create a new logical service node, some embodiments would place the master for this new logical router 4 on the host machine 920 and the backup on host 905. However, if logical router 1 was especially computationally intensive (e.g., because it provides logical routing for numerous logical switches with many connected VMs), while logical router 2 and logical router 3 serve fewer VMs and are not as computationally intensive, some embodiments would locate the backup for the new logical router 4 on, e.g., host 915.

Returning to FIG. 7, after selecting the gateways for the active and standby logical routers, the process 700 determines (at 715) whether the logical router will be implemented in a distributed manner by the managed forwarding elements that implement the logical switches of the network. When the logical router is distributed, more of the network controller operations result in flow entries for the MFEs located at the host machines with the VMs, whereas for centralized logical routers the generation of the routing table data for the gateways may be more involved and will produce more data. This routing table data for the gateways uses a different data format than the flow entries for the MFEs in some embodiments.

When the logical router is designated for centralized implementation, the process generates (at 720) flow entries (or data tuples defining flow entries) for MFEs on host machines that send packets through the logical router (i.e., machines hosting VMs attached to logical switches that attach to the logical router). These flow entries generated at 720 for the centralized implementation specify to send packets, that have been forwarded to the logical router port of a logical switch, to the selected gateway host machines through tunnels. The flow entries generated for these hosts will also include numerous other entries, such as those implementing the logical forwarding for the logical switches, the ingress and egress ACLs, etc.

In some embodiments, in order to specify for the MFEs to send the packets to the gateway host machines, some embodiments generate flow entries that specify a list of tunnels in priority order. The first tunnel encapsulation for the MFE to use is the encapsulation for the tunnel to the selected active gateway host machine. If this tunnel is unavailable, then the flow entry specifies a second encapsulation for the tunnel to the selected standby gateway host machine. In some embodiments, the MFEs regularly (e.g., every 500 ms, every 3 seconds, every 30 seconds, every 2 minutes, etc.) send out keep-alive messages through the tunnel to the active gateway. So long as responses are received from the active gateway, all packets forwarded to the logical router port will be encapsulated in the tunnel to the active gateway, rather than one of the standbys. Only if the keep-alive messages are not returned will the MFE use the second tunnel encapsulation listed in the flow entry, to the standby gateway. For these keep-alive messages, some embodiments use Bidirectional Forwarding Detection (BFD), in which two network elements send control packets to each other at regular intervals. Other embodiments may use other protocols to maintain the tunnel state, however.

The flow entries generated by the logical controller at 720, in some embodiments, do not specify the actual tunnel encapsulation. Instead, the flow entries are universal physical control plane data, and therefore specify the destination IP addresses for the tunnel encapsulation (those of the selected active and standby gateway host machines) but will not have the source IP addresses for the tunnel (as these are specific to the different MFEs that receive the flow entries).

The process 700 also generates (at 725) flow entries (or data tuples defining flow entries) for the MFEs on the selected gateway host machines to forward packets to the logical router implementation on the host. When packets arrive at the gateway host via a tunnel from a MFE at another host machine, the packet is initially processed by the MFE at the gateway host. The flow entries generated at 725 specify that if the logical context appended to the packet indicates that the packet has been logically forwarded by the L2 processing pipeline to the logical switch port that attaches to the logical router, then the packet should be sent to the namespace or other container on the gateway that implements the logical router. In addition, the network controller generates other flow entries for the MFEs at the gateways, including entries for mapping packets received from the logical routers to logical switch ingress ports. In some embodiments, the MFE at the gateway acts as the first-hop MFE for packets received from a centralized logical router, and therefore the logical switch processing pipeline entries are also generated for the MFEs on the gateways. These may overlap, at the universal physical control plane level, with some of the flow entries generated for the MFEs at the VM host machines.

In addition to the flow entries (or data tuples defining flow entries), the process 700 also generates (at 730) data tuples for the routing table of the logical router. As indicated in the previous section, in some embodiments the flow entries (or the data tuples for the flow entries) are generated by a table mapping engine. The data tuples for the logical router may be generated by this same table mapping engine, though some embodiments offload at least a portion of the route generation process to a specific route processor. When the only defined routes come from the connection of logical switches to the logical router (as well as a low-priority default route to send packets), however, some embodiments do not require the use of a route processor, as no traversal of routes is necessary. When users provision static routes, such route traversal may be required in some embodiments. The controller, as mentioned, generates these data tuples that define the routes for the logical router, which are distributed to the gateways in a format different from the flow entries.

The above description describes (a portion of) the controller behavior when the logical router is implemented in a centralized manner. When the logical router is distributed, the process generates (at 735) flow entries (or data tuples defining flow entries) for MFEs on host machines that send packets through the logical router (i.e., machines hosting VMs attached to logical switches that attach to the logical router). These flow entries, among other functionalities, both (i) implement the distributed logical router and (ii) send packets, forwarded by the logical router to the logical port connecting to the external network, to the selected gateway host machines through tunnels. As in the centralized case, these flow entries generated for the VM hosts also include numerous other entries, such as those implementing the logical forwarding for the logical switches, ingress and egress ACLs, etc.

For the implementation of the distributed logical router, some embodiments generate logical forwarding entries that match packets based on destination IP address or address prefix (as well as over the logical pipeline for the logical router itself), and identify a logical egress port of the logical router based on the IP address. To generate these flow entries, the network controller of some embodiments first generates the routing table for the logical router (e.g., as described above for the centralized implementation). In some embodiments, these routes include a default route for sending packets to the port that connects to the external network, as well as routes for sending packets to each attached logical switch based on the IP subnets associated with the logical switches. The routing tables are then embedded into flow entry data tuples (e.g., including a match over the logical router pipeline) rather than the data tuples for distribution to the gateway. In addition, the flow entries for the logical router perform MAC address modification on the packets (to modify the source MAC address to be that of the logical egress port of the logical router, and the destination MAC address to be the address matching the destination IP address). This may include flow entries for either performing ARP or sending packets to an ARP daemon that operates on the hosts as well. Beyond the actual routing of the packet, the network controller generates flow entries for L3 ingress and egress ACL, in some embodiments, according to any policies defined for the logical router.

The flow entries for sending packets to the gateway hosts are similar to those generated in the centralized case. These flow entries specify a list of tunnels in priority order. The first tunnel encapsulation for the MFE to use is the encapsulation for the tunnel to the selected active gateway host machine. If this tunnel is unavailable, then the flow entry specifies a second encapsulation for the tunnel to the selected standby gateway host machine. In some embodiments, the MFEs regularly (e.g., every 500 ms, every 3 seconds, every 30 seconds, every 2 minutes, etc.) send out keep-alive messages through the tunnel to the active gateway. So long as responses are received from the active gateway, all packets forwarded to the logical router port will be encapsulated in the tunnel to the active gateway, rather than one of the standbys. Only if the keep-alive messages are not returned will the MFE use the second tunnel encapsulation listed in the flow entry, to the standby gateway.

The flow entries generated by the logical controller at 735, in some embodiments, do not specify the actual tunnel encapsulation. Instead, the flow entries are universal physical control plane data, and therefore specify the destination IP addresses for the tunnel encapsulation (those of the selected active and standby gateway host machines) but will not have the source IP addresses for the tunnel (as these are specific to the different MFEs that receive the flow entries).

The process 700 also generates (at 740) flow entries (or data tuples defining flow entries) for the MFEs on the selected gateway host machines to forward packets to the L3 gateway on the host. When packets arrive at the gateway host via a tunnel from a MFE at another host machine, the packet is initially processed by the MFE at the gateway host. The flow entries generated at 740 specify that if the logical context appended to the packet indicates that the packet has been logically routed by the L3 processing pipeline to the logical router port that attaches to the external network, then the packet should be sent to the namespace or other container on the gateway that implements the L3 gateway of the logical router. In addition, the network controller generates other flow entries for the MFEs at the gateways, including entries for receiving packets from the external network (after these packets go through the L3 gateway), and performing first-hop processing on such packets in order to identify a destination MFE (to which the destination VM of the packet attaches). These may overlap, at the universal physical control plane level, with some of the flow entries generated for the MFEs at the VM host machines.

In addition to the flow entries (or data tuples defining the flow entries), the process 700 also generates (at 745) data tuples for the routing table of the logical router. As indicated above, in some embodiments the data tuples are generated by a table mapping engine, while other embodiments may also utilize a separate route processor. As indicated above, in the distributed logical router case, much of the routing table is implemented as flow entries sent to the MFEs. However, the routing table of the logical router still handles packets being routed to and from the external networks. Accordingly, the routing table (and additional aspects of the IP network stack implemented by the L3 gateway) is responsible for performing any necessary ARP into the external networks as well as decrementing the packet TTL (i.e., as another hop for the packet). In addition, the L3 gateway may perform NAT and reverse NAT for packets to and from the external networks, in which case the controller generates the data tuples to define a NAT table as well.

In either of the two cases (distributed and centralized implementations), the process 700 distributes (at 750) the generated data to the host machines. In some embodiments, the two types of data (flow entries and routing table data tuples) are distributed via different protocols. Some embodiments distribute the flow entries to both the VM hosts and the gateway hosts via a first protocol such as OpenFlow, while distributing the routing table to the gateway hosts via a second protocol such as OVSDB. The OVSDB protocol used in some embodiments also carries configuration information for the MFEs (for both the VM hosts and the gateway hosts), in addition to the routing table data tuples.

The above FIG. 7 illustrates a process for provisioning a new logical router on both an active and a standby gateway host. As shown in FIGS. 9 and 8, in some embodiments the gateways may host multiple logical routers (e.g., for different, unrelated logical networks). While the managed network is running, in some cases a gateway host machine may become inactive, for any of a variety of reasons. For example, the hard disk or other storage of the machine may become corrupt, the virtualization software could crash, the physical connection may become bad (e.g., due to a corrupt NIC), or any number of other occurrences could take place.

Figure 10:
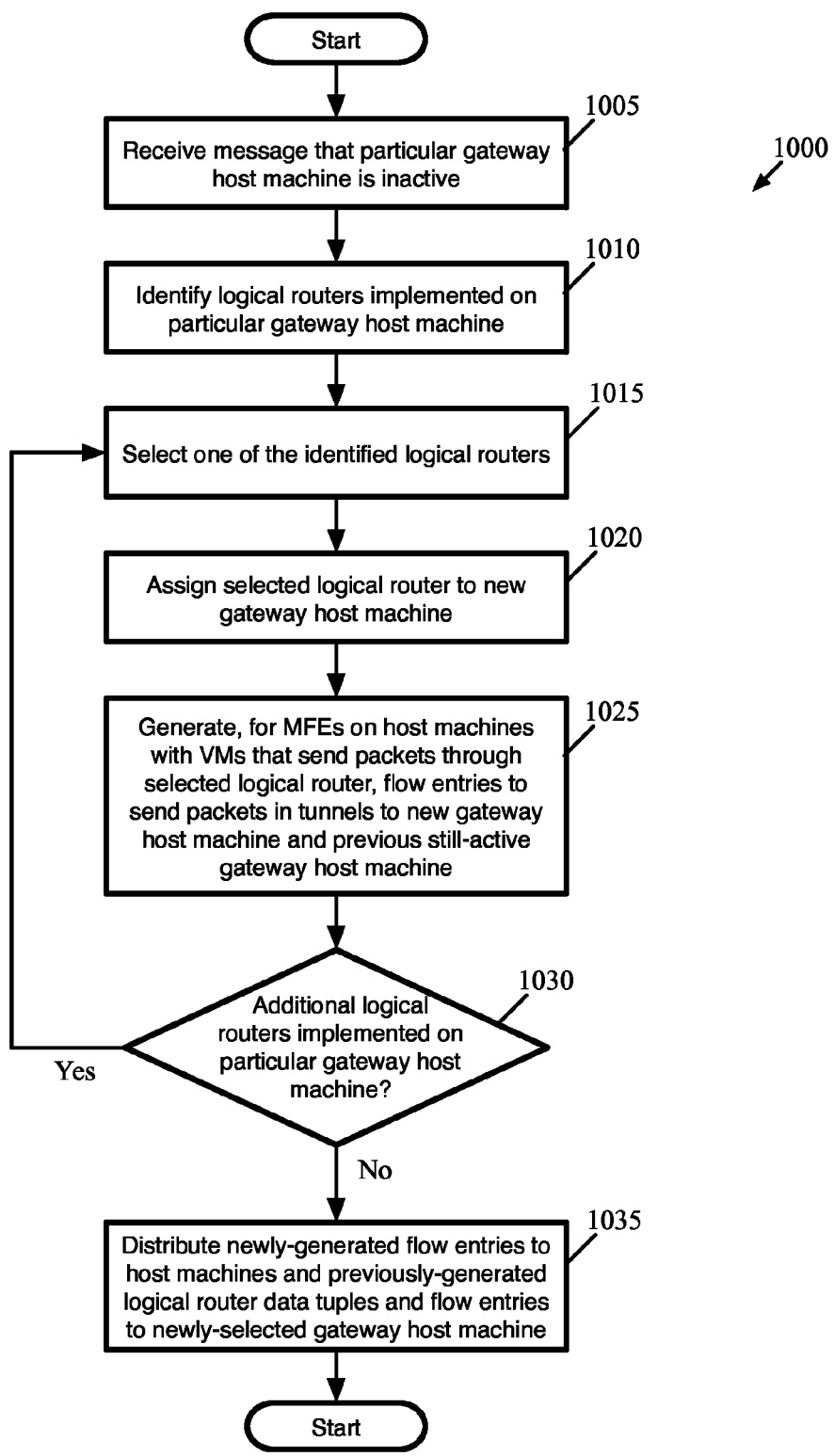
FIG. 10 conceptually illustrates a process performed by the network control system of some embodiments to reassign logical routers to different gateway host machines when the gateway host on which the logical routers operate fails.

FIG. 10 conceptually illustrates a process 1000 performed by the network control system of some embodiments to reassign logical routers to different gateway host machines when the gateway host on which the logical routers operate fails. In some embodiments, the process 1000 is performed by several different logical controllers in parallel, with each of the logical controllers reassigning the logical routers that they manage. In other embodiments, a single network controller performs the process for each logical router that was hosted on the failed gateway host.

As shown, the process 1000 begins by receiving (at 1005) a message that a particular gateway host machine has gone inactive. As mentioned, this may be due to hardware failure (e.g., the storage, memory, or processor resources), software failure (e.g., virtualization software crashing), or connection failure (either the physical connection, physical NIC, or the software managing the connection). In some embodiments, an application (e.g., a daemon) on the gateway host machine monitors the health of the gateway, and reports the gateway inactive if the machine appears unhealthy. In the hierarchical network control system of some embodiments, this message is first received by the physical controller that manages the gateway. The physical controller then identifies the different logical controllers that manage logical routers hosted on the gateway (either centralized logical routers or L3 gateways for distributed logical routers), and notifies these logical controllers of the gateway failure. The process 1000 is a process performed by such a logical controller in some embodiments, upon receiving this failure message. In some embodiments, the controllers communicate with each other over a Remote Procedure Call (RPC) channel.

Upon receiving the message that the particular gateway host machine has gone inactive, the process 1000 identifies (at 1010) any logical routers implemented on the particular gateway host machine. In some embodiments, the logical controller specifically identifies any logical routers that it manages and which are implemented on the gateway host. In some embodiments, the message received from the physical controller identifies these logical routers and requests reassignment. The process 1000 then selects (at 1015) one of the identified logical routers for reassignment. Though shown in this flow chart as a process performed in series (i.e., reassigning one logical router at a time), some embodiments perform reassignment of the several logical routers in parallel.

With a particular logical router selected, the process assigns (at 1020) the affected router to a new gateway host machine. In some embodiments, when only a single gateway has failed, the controller selects a new gateway in the same cluster. On the other hand, if an entire cluster goes down, then the controllers will move all of the logical routers in the cluster to other clusters using various algorithms. To select a new gateway in the same cluster for a logical router, some embodiments apply the same gateway selection algorithm as originally used when assigning the logical router to the gateway. For example, some embodiments calculate a hash of the logical router UUID modulo the new number of gateways in the cluster (the previous number of gateways minus one). This will tend to distribute the logical routers randomly across the remaining gateways in the cluster. Other embodiments use various load balancing algorithms, that account for the number of logical routers on the different gateways and/or the processing loads on the gateways.

With the new gateway selected for the logical router, the process 1000 generates (at 1025) new flow entries for the MFEs located at host machines with VMs that send packets to the logical router. As the location of the logical router (either the centralized logical router or the L3 gateway for a distributed logical router) has been changed, the flow entries used by the MFEs at the VM hosts that send packets to the gateways will require modification. So long as both the active and standby gateways for a logical router don't both fail at the same time, the logical network will still operate without problems. However, if only one of the active or standby logical routers is up and running, then the benefits of the high-availability setup are no longer present, and therefore the network control system performs the assignment and generates the new flow entries upon learning of the gateway failure.

The new flow entries for distribution to the MFEs at the VM hosts are the flow entries that specify the bundle of tunnels to use for packets to send to the centralized logical router or L3 gateway. As mentioned above, these specify a prioritized list of tunnel encapsulations, with the tunnel to the gateway hosting the active logical router listed first and the tunnel to the gateway hosting the standby logical router listed second. In some embodiments, when the gateway hosting an active logical router fails, the MFEs will have already started sending packets to the standby logical router, as the keep-alive messages sent to the active gateway will not have been returned. As such, some embodiments use the previous standby gateway as the new active gateway, and use the newly selected gateway for the logical router as the new standby. When the standby gateway hosting the logical router fails, the controller selects a new standby, leaving the master as such. Though this description refers to the standby gateway or active gateway, one of ordinary skill will recognize that a gateway may be a standby for a first logical router and active for a second logical router, and that the active-standby designation is in fact based on the prioritized list of tunnel encapsulations in the flow entries distributed to the host machines.

Figure 11:
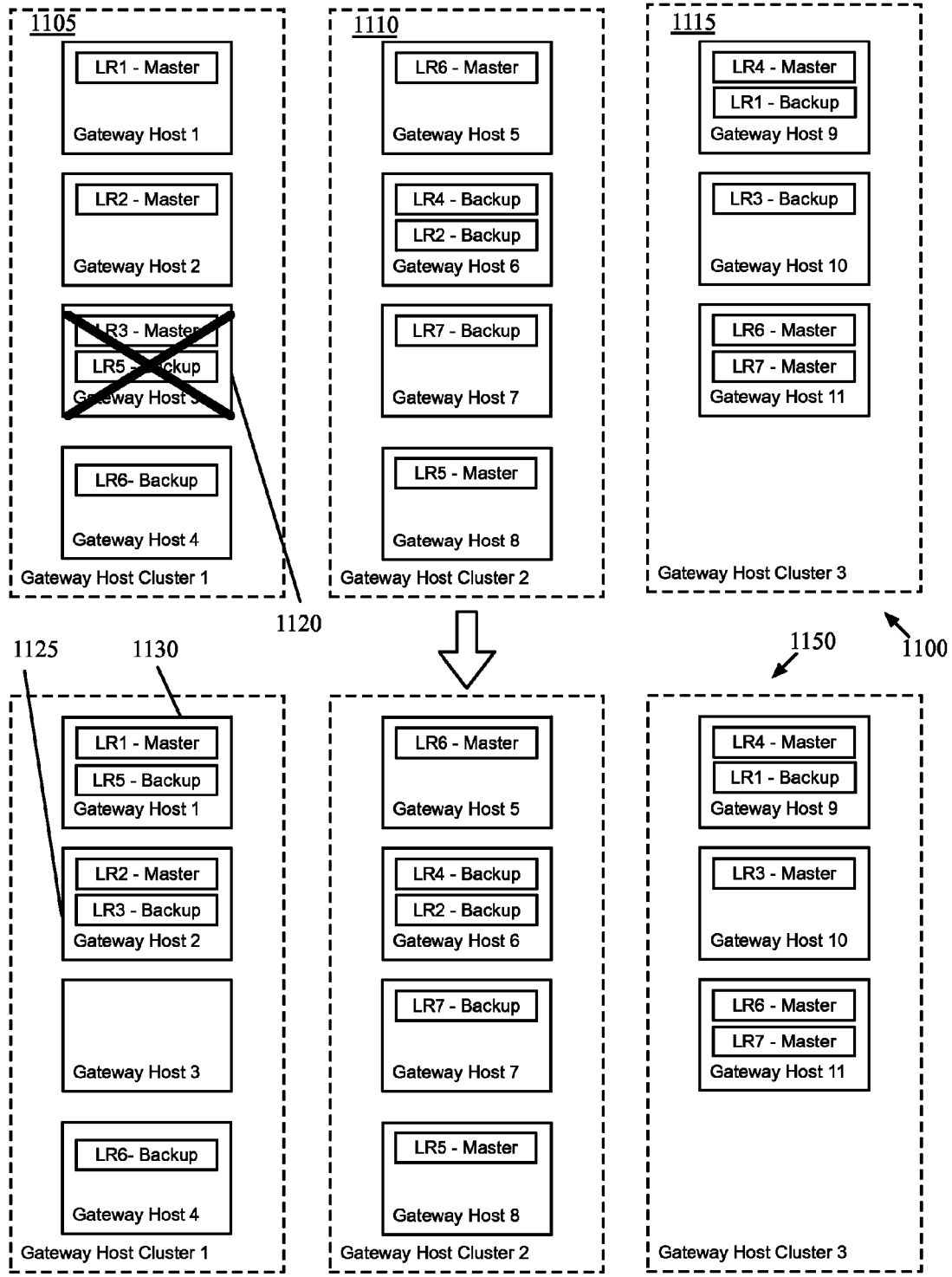
FIG. 11 conceptually illustrates a set of gateway host clusters over two stages in which one of the gateway host machines fails and the logical routers hosted on that gateway are reassigned.

FIG. 11 conceptually illustrates a set of gateway host clusters 1105-1115, over two stages 1100 and 1150 in which one of the gateway host machines fails and the logical routers hosted on that gateway are reassigned. As shown, the three gateway host clusters 1105-1115 host master (i.e., active) and backup (i.e., standby) implementations for seven different logical routers. These logical routers may be centralized logical routers or L3 gateways, and in some embodiments one gateway or cluster could host both types (i.e., one logical network might use a centralized implementation while another logical network uses the distributed implementation.

In the first stage 1100, the gateway host 1110 fails. This gateway host operates a master implementation of logical router 3 and a backup implementation of logical router 5. As shown at the second stage 1150, the gateway host 1110 no longer operates any logical routers. Instead, the implementation of logical router 3 located in the first cluster 1105 has been moved to gateway host 1125, and the implementation of logical router 5 has been moved to gateway host 1130. The logical router 5 implementation remains the backup implementation for this router. However, the implementation of logical router 3, which was previously the master implementation, is now the backup. Instead, the previous backup implementation, located on the gateway host 1135 in the cluster 1115, is now designated as the master implementation. In some embodiments, this change does not require any notification to the gateway host 1135 or the logical router, but is instead designated in the flow entries sent to the MFEs at the VM hosts.

Returning to FIG. 10, the process 1000 determines (at 1030) whether additional logical routers implemented on the failed gateway host machine require reassignment. As mentioned, in some embodiments the logical controller performing the process 1000 only performs this reassignment for logical routers that it manages, and these reassignments may be performed in parallel (as opposed to one after another as shown here). When additional logical routers remain, the process returns to 1015 to select the next logical router for reassignment.

When all of the logical routers have been reassigned, the process distributes (at 1035) (i) the newly generated flow entries for tunnel encapsulation to the high-availability gateways to the MFEs at the VM host machines and (ii) the previously-generated flow entries and routing data tuples to the newly assigned gateway host machines. In some embodiments, as described above, this entails distributing the data to the appropriate physical controllers that manage the different host machines receiving the data. While this process illustrates the distribution as occurring after all of the logical routers have been reassigned, some embodiments distribute data for each logical router as that data is prepared.

B. Packet Processing to High-Availability Gateways

The above section describes the network controller functionality for managing and provisioning the various elements that implement the logical network (MFEs, logical routers and L3 gateways in namespaces, etc.). Once these elements have been provisioned, the physical infrastructure implementing the logical network can send packets to the high-availability logical routers and L3 gateways (as well as the other traffic).

Figure 12:
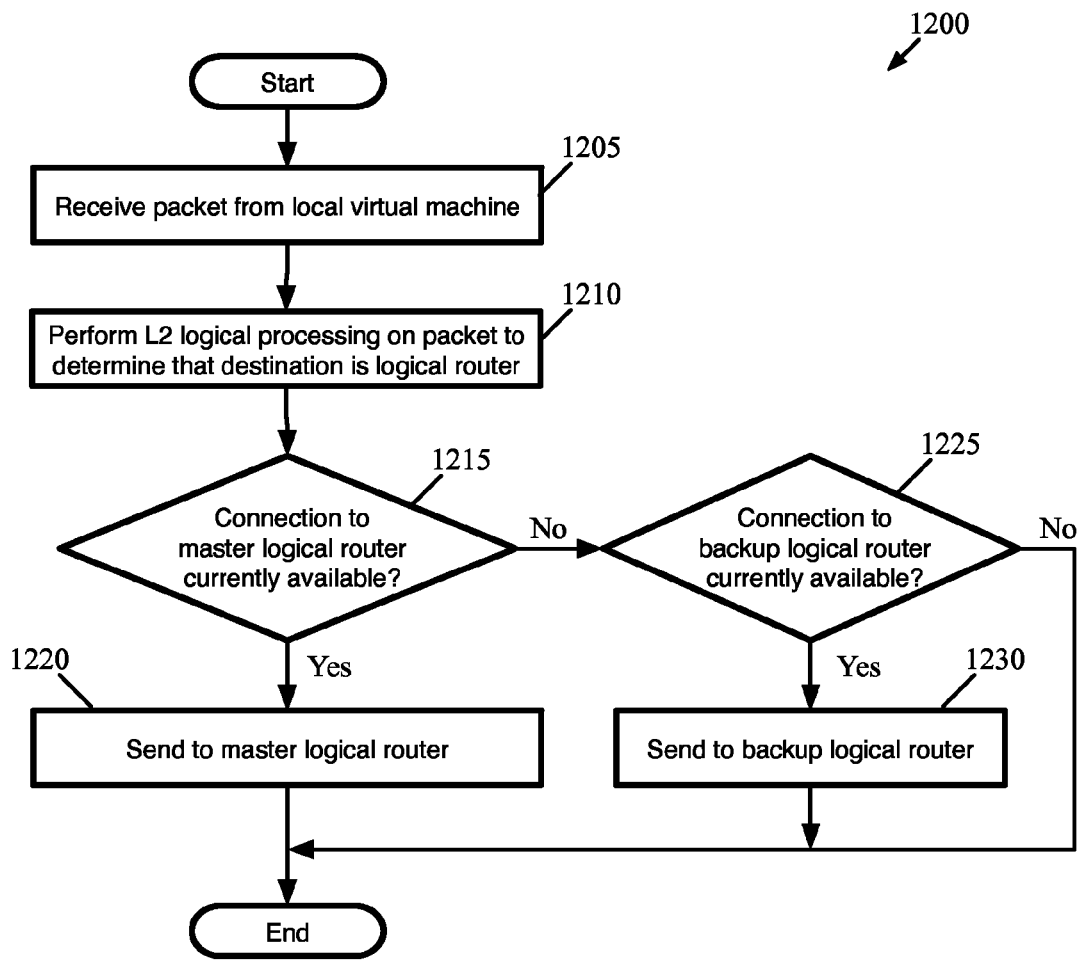
FIG. 12 conceptually illustrates a process of some embodiments for sending a packet to a gateway that hosts a centralized logical router.

FIG. 12 conceptually illustrates a process 1200 of some embodiments for sending a packet to a gateway that hosts a centralized logical router. The process 1200 is performed by a managed forwarding element to which a VM attaches, in some embodiments, when the VM sends a packet that requires routing in a network that does not distribute the logical router. In some embodiments, the process 1200 is not a process embedded in code, but rather represents the actions performed by the MFE according to a set of flow entries stored in the MFE that the packet matches in sequence. The subsequent FIG. 13 conceptually illustrates the repeated resubmission of a packet to such an MFE and the flow entries that the MFE utilizes in processing the packet.

As shown, the process 1200 begins by receiving (at 1205) a packet from a local virtual machine (i.e., a VM that attaches to a port of the MFE, such as through a virtual NIC of the VM). This packet from the VM will have source and destination MAC and IP addresses, in some embodiments. The source addresses are those of the VM from which the MFE receives the packet. The destination IP address is that of the desired destination machine for the packet (or, at least the public IP of the destination machine, if network address translation is used for the destination machine). The destination MAC address may be that of the destination machine if the destination is a VM on the same logical switch as the source, or the MAC address of the logical router interface with the logical switch if the destination is not on the same logical switch of the source VM.

The process 1200 then performs (at 1210) L2 logical processing on the received packet to determine that the packet destination is the logical router. As described in more detail by reference to FIG. 13 below, this processing involves (in addition to possibly performing ingress and egress ACL operations) logical forwarding based on the packet's destination MAC address. In this case, the packet's address is that of the logical router interface that attaches to the same logical switch as the source VM. Accordingly, the MFE identifies the logical egress port of the logical switch for the packet as the port that interfaces with the logical router, and stores this context with the packet.

At this point, because the logical router is centralized, the MFE needs to send the packet through a tunnel to the gateway that implements the logical router. The process determines (at 1215) whether the connection to the master logical router is currently available. In some embodiments, the MFE will have been regularly sending keep-alive messages through the tunnel to the gateway hosting the master logical router, and receiving responses back to ensure that the gateway is up and running. The MFE also sends similar messages to the gateway hosting the backup logical router (using the different tunnel encapsulation), in order to continue ensuring that the other gateway is active, in case of failure of the master gateway.

When the gateway hosting the master logical router implementation (also referred to as the master gateway for the logical router) is active, the process sends (at 1220) the packet to the master logical router. In some embodiments, this involves encapsulating the packet in a tunnel to the MFE at the gateway that hosts the master logical router. On the other hand, when the master gateway for the logical router is inactive (i.e., has not returned keep-alive messages), the process determines (at 1225) whether the gateway hosting the backup logical router implementation (also referred to as the backup gateway for the logical router) is active (e.g., using the same keep-alive messages).

When neither of the gateways specified for the logical router are active, then the process ends, as the MFE has nowhere to send the packet and therefore drops the packet. This case is rare, as it requires both of the gateways to fail within a short time span. In general, once one of the gateways becomes inactive, the MFEs will receive new flow entries shortly that specify a new master/backup pair of gateways. When the backup gateway for the logical router is active (and the master is inactive), the process sends (at 1230) the packet to the backup logical router. In some embodiments, this involves encapsulating the packet in a tunnel to the MFE at the gateway that hosts the backup logical router.

Figure 13:
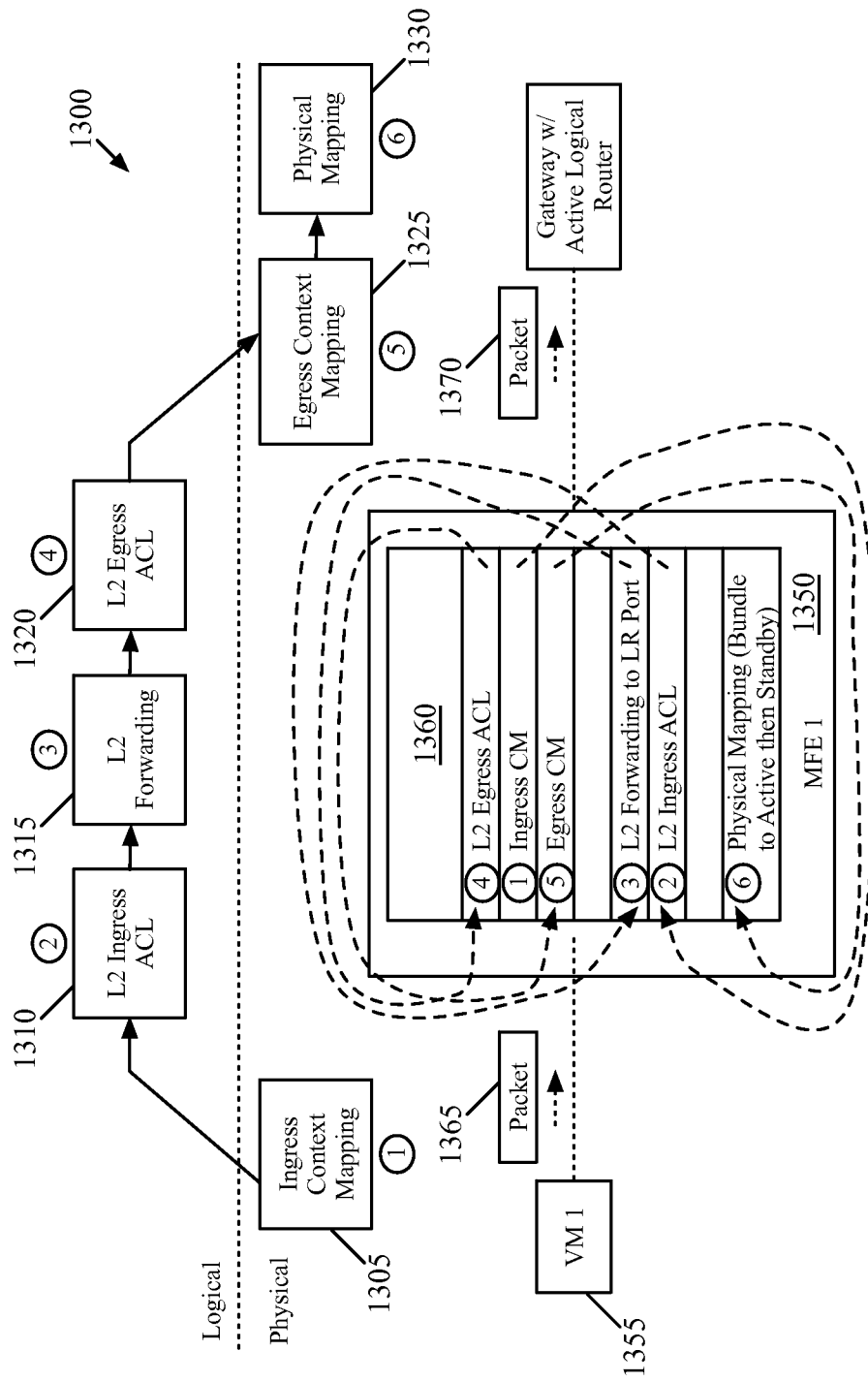
FIG. 13 conceptually illustrates a logical processing pipeline implemented by a managed forwarding element to process a packet sent from a VM attached to the MFE in a host to a centralized logical router.

FIG. 13 conceptually illustrates a logical processing pipeline 1300 implemented by a managed forwarding element 1350 to process a packet sent from a VM 1355 attached to the MFE in a host. The packet in this case is directed to a destination that is not on the same logical switch as the VM 1355, and therefore requires processing by a logical router. The logical router is implemented in a centralized fashion in a namespace (or other container) on a gateway host machine. As an example, the MFE 235 might correspond to the MFE 1350 for a packet sent by VM1 of the logical network 100 to either VM3, VM4, or a destination accessible through the external network 120. The logical processing pipeline 1300 includes various operations, each of which is performed according to one or more flow entries stored in the logical forwarding tables of the MFE 1350.

The MFE 1350 and other MFEs in the managed network implement the logical network using flow entries that define actions to be taken on packets (e.g., modifying, forwarding, or dropping a packet), conditions under which to take those actions (e.g., characteristics of incoming packets to which the actions should be applied), and priorities (in case a packet matches the conditions for multiple flow entries). This figure illustrates a portion of the logical forwarding tables 1360 stored by the MFE 1350—specifically, the portion of the tables that implements the L2 pipeline for the logical switch to which the VM 1355 attaches.

In some embodiments, the MFE 1350 checks the characteristics of the packet against the match conditions of each flow entry in the forwarding table 1360 and performs the actions dictated by the highest-priority flow entry whose conditions match the packet characteristics. These packet characteristics may be stored in the packet headers (e.g., source and destination MAC and IP addresses, transport protocol types, etc.) or stored in registers that the MFE uses to track packet information (e.g., logical and physical ingress and egress ports, logical forwarding elements, etc.). In some cases, the action specified by a flow entry changes the packet characteristics (either by modifying the packet itself or the packet registers) and resubmits the packet back to the MFE, by submitting the packet to a dispatch port. The dispatch port of some embodiments is a software construct that corresponds to resubmitting the packet, as modified, back to the MFE. The MFEs of some embodiments repeatedly modify the packet and compare the packet's characteristics as modified to the flow entries until the packet's characteristics match a flow entry that dictates that the packet either be dropped or forwarded to one or more physical egress ports.

In the illustrated example, the MFE 1350 repeatedly resubmits the packet 1365 to the forwarding table 1360 in order to implement the logical processing pipeline 1300. The resubmission process is conceptually illustrated by the dashed arrows leading from the right (outbound) side of the forwarding table to the left (inbound) side of the table. Though shown as a single table 1360, in some embodiments the MFE stores numerous different forwarding tables against which packets are submitted. For example, some embodiments store different forwarding tables for different logical forwarding elements, and only submit packets against the table for a currently identified logical forwarding element.

Initially, the MFE 1350 receives the packet 1365 from the VM 1355 at a physical ingress port. In some embodiments, this physical ingress port is a virtual interface between the VM as implemented on a host machine and the MFE on the same host. In some embodiments, the MFE 1350 stores an identifier for this physical ingress port in a register associated with the packet 1365. The MFE then begins processing the packet by attempting to match the packet's characteristics to conditions of the flow entries in the table 1360.

The MFE identifies a flow entry 1 (the flow entries are indicated in the figure by encircled numbers that match the processing pipeline operations) that implements the ingress context mapping operation 1305 of the logical processing pipeline 1300. The ingress context mapping operation 1305 maps the physical ingress port (the match condition for the flow entry 1) to a logical ingress port of a particular logical switch in some embodiments. The MFE can then submit the packet against the forwarding table for the particular logical switch. The flow entry 1, in addition to performing the context mapping to a logical ingress port, instructs the MFE to resubmit the packet.

Next, the MFE identifies a flow entry 2 that implements a L2 ingress ACL operation 1310. This operation, in some embodiments, determines whether the packet should be allowed to enter the particular logical switch from the logical ingress port (e.g., based on whether the source MAC and IP addresses of the packet match those associated with the logical port, or other factors such as the number of packets received through the port in a particular timeframe). If the L2 ingress ACL operation does not specify to drop the packet, then the MFE resubmits the packet to the forwarding table 1360 again.

The MFE then identifies a flow entry 3 that implements a logical L2 forwarding operation 1315. Specifically, this operation maps the destination MAC address of the packet to a logical egress port (and, in some embodiments, matches over a logical context stored in the register that indicates that the packet has been allowed by the ingress ACL). In this case, the flow entry 3 identifies as the logical egress port of the logical switch the port that attaches to the logical router. Again, the MFE then resubmits the packet to the forwarding tables 1360.

Next, the MFE identifies a flow entry 4 that implements a L2 egress ACL operation 1320. This operation, in some embodiments, determines whether the packet should be allowed to exit the particular logical switch through the logical egress port (e.g., based on whether the destination MAC and IP addresses of the packet match those associated with the logical port, whether the source MAC and IP addresses are allowed to send packets to the logical router, etc.). If the L2 egress ACL operation does not specify to drop the packet, then the MFE resubmits the packet to the forwarding table 1360 again.

The MFE then identifies a flow entry 5 that implements an egress context mapping operation 1325. This operation maps the logical egress port identified at operation 1315 to a physical destination (e.g., the gateway at which the centralized logical router is implemented). At this point, the fact that the logical router is actually implemented in a high-availability configuration at multiple gateways does not yet come into play.

However, after resubmitting the packet, the MFE identifies a flow entry 6 that implements a physical mapping operation 1330. In some embodiments, this flow entry specifies how to encapsulate the packet in a tunnel to the physical destination identified by the flow entry 5 (and, e.g., stored in a register before resubmission). This flow entry, in some embodiments, incorporates the high-availability configuration of the logical router. Specifically, the flow entry 6 for the physical mapping operation 1330 specifies an ordered list of tunnel encapsulations to use if the conditions are matched. The flow entry specifies to use a tunnel to the active gateway first, so long as that gateway is available (i.e., based on the return of keep-alive messages). If the active gateway is unavailable, however, then the flow entry specifies to use a tunnel to the standby gateway. When encapsulating the packet, in some embodiments the MFE adds the tunnel endpoint addresses (e.g., MAC and IP addresses) as well as the logical context (i.e., identifying the logical router as the packet destination). The MFE then sends the encapsulated packet 1370 out of the host through a physical NIC of the host.

Upon arrival at the gateway (either the active or standby gateway), the packet is processed by the MFE operating at the gateway. This MFE identifies the logical context stored on the packet identifying the logical router as its destination (i.e., identifying the logical switch port that connects to the logical router as the destination egress port). Based on this identification, a flow entry at the MFE specifies to forward the packet to the container (e.g., a namespace) implementing the logical router. At this point, the routing table stored in the namespace performs routing (and, if necessary, a NAT table performs any network address translation required), and sends the packet back to the MFE in the gateway host if the packet is destined for a VM attached to a logical switch of the logical network. The MFE in the gateway then treats this routed packet as a new packet in some embodiments, and performs a first-hop pipeline similar to that of FIG. 13 (i.e., the logical pipeline for the destination logical switch). On the other hand, if the destination is an external network, in some embodiments the namespace sends the packet directly out through a physical NIC of the gateway into the external network.

The above two figures conceptually illustrate packet processing by the source MFE (i.e., the MFE located at the same host as the source of the packet) for a packet sent to a centralized logical router. However, in some embodiments the logical router is distributed, and therefore additional packet processing is performed at the first-hop MFE.

Figure 14:
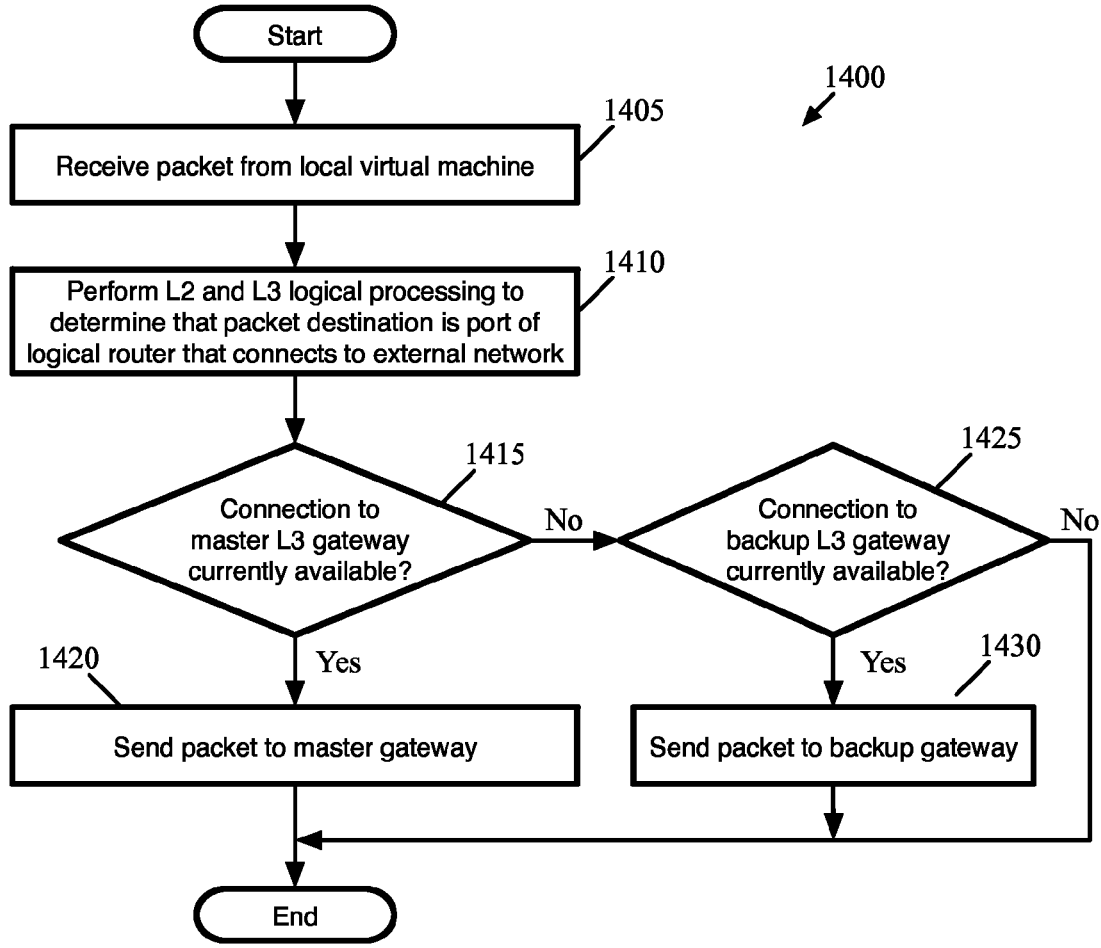
FIG. 14 conceptually illustrates a process of some embodiments for sending a packet to a gateway host machine that hosts a L3 gateway for a logical network.

FIG. 14 conceptually illustrates a process 1400 of some embodiments for sending a packet to a gateway host machine that hosts a L3 gateway for a logical network. The process 1400 is performed by a managed forwarding element to which a VM attaches, in some embodiments, when the VM sends a packet with a destination external to the managed network. In some embodiments, the process 1400 is not a process embedded in code, but rather represents the actions performed by the MFE according to a set of flow entries stored in the MFE that the packet matches in sequence. The subsequent FIG. 15 conceptually illustrates the repeated resubmission of a packet to such an MFE and the flow entries that the MFE utilizes in processing the packet.

As shown, the process 1400 begins by receiving (at 1405) a packet from a local virtual machine (i.e., a VM that attaches to a port of the MFE, such as through a virtual NIC of the VM). This packet from the VM will have source and destination MAC and IP addresses, in some embodiments. The source addresses are those of the VM from which the MFE receives the packet. The destination IP address is that of the desired destination machine for the packet (or, at least the public IP of the destination machine, if network address translation is used for the destination machine). The destination MAC address may be that of the destination machine if the destination is a VM on the same logical switch as the source, or the MAC address of the logical router interface with the logical switch if the destination is not on the same logical switch of the source VM. As the packet in this case is destined for an external destination accessible through the logical router, the latter applies.

The process 1400 then performs (at 1410) L2 and L3 logical processing on the received packet to determine that the packet destination is the port of the logical router that connects to the external network. As described in more detail by reference to FIG. 15 below, this processing involves (in addition to possibly performing various ingress and egress ACL operations) two separate logical forwarding operations. First, the MFE performs logical switching based on the packet's destination MAC address to identify the logical egress port of the logical switch as the port that interfaces with the logical router. Then, because the logical router is distributed, the MFE performs logical routing based on the packet's destination IP address (possibly using a default route) to identify the logical egress port of the logical router as the port that interfaces with the external network, and stores this context with the packet.

At this point, because the packet is to be sent to the external network, the MFE needs to send the packet through a tunnel to the gateway host machine that implements the L3 gateway physical connection to the external network. The process determines (at 1415) whether the connection to the master L3 gateway is currently available. In some embodiments, the MFE will have been regularly sending keep-alive messages through the tunnel to the gateway host machine that hosts the master L3 gateway, and receiving responses back to ensure that the gateway is up and running. The MFE also sends similar messages to the gateway host machine that hosts the backup L3 gateway (using the different tunnel encapsulation), in order to continue ensuring that the other gateway is active, in case of failure of the master gateway.

When the gateway host machine that hosts the master L3 gateway implementation (also referred to as the master gateway host for the L3 gateway) is active, the process sends (at 1420) the packet to the master L3 gateway. In some embodiments, this involves encapsulating the packet in a tunnel to the MFE at the gateway host that hosts the master L3 gateway. On the other hand, when the master gateway host for the L3 gateway is inactive (i.e., has not returned keep-alive messages), the process determines (at 1425) whether the gateway host machine that hosts the backup L3 gateway implementation (also referred to as the backup gateway host for the L3 gateway) is active (e.g., using the same keep-alive messages).

When neither of the gateway hosts specified for the L3 gateway are active, then the process ends, as the MFE has nowhere to send the packet and therefore drops the packet. This case is rare, as it requires both of the gateways to fail within a short time span. In general, once one of the gateway hosts becomes inactive, the MFEs will receive new flow entries shortly thereafter that specify a new master/backup pair of gateways. When the backup gateway host for the L3 gateway is active (and the master is inactive), the process sends (at 1430) the packet to the backup L3 gateway. In some embodiments, this involves encapsulating the packet in a tunnel to the MFE at the gateway host machine that hosts the backup L3 gateway.

Figure 15:
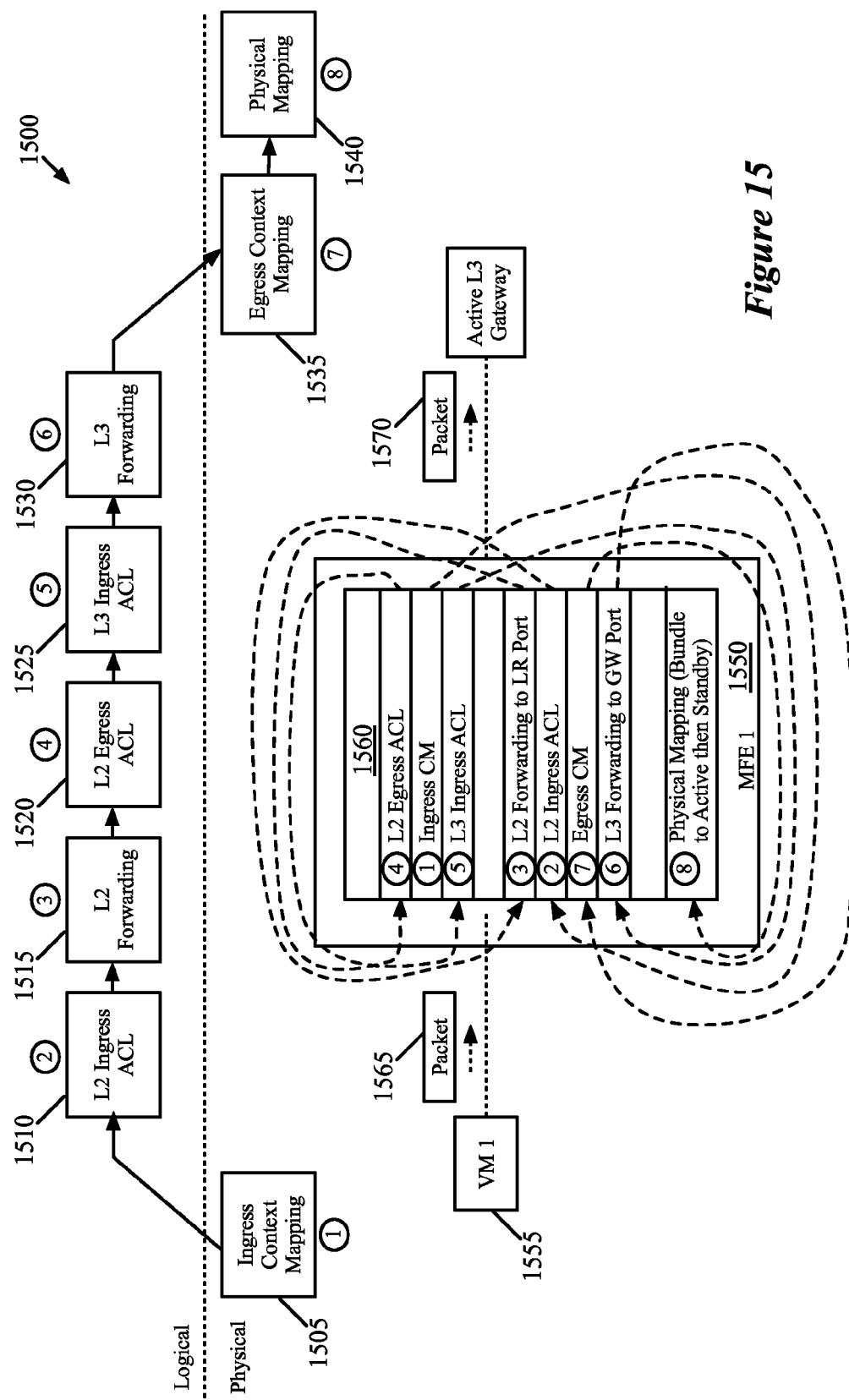
FIG. 15 conceptually illustrates a logical processing pipeline implemented by a managed forwarding element to process a packet sent from a VM attached to the MFE in a host to a L3 gateway.

FIG. 15 conceptually illustrates a logical processing pipeline 1500 implemented by a managed forwarding element 1550 to process a packet sent from a VM 1555 attached to the MFE in a host. The packet in this case is directed to a destination that is not on the same logical switch as the VM 1555, and therefore requires for the packet to be processed by a logical router. The logical router is implemented in a distributed fashion by the MFEs, with an L3 gateway in a namespace (or other container) on a gateway host machine for the connection to external networks. As an example, the MFE 320 might correspond to the MFE 1550 for a packet sent by VM1 of the logical network 100 to a destination accessible through the external network 120. The logical processing pipeline 1500 includes various operations, each of which is performed according to one or more flow entries stored in the logical forwarding tables of the MFE 1550.

As in FIG. 13, the MFE 1550 and other MFEs in the managed network implement the logical network using flow entries that define actions to be taken on packets, conditions under which to take those actions, and priorities of the flow entry. This figure illustrates a portion of the logical forwarding tables 1560 stored by the MFE 1550—specifically, the portion of the tables that implements the L2 pipeline for the logical switch to which the VM 1555 attaches and the L3 pipeline for the logical router to which that logical switch attaches.

In the illustrated example, the MFE 1550 repeatedly resubmits the packet 1565 to the forwarding table 1560 in order to implement the logical processing pipeline 1500. The resubmission process is conceptually illustrated by the dashed arrows leading from the right (outbound) side of the forwarding table to the left (inbound) side of the table. Though shown as a single table 1560, in some embodiments the MFE stores numerous different forwarding tables against which packets are submitted. For example, some embodiments store different forwarding tables for different logical forwarding elements, and only submit packets against the table for a currently identified logical forwarding element (e.g., the L2 pipeline and the L3 pipeline might be stored in separate forwarding tables of the MFE 1550).

Initially, the MFE 1550 receives the packet 1565 from the VM 1555 at a physical ingress port. In some embodiments, this physical ingress port is a virtual interface between the VM as implemented on a host machine and the MFE on the same host. In some embodiments, the MFE 1550 stores an identifier for this physical ingress port in a register associated with the packet 1565. The MFE then begins processing the packet by attempting to match the packet's characteristics to conditions of the flow entries in the table 1560.

In this example, the first four operations 1505-1520 of the logical processing pipeline 1500 are the same as those in the previous example of FIG. 13. That is, the MFE performs ingress context mapping to map the physical ingress port (e.g., the interface with the VM 1555) to a logical ingress port of a particular logical switch, L2 ingress ACL, L2 forwarding to identify the logical switch port that interfaces with the logical router as the egress port for the particular logical switch, and L2 egress ACL.

At this point, rather than preparing to send the packet out to a gateway hosting a logical router, the MFE 1550 begins performing the logical L3 processing pipeline for the logical router. During the previous operations (e.g., the flow entry 3 specifying the logical switching operation 1515), the MFE would have written into the registers for the packet the logical L3 ingress port and the particular logical router.

The MFE identifies a flow entry 5 that implements a L3 ingress ACL operation 1525. This operation, in some embodiments, determines whether the packet should be allowed to enter the particular logical router from the logical ingress port (e.g., based on whether the source MAC and/or IP addresses of the packet match those associated with the logical port, or other factors such as the number of packets received through the port in a particular timeframe). If the L3 ingress ACL operation does not specify to drop the packet, then the MFE resubmits the packet to the forwarding table 1560 again.

The MFE then identifies a flow entry 6 that implements a logical L3 forwarding operation 1530. Specifically, this operation maps the destination IP address of the packet to a logical egress port (and, in some embodiments, matches over a logical context stored in the register that indicates that the packet has been allowed by the L3 ingress ACL). In this case, the flow entry 6 identifies as the logical egress port of the logical router the port that attaches to the external network (i.e., the L3 gateway port). This decision may be based on a match over the specific destination IP address or IP prefix, or be the implementation of a default route for the logical router when the packet does not match the IP address prefixes for the various subnets within the logical network (i.e., the different logical switches that attach to the logical router). In addition, as part of this operation in some embodiments, the MFE rewrites the source and destination MAC addresses of the packet. The source address is now the MAC address associated with the L3 gateway port, while the destination address is the MAC address that matches the destination IP address (if known). In other embodiments, the MAC address rewriting is performed by the L3 gateway.

The MFE then identifies a flow entry 7 that implements an egress context mapping operation 1535. This operation maps the logical egress port identified at operation 1530 to a physical destination (e.g., the gateway host at which the L3 gateway is implemented). At this point, the fact that the L3 gateway is actually implemented in a high-availability configuration at multiple gateways does not yet come into play. As shown, in this example the MFE does not perform L3 egress ACL for packets sent to the L3 gateway. In some embodiments, the L3 egress ACL is performed by the MFE located at the gateway host before handing the packet off to the L3 gateway.

After resubmitting the packet, the MFE identifies a flow entry 8 that implements a physical mapping operation 1540. In some embodiments, this flow entry specifies how to encapsulate the packet in a tunnel to the physical destination identified by the flow entry 7 (and, e.g., stored in a register before resubmission). This flow entry, in some embodiments, incorporates the high-availability configuration of the L3 gateway. Specifically, the flow entry 8 for the physical mapping operation 1540 specifies an ordered list of tunnel encapsulations to use if the conditions are matched. The flow entry specifies to use a tunnel to the active gateway first, so long as that gateway is available (i.e., based on the return of keep-alive messages). If the active gateway is unavailable, however, then the flow entry specifies to use a tunnel to the standby gateway. When encapsulating the packet, in some embodiments the MFE adds the tunnel endpoint addresses (e.g., MAC and IP addresses) as well as the logical context (i.e., identifying the gateway port of the logical router as the packet destination). The MFE then sends the encapsulated packet 1570 out of the host through a physical NIC of the host.

Upon arrival at the gateway host machine (either the active or standby gateway), the packet is processed by the MFE operating at the gateway. This MFE identifies the logical context stored on the packet identifying the L3 gateway port of the logical router as its logical egress port. Based on this identification, a first flow entry at the MFE performs the L3 egress ACL operation in some embodiments. A second flow entry (or set of flow entries) specifies to forward the packet to the container (e.g., a namespace) implementing the L3 gateway. At this point, the routing table stored in the namespace performs routing to the appropriate physical router of the external network (and, if necessary, a NAT table performs any network address translation required). In order to send the packet out to the destination in the external network, in some embodiments the namespace sends the packet back to the MFE, which subsequently sends the packet out one of the physical NICs without additional processing. In other embodiments, the namespace has a direct connection to the physical NIC(s), and sends the packet directly out through a physical NIC of the gateway into the external network, without returning the packet to the MFE.

III. ECMP Emulation with Multiple Active Gateways

In both of the above implementations, the high-availability logical routers or L3 gateways have a designated active gateway. This allows for the use of stateful services, such as network address translation, on the gateways, as all traffic passes through the active gateway. However, having a single gateway for all of the traffic can become a bottleneck for some logical networks, when large amounts of traffic need to pass through the same host machine.

Accordingly, some embodiments utilize multiple active L3 gateways for traffic exchanged between entities (e.g., VMs) in the managed network and entities (e.g., VMs, physical machines, etc.) located outside the managed network (i.e., north-south traffic). For packets sent from a VM to an external destination, the MFE at the VM host may use equal-cost multi-path (ECMP) type algorithms to determine to which L3 gateway to send a particular packet (or packets for a particular connection). For instance, different embodiments use various different hash algorithms on outbound packets to determine to which gateway a packet should be sent.

A. Provisioning by Network Control System

The provisioning for a multiple active L3 gateway configuration is similar to the provisioning described above in Section II for an active-standby (or active with multiple standbys) L3 gateway configuration. However, the tunnel encapsulation flow entries generated for the MFEs at the VM hosts are different, as they do not include a prioritized list of gateways. Instead, these flow entries included an unordered list of gateways and an algorithm for selecting between the gateways.

Figure 16:
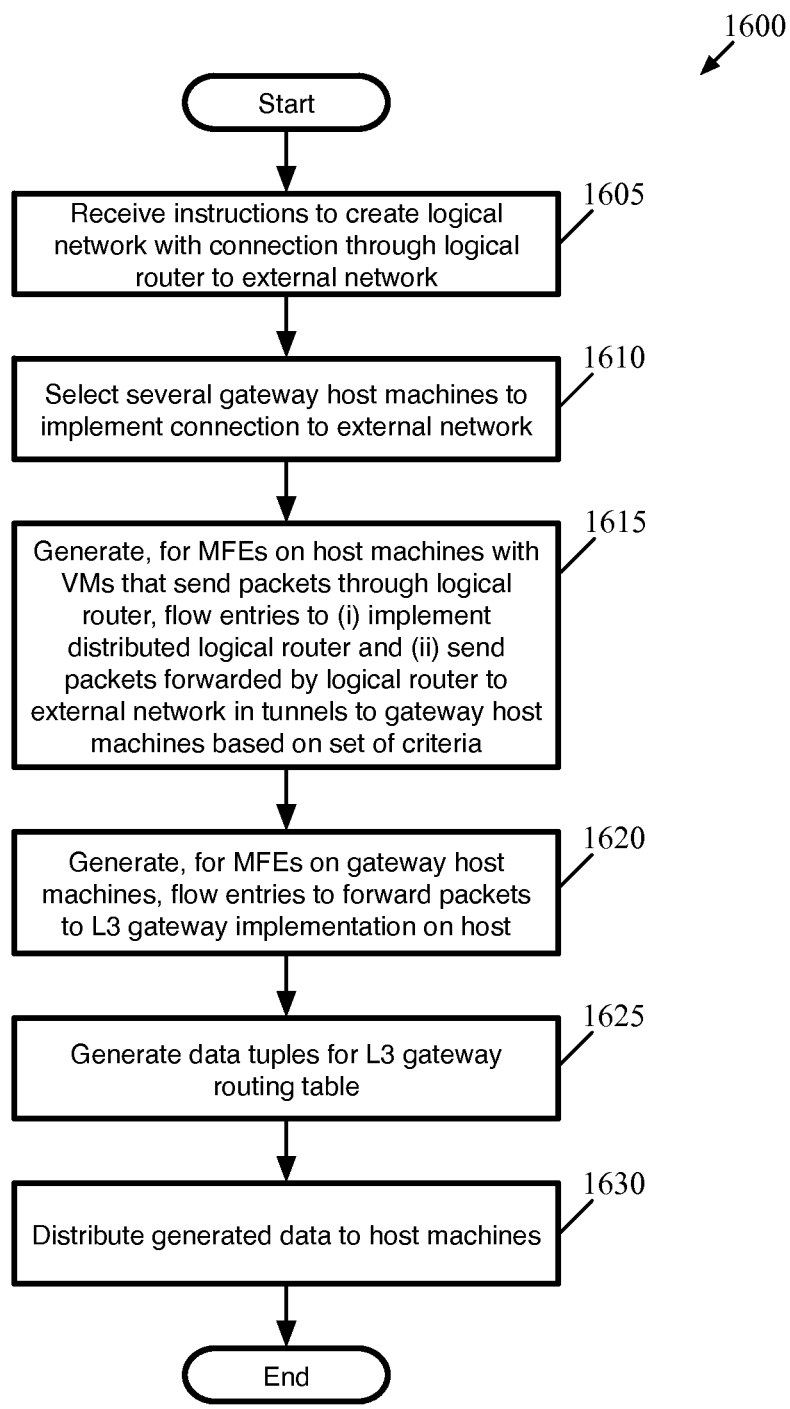
FIG. 16 conceptually illustrates a process of some embodiments for implementing a distributed logical router in a managed network using multiple active L3 gateways.

FIG. 16 conceptually illustrates a process 1600 of some embodiments for implementing a distributed logical router in a managed network. In some embodiments, the process 1600 is performed by a network controller (e.g., a logical controller) upon receiving a network configuration that includes a logical router with a connection to external networks. As shown, the process 1600 begins by receiving (at 1605) instructions to create a logical network with a connection through a logical router to an external network. These instructions may be the result of a network administrator designing a logical network (e.g., through a cloud management application) that passes the logical network configuration through controller APIs.

Next, the process selects (at 1610) several gateway host machines on which to implement the logical router connection to the external network. In some embodiments, the managed network physical infrastructure includes one or more clusters of gateway host machines on which the logical routers may be implemented, and from which the network controller selects the multiple active gateway host machines. In some embodiments, part of selecting the gateway host machines for the active L3 gateways involves the controller generating data tuples that define the containers (e.g., namespaces) for these L3 gateways on the gateway hosts and activate routing on these containers.

Different embodiments perform this selection of the gateway host machines differently In some embodiments, the network controller always uses the same number (e.g., three, four, etc.) of gateway host machines to implement the connection to the external network. In other embodiments, the administrator that provides the logical network configuration can select the number of active gateway host machines to use in implementing the L3 gateway.

Furthermore, some embodiments allow the administrator to request specific gateway host machines upon which to implement the L3 gateways, which removes most of the selection functionality from the network controller. In other embodiments, the administrator identifies the cluster or clusters of gateway host machines within which the network controller should implement the L3 gateway, and the controller then selects the appropriate number of gateway hosts within the cluster. For instance, the network administrator might choose four clusters, and the network controller then selects one gateway host machine in each cluster. In another example, the network administrator might choose to have two gateways in each of two different clusters of gateways, or have all of the gateways located in a single cluster.

With a cluster of gateway hosts selected for one of the several active L3 gateways, some embodiments select a particular gateway in the cluster by using a hash function of a property of the logical router (e.g., a logical router UUID assigned by the controller), modulo the number of gateway hosts in the cluster. This assigns the L3 gateways to host machines within a cluster effectively at random (even if the algorithm itself is deterministic), and therefore will load balance the logical routers across the gateway hosts over the long run. Other embodiments may use other methods to load balance the L3 gateways across the gateway hosts in a cluster. For instance, rather than using the hash algorithm to choose between all gateway hosts in a cluster, some embodiments choose between only those gateways with the fewest number of logical routers or L3 gateways currently operating, and modulo the result of the hash function by this smaller number of gateway hosts. Other embodiments analyze the number of L3 gateways on each gateway host and the operational load of the gateway hosts (e.g., based on number of packets processed over a particular timeframe) in order to determine to which gateway host a particular logical router should be assigned. When assigning an L3 gateway to multiple hosts within a cluster, some embodiments assign the L3 gateway to a first host by using the hash (e.g., of the logical router UUID) modulo the number of hosts, then remove the selected host and assign the L3 gateway to a second host by using the hash modulo the number of hosts with the first host removed.

Figure 17:
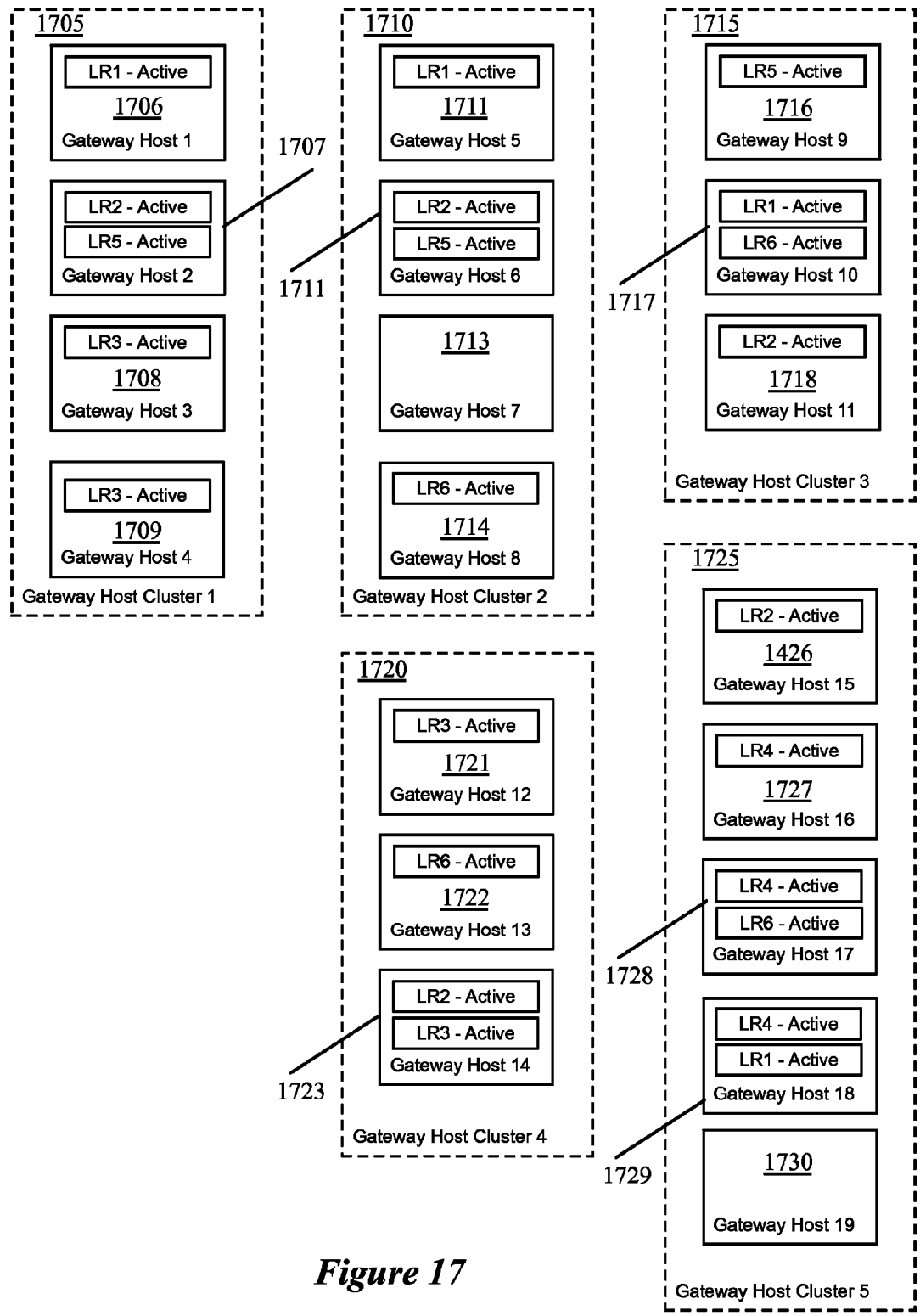
FIG. 17 conceptually illustrates five clusters of gateway hosts, and the L3 gateways implemented on these gateway hosts.

FIG. 17 conceptually illustrates five clusters 1705-1725 of gateway hosts, and the L3 gateways implemented on these gateway hosts. Specifically, the first cluster 1705 includes four gateways 1706-1709, the second cluster 1710 includes four gateways 1711-1714, the third cluster 1715 includes three gateways 1716-1718, the fourth cluster 1720 includes three gateways 1721-1723, and the fifth cluster 1725 includes five gateways 1726-1730. In this example, L3 gateways for six different logical routers are implemented across the clusters 1705-1725. Each L3 gateway has between three and five different implementations throughout the gateway host machines. For instance, the L3 gateways for logical router 1 are located on the host 1706 in the first cluster 1705, the host 1711 in the cluster 1710, the host 1717 in the cluster 1717, and the host 1729 in the cluster 1725.

In this example, logical routers, 1, 3, and 6 each have four L3 gateways, logical routers 4 and 5 have three L3 gateways, and logical router 2 has five L3 gateways. Some of the logical routers (e.g., logical routers 1, 2, 5, and 6) have each of their L3 gateways on hosts in different clusters. Logical router 3 has two L3 gateways in the cluster 1705 and two L3 gateways in the cluster 1720, and logical router 4 has all three of its L3 gateways located on hosts in the cluster 1725 (e.g., because all of the VMs that attach to the logical network that includes logical router 4 are located in the same zone of a datacenter as the cluster 1725. Thus, different configurations of the L3 gateways are possible, depending on the needs of the logical networks.

In this example, no explicit load balancing is used to assign the L3 gateways to host machines within a cluster, and therefore in the second cluster 1710 and the fifth cluster 1725, the gateway hosts 1713 and 1730, respectively, have no logical routers (even though each of these clusters include host machines with multiple L3 gateways). In addition, not all of the clusters have the same number of gateway hosts. This may be due to the clusters simply having different numbers of physical machines, or some of the clusters having host machines offline due to connection or other problems. In some embodiments, when an application running on a gateway identifies a problem with the gateway, the application notifies a network controller (e.g., the physical controller that manages the gateway machine) of the issue so that the gateway can be taken out of use until the issue is resolved.

Different embodiments handle failover of the multiple-active L3 gateway configuration differently. In some embodiments, when a host with an L3 gateway fails, the network does not immediately replace the L3 gateway on a new host. Instead, the network controller allows the MFEs to distribute the packet load across the remaining L3 gateway implementations, once the MFE determines that the L3 gateway has failed (e.g., due to the failure to return its keep-alive messages). Once the host can be brought back online, the MFE does not need any new flow entries in order to incorporate the newly available L3 gateway. On the other hand, some embodiments replace the L3 gateway with a new implementation on a different host (e.g., in the same cluster as the failed host).

While the above FIG. 17 illustrates all of the logical routers implemented in multiple-active configuration, in some embodiments the network controller can implement different configurations for different logical routers of different logical networks. For instance, a network control system could implement a first logical router in centralized active-standby fashion, a second logical router in distributed fashion with active-standby L3 gateways, and a third logical router in distributed fashion with several active L3 gateways. In fact, a single host machine could operate containers for all three different logical router implementations.

Returning to FIG. 16, after selecting the gateway hosts for the L3 gateways, the process generates (at 1615) flow entries (or data tuples defining flow entries) for MFEs on host machines that send packets through the logical router). These flow entries, among other functionalities, both (i) implement the distributed logical router and (ii) send packets, forwarded by the logical router to the logical port connecting to the external network, to the selected gateway host machines through tunnels. In addition, these flow entries generated for the VM hosts also include numerous other entries, such as those implementing the logical forwarding for the logical switches, ingress and egress ACLs, etc.

As described in the previous section, for the implementation of the distributed logical router, some embodiments generate logical forwarding entries that match packets based on destination IP address or address prefix (as well as over the logical pipeline for the logical router itself), and identify a logical egress port of the logical router based on the IP address. To generate these flow entries, the network controller of some embodiments first generates the routing table for the logical router. In some embodiments, these routes include a default route for sending packets to the port that connects to the external network, as well as routes for sending packets to each attached logical switch based on the IP subnets associated with the logical switches. The routing tables are then embedded into flow entry data tuples (e.g., including a match over the logical router pipeline) rather than the data tuples for distribution to the gateway. In addition, the flow entries for the logical router perform MAC address modification on the packets in some embodiments (to modify the source MAC address to be that of the logical egress port of the logical router, and the destination MAC address to be the address matching the destination IP address). This may include flow entries for either performing ARP or sending packets to an ARP daemon that operates on the hosts as well. Beyond the actual routing of the packet, the network controller generates flow entries for L3 ingress and egress ACL, in some embodiments, according to any policies defined for the logical router.

The flow entries for sending packets to the gateway hosts, in some embodiments, specify a list of tunnels from which to choose based on a specified algorithm. Rather than a priority list, the flow entry instructs the MFE to calculate a given function of one or more packet characteristics and use the result of this calculation to determine which of the listed tunnels should be used to encapsulate the packet. Different embodiments use different algorithms to determine which of the listed (and active) tunnels the MFE should use to send the packet. Some embodiments use a hash of various packet characteristics, such as a hash of the 5-tuple that defines a transport connection (source and destination IP addresses, source and destination transport port numbers, transport protocol), though other embodiments may hash other packet characteristics (e.g., source and destination IP addresses on their own, source and destination MAC addresses, etc.). In this way, packets with the same characteristics (e.g., packets for the same transport connection) will be directed to the same L3 gateway.

To select a gateway from the hash, some embodiments simply calculate the hash modulo the number of available tunnels. However, while this works to distribute connections equally across the various L3 gateways, all connections are affected when a gateway is added or removed from the list. Accordingly, other algorithms such as consistent hashing or highest random weight may be used to select a gateway. Both of these algorithms have the effect that, when a gateway is added or removed from the list, only a small portion of the connections will change gateways. Specifically, if the Nth gateway is added to a list, then 1/N of the connections from each of the N−1 previously existing gateways will be moved to the new gateway, on average. Similarly, when a gateway is removed from the list, then the connections previously sent to that gateway will be distributed equally to the other gateways, and the other connections will not change gateways.

The flow entries generated by the logical controller at 1615, in some embodiments, do not specify the actual tunnel encapsulation. Instead, the flow entries are universal physical control plane data, and therefore specify the destination IP addresses for the tunnel encapsulation (those of the various active gateway machines) but will not have the source IP addresses for the tunnel (as these are specific to the different MFEs that receive the flow entries).

The process 1600 also generates (at 1620) flow entries (or data tuples defining flow entries) for the MFEs on the selected gateway host machines to forward packets to the L3 gateway on the host. When packets arrive at the gateway host via a tunnel from a MFE at another host machine, the packet is initially processed by the MFE at the gateway host. The flow entries generated at 740 specify that if the logical context appended to the packet indicates that the packet has been logically routed by the L3 processing pipeline to the logical router port that attaches to the external network, then the packet should be sent to the namespace or other container on the gateway machine that implements the L3 gateway of the logical router. In addition, the network controller generates other flow entries for the MFEs at the gateways, including entries for receiving packets from the external network (after these packets go through the L3 gateway), and performing first-hop processing on such packets in order to identify a destination MFE (to which the destination VM of the packet attaches). These may overlap, at the universal physical control plane level, with some of the flow entries generated for the MFEs at the VM host machines.

In addition to the flow entries (or data tuples defining the flow entries), the process 1600 also generates (at 1625) data tuples for the routing table of the logical router. As indicated above, in some embodiments the data tuples are generated by a table mapping engine, while other embodiments may also utilize a separate route processor. As indicated above, in the distributed logical router case, much of the routing table is implemented as flow entries sent to the MFEs. However, the routing table of the logical router still handles packets being routed to and from the external networks. Accordingly, the routing table (and additional aspects of the IP network stack implemented by the L3 gateway) is responsible for performing any necessary ARP into the external networks as well as decrementing the packet TTL (i.e., as another hop for the packet). In addition, the L3 gateway may perform NAT and reverse NAT for packets to and from the external networks, in which case the controller generates the data tuples to define a NAT table as well.

Lastly, the process distributes (at 1630) the generated data to the host machines. In some embodiments, the two types of data (flow entries and routing table data tuples) are distributed via different protocols. Some embodiments distribute the flow entries to both the VM hosts and the gateway hosts via a first protocol such as OpenFlow, while distributing the routing table to the gateway hosts via a second protocol such as OVSDB. The OVSDB protocol used in some embodiments also carries configuration information for the MFEs (for both the VM hosts and the gateway hosts), in addition to the routing table data tuples.

B. Packet Processing to Multiple Active L3 Gateways

The above section describes the network controller functionality for managing and provisioning the various elements that implement the logical network (MFEs, L3 gateways in namespaces, etc.). Once these elements have been provisioned, the physical infrastructure implementing the logical network can send packets to the L3 gateways (as well as forwarding the other traffic).

Figure 18:
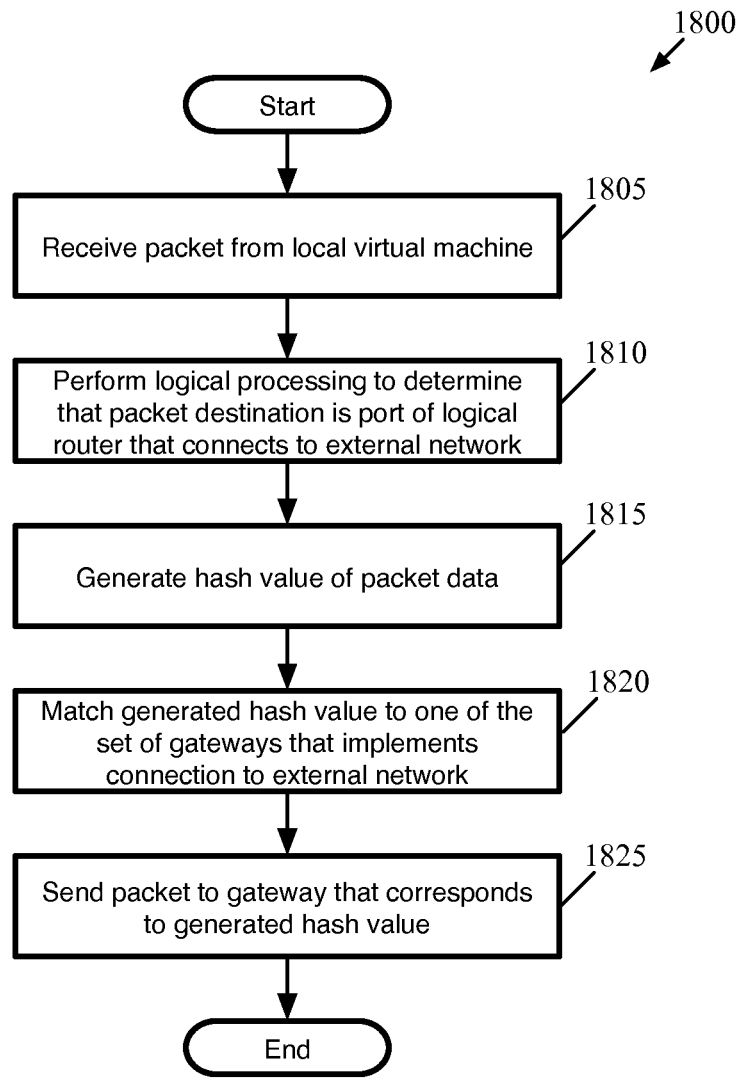
FIG. 18 conceptually illustrates a process of some embodiments for sending a packet to a gateway host machine that hosts a L3 gateway for a logical network.

FIG. 18 conceptually illustrates a process 1800 of some embodiments for sending a packet to a gateway host machine that hosts a L3 gateway for a logical network. The process 1800 is performed by a managed forwarding element to which a VM attaches, in some embodiments, when the VM sends a packet with a destination external to the managed network. In some embodiments, the process 1800 is not a process embedded in code, but rather represents the actions performed by the MFE according to a set of flow entries stored in the MFE that the packet matches in sequence. The subsequent FIG. 19 conceptually illustrates the repeated resubmission of a packet to such an MFE and the flow entries that the MFE utilizes in processing the packet.

As shown, the process 1800 begins by receiving (at 1805) a packet from a local virtual machine (i.e., a VM that attaches to a port of the MFE, such as through a virtual NIC of the VM). This packet from the VM will have source and destination MAC and IP addresses, in some embodiments. The source addresses are those of the VM from which the MFE receives the packet. The destination IP address is that of the desired destination machine for the packet (or, at least the public IP of the destination machine, if network address translation is used for the destination machine). The destination MAC address may be that of the destination machine if the destination is a VM on the same logical switch as the source, or the MAC address of the logical router interface with the logical switch if the destination is not on the same logical switch of the source VM. As the packet in this case is destined for an external destination accessible through the logical router, the latter applies.

The process 1800 then performs (at 1810) L2 and L3 logical processing on the received packet to determine that the packet destination is the port of the logical router that connects to the external network. As described in more detail by reference to FIG. 15 below, this processing involves (in addition to possibly performing various ingress and egress ACL operations) two separate logical forwarding operations. First, the MFE performs logical switching based on the packet's destination MAC address to identify the logical egress port of the logical switch as the port that interfaces with the logical router. Then, because the logical router is distributed, the MFE performs logical routing based on the packet's destination IP address (possibly using a default route) to identify the logical egress port of the logical router as the port that interfaces with the external network, and stores this context with the packet.

At this point, because the packet is to be sent to the external network, the MFE needs to send the packet through a tunnel to one of the gateway host machines that implements the L3 gateway physical connection to the external network. Thus, the process generates (at 1815) a hash value from the packet data using a hash function. This hash value may be the result of a non-cryptographic hash function such as a Jenkins Hash or MurmurHash hash, or the result of a cryptographic hash function such as MD5. As mentioned, various different embodiments may use different packet characteristics as inputs to the hash function. For example, some embodiments use a connection-specific hash that takes as input the source IP address, source transport port number, destination IP address, destination transport port number, and transport protocol (the connection 5-tuple). Other embodiments use the source MAC address, either on its own or in combination with other packet characteristics. Still other embodiments use a hash algorithm that reuses a hash that has to be precalculated by the physical NIC of the VM host machine on which the MFE operates.

With the hash value generated, the process 1800 matches (at 1820) the generated hash value to one of the set of gateways that implements the connection to the external network (i.e., the multiple active L3 gateways). Specifically, in some embodiments the flow entry utilized by the MFE identifies how to select one of several tunnel encapsulations for sending the packet to the L3 gateways. Different embodiments use different algorithms to choose which of the tunnels to use for encapsulating the packet. As indicated above, some embodiments use the hash value modulo the number of gateways. However, while this works to distribute connections equally across the various L3 gateways, all connections are affected when the MFE receives a new flow entry that adds or removes one of the tunnels from the list, or the MFE detects that one of the gateway host machines has become inactive. Accordingly, other algorithms such as consistent hashing or highest random weight may be used to select a tunnel. Both of these algorithms have the effect that, when a gateway is added or removed from the list, only a small portion of the connections will change gateways. Specifically, if the Nth gateway is added to a list, then 1/N of the connections from each of the N−1 previously existing gateways will be moved to the new gateway, on average. Similarly, when a gateway is removed from the list, then the connections previously sent to that gateway will be distributed equally to the other gateways, and the other connections will not change gateways.

With one of the active L3 gateways selected, the process sends (at 1825) the packet to the selected L3 gateway. In some embodiments, this involves encapsulating the packet in a tunnel to the MFE at the gateway host that hosts the selected L3 gateway (i.e., the selected tunnel encapsulation). After sending the packet, the process ends.

Figure 19:
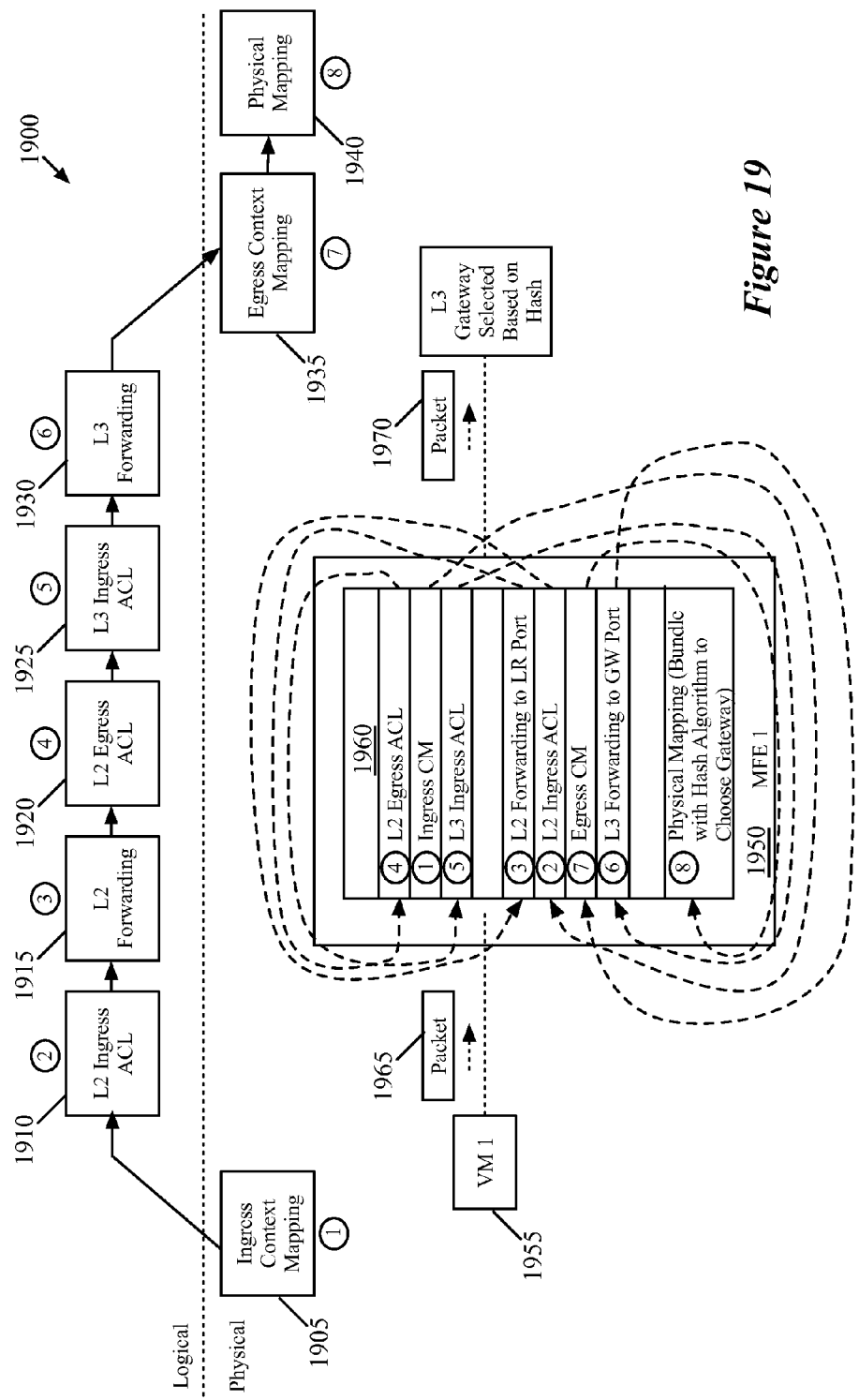
FIG. 19 conceptually illustrates a logical processing pipeline implemented by a managed forwarding element to process a packet sent from a VM attached to the MFE in a host to a L3 gateway.

FIG. 19 conceptually illustrates a logical processing pipeline 1900 implemented by a managed forwarding element 1950 to process a packet sent from a VM 1955 attached to the MFE in a host. The packet in this case is directed to a destination that is not on the same logical switch as the VM 1955, and therefore requires for the packet to be processed by a logical router. The logical router is implemented in a distributed fashion by the MFEs, with several L3 gateways operating in namespaces (or other containers) on different gateway host machines implementing the connection to external networks. In this case, the several L3 gateways can be accessed in an ECMP-like manner for packets sent from VMs in the managed network to destination in the logical network. As an example, the MFE 420 might correspond to the MFE 1950 for a packet sent by VM1 of the logical network 100 to a destination accessible through the external network 120. The logical processing pipeline 1900 includes various operations, each of which is performed according to one or more flow entries stored in the logical forwarding tables of the MFE 1950.

As in FIGS. 13 and 15 from the previous Section II, the MFE 1950 and other MFEs in the managed network implement the logical network using flow entries that define actions to be taken on packets, conditions under which to take those actions, and priorities of the flow entry. This figure illustrates a portion of the logical forwarding tables 1960 stored by the MFE 1950—specifically, the portion of the tables that implements the L2 pipeline for the logical switch to which the VM 1955 attaches and the L3 pipeline for the logical router to which that logical switch attaches.

In the illustrated example, the MFE 1950 repeatedly resubmits the packet 1965 to the forwarding table 1960 in order to implement the logical processing pipeline 1900. The resubmission process is conceptually illustrated by the dashed arrows leading from the right (outbound) side of the forwarding table to the left (inbound) side of the table. Though shown as a single table 1960, in some embodiments the MFE stores numerous different forwarding tables against which packets are submitted. For example, some embodiments store different forwarding tables for different logical forwarding elements, and only submit packets against the table for a currently identified logical forwarding element (e.g., the L2 pipeline and the L3 pipeline might be stored in separate forwarding tables of the MFE 1950).

Initially, the MFE 1950 receives the packet 1965 from the VM 1955 at a physical ingress port. In some embodiments, this physical ingress port is a virtual interface between the VM as implemented on a host machine and the MFE on the same host. In some embodiments, the MFE 1950 stores an identifier for this physical ingress port in a register associated with the packet 1965. The MFE then begins processing the packet by attempting to match the packet's characteristics to conditions of the flow entries in the table 1960.

In this example, the first seven operations 1905-1935 of the logical processing pipeline 1900 are the same as those in the previous example of FIG. 15, as both of these examples use distributed logical router implementations. Specifically, the MFE 1950 performs ingress context mapping to map the physical ingress port (e.g., the interface with the VM 1955) to a logical ingress port of a particular logical switch, L2 ingress ACL, L2 forwarding to identify the logical switch port that interfaces with the logical router as the egress port for the particular logical switch, L2 egress ACL, L3 ingress ACL, L3 forwarding to identify the logical router port that interfaces with the external network as the egress port for the logical router (and, in some embodiments, modify the source and destination MAC addresses), and egress context mapping to map this logical egress port to a physical destination (e.g., the gateway host at which the L3 gateway is implemented).

At this point, the fact that the L3 gateway is actually implemented in a high-availability multiple-active configuration at multiple gateway hosts does not yet come into play. As shown, in this example the MFE does not perform L3 egress ACL for packets sent to the L3 gateway. In some embodiments, the L3 egress ACL is performed by the MFE located at the gateway host before handing the packet off to the L3 gateway.

After resubmitting the packet, the MFE identifies a flow entry 8 that implements a physical mapping operation 1940. In some embodiments, this flow entry specifies how to encapsulate the packet in a tunnel to the physical destination identified by the flow entry 7 (and, e.g., stored in a register before resubmission). This flow entry, in some embodiments, incorporates the multiple-active high-availability configuration of the L3 gateway. Specifically, the flow entry 8 for the physical mapping operation 1940 specifies a set of equally-preferred (i.e., non-prioritized) tunnel encapsulations to use based on the outcome of an equal-distribution algorithm.

In some embodiments, the flow entry specifies (i) a hash function to use in calculating a hash value, and (ii) a technique for matching that hash value up with one of the equally-preferred tunnel encapsulations (each of which corresponds to one of the L3 gateway implementations for the logical router connection to the external network). This hash function may be a non-cryptographic hash function such as a Jenkins Hash or MurmurHash hash or a cryptographic hash function such as MD5. As mentioned above, various different embodiments may use different packet characteristics as inputs to the hash function. For example, some embodiments use a connection-specific hash that takes as input the source IP address, source transport port number, destination IP address, destination transport port number, and transport protocol (the connection 5-tuple). Other embodiments use the source MAC address, either on its own or in combination with other packet characteristics. Still other embodiments use a hash algorithm that reuses a hash that has to be precalculated by the physical NIC of the VM host machine on which the MFE operates.

The technique for matching the hash value with one of the tunnel encapsulations to the different L3 gateways may be one of several different algorithms. indicated above, some embodiments use the hash value modulo the number of gateways. However, while this works to distribute connections equally across the various L3 gateways, all connections are affected when the MFE receives a new flow entry that adds or removes one of the tunnels from the list, or the MFE detects that one of the gateway host machines has become inactive. Accordingly, other algorithms such as consistent hashing or highest random weight may be used to select a tunnel. Both of these algorithms have the effect that, when a tunnel encapsulation to a gateway is added or removed from the list, only a small portion of the connections will change gateways. Specifically, if the Nth encapsulation is added to the list, then 1/N of the connections that use each of the N−1 encapsulations to previously existing gateways will be moved to the new gateway, on average. Similarly, when an encapsulation is removed from the list, then the connections previously sent using that tunnel encapsulation to its gateway will be distributed equally to the other gateways, and the other connections will not change encapsulations.

When encapsulating the packet for the selected tunnel, in some embodiments the MFE adds the tunnel endpoint addresses (e.g., MAC and IP addresses) as well as the logical context (i.e., identifying the gateway port of the logical router as the packet destination). The MFE then sends the encapsulated packet 1970 out of the host through a physical NIC of the host.

Upon arrival at the selected gateway host machine, the packet is processed by the MFE operating at the gateway. This MFE reads the logical context stored on the packet identifying the L3 gateway port of the logical router as the packet's logical egress port. Based on this identification, a first flow entry at the MFE performs the L3 egress ACL operation in some embodiments. A second flow entry (or set of flow entries) specifies to forward the packet to the container (e.g., a namespace) implementing the L3 gateway. At this point, the routing table stored in the namespace performs routing to the appropriate physical router of the external network. In order to send the packet out to the destination in the external network, in some embodiments the namespace sends the packet back to the MFE, which subsequently sends the packet out one of the physical NICs without additional processing. In other embodiments, the namespace has a direct connection to the physical NIC(s), and sends the packet directly out through a physical NIC of the gateway into the external network, without returning the packet to the MFE. Whereas the L3 gateway (or centralized logical router) described in Section II above performed NAT in some cases, some embodiments do not allow network address translation when using the L3 gateways in the multiple-active configuration. This is because the same VM may send packets through different gateways for different connections (and different remote destinations may receive packets through different gateways), such that the same VM could end up using multiple different public IPs at once.

Figure 20:
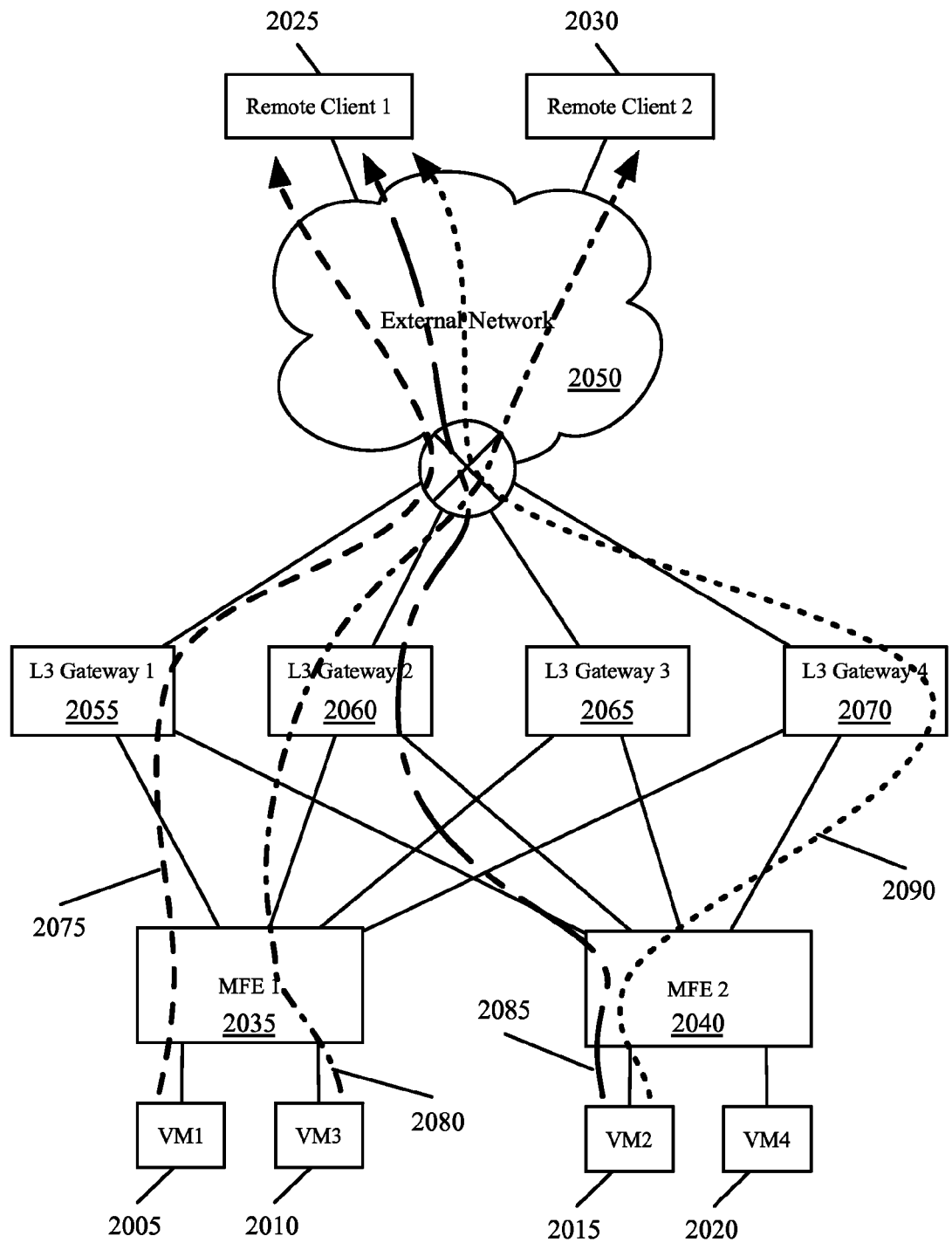
FIG. 20 conceptually illustrates several connections between VMs of a managed network and remote clients.

FIG. 20 conceptually illustrates several connections between VMs 2005-2020 of a managed network and remote clients 2025 and 2030. In the managed network, VMs 2005 and 2010 attach to a first MFE 2035 and VMs 2015 and 2020 attach to a second MFE 2040. Each of the MFEs 2035 and 2040 operates in a host machine along with their respective attached VMs. The MFEs send packets to the remote clients through four equally-preferred (equal-cost) L3 gateways 2055-2070 that interface with a physical router 2045 as access to an external network 2050. In some embodiments, each of the L3 gateways operates in a container in a gateway host, along with an MFE. In this case, all of the L3 gateways 2005-2020 send packets to the same physical router 2045 in the external network 2050, though in some embodiments multiple physical routers may connect to the gateways.

In FIG. 20, different types of dashed lines represent different connections 2075-2090 between the VMs 2005-2015 and the remote clients 2025 and 2030. Specifically, a first connection 2075 between the VM 2005 and the remote client 2025 is sent through the first L3 gateway 2055, a second connection 2080 between the VM 2010 and the remote client 2030 is sent through the second L3 gateway 2055, a third connection 2085 between the VM 2015 and the remote client 2025 is sent through the second L3 gateway 2060, and a fourth connection 2090 between the VM 2015 and the remote client 2025 is sent through the fourth L3 gateway 2070. As this demonstrates, due to the nature of the hash function, any two connections may be sent through the same implementation of the L3 gateway. Furthermore, the third and fourth connections 2085 and 2090, which have the same endpoints (and thus the same IP addresses), are sent by the MFE 2040 to two different gateways. Despite having the same IP addresses, these two connections will have different source and destination transport port numbers, and could even have two different transport layer protocols (e.g., TCP and UDP). While this example illustrates two remote clients, in some cases hundreds or even thousands of clients from an external network may send requests to a set of VMs (e.g., a set of VMs operating a web server).

IV. Gateway Host Architecture

The above sections described in detail the generation of logical router information data by a controller, the distribution of that data to the host machines on which the logical routers or L3 gateways reside, and the processing of outgoing packets by the MFEs, centralized logical routers, and L3 gateways. In some embodiments, the gateway host machines include various modules (e.g., running as daemons or kernel modules) that are responsible for creating the namespaces, building routing tables in the namespace, and processing packets to and from the namespaces, based on the data tuples distributed by the network control system.

Figure 21:
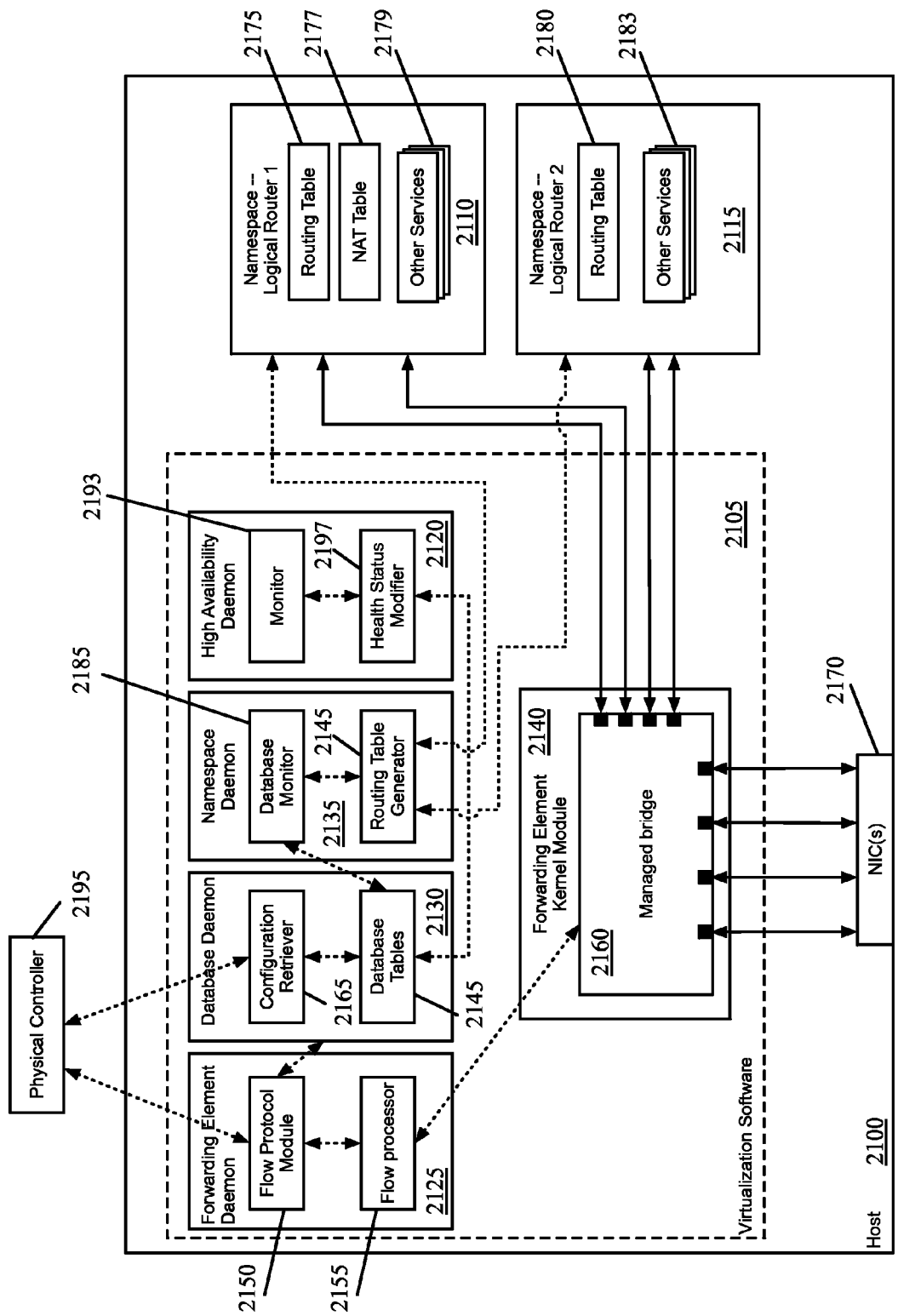
FIG. 21 conceptually illustrates a software architecture of some embodiments for a gateway host machine.

FIG. 21 conceptually illustrates a software architecture of some embodiments for a gateway host machine 2100. The host machine 2100 is a host designated for hosting centralized logical router and L3 gateway implementations within namespaces. As shown, the host 2100 includes virtualization software 2105 and two namespaces 2110 and 2115. In some embodiments, the host includes a base Linux operating system on which the namespaces 2110 and 2115 run as containers.

The virtualization software 2105 includes a forwarding element daemon 2125, a database daemon 2130, a namespace daemon 2135, a high availability daemon 2120, and a forwarding element kernel module 2140. In some embodiments, the forwarding element daemon 2125, the database daemon 2130, the namespace daemon 2135, and the high availability daemon 2120 operate in the user space of virtualization software 2105, while the forwarding element kernel module 2140 operates in the kernel of the virtualization software 2105. In some embodiments, the forwarding used on the host is Open VSwitch (OVS), and these modules are the OVS daemon, OVS DB daemon, and OVS kernel module, in addition to the namespace daemon and the high availability daemon. In some embodiments, the functionalities of the namespace daemon 2135 and the high availability daemon 2120 are combined into a single user space application. This figure illustrates both control path connections (shown as dashed lines) for provisioning the managed forwarding element and the namespaces, as well as data path connections (shown as solid lines) for sending data packets. One of ordinary skill in the art will recognize that, in addition to the modules shown, which relate to the virtual switch and hosted namespaces, the virtualization software of some embodiments includes additional modules for performing, e.g., virtualization of the hardware resources (e.g., processors, memory, etc.) of the host machine 2100.

The forwarding element daemon 2125 is an application that communicates with a physical network controller 2195 in some embodiments in order to receive instructions for processing and forwarding packets sent to and from the namespaces 2110 and 2115. Specifically, as described in the previous section, the forwarding element daemon 2125 receives physical control plane flow entries from the physical controller 2195. The forwarding element daemon, in some embodiments, communicates with the network controller through the OpenFlow protocol, though other embodiments may use different communication protocols for transferring the forwarding data. Additionally, in some embodiments the forwarding element daemon 2125 retrieves configuration information from the database daemon 2130 after the physical controller 2195 transmits the configuration information to the database daemon.

The forwarding element daemon 2125 of some embodiments includes a flow protocol module 2150 and a flow processor 2155. The flow protocol module 2150 handles the communication with the network controller 2195 in order to receive physical control plane information (e.g., flow entries) for the managed forwarding element. As mentioned, in some embodiments this communication uses the OpenFlow protocol. When the flow protocol module 2150 receives this physical control plane information, it translates the received information into data understandable by the flow processor 2155 (e.g., physical forwarding plane information useable for processing packets).

The flow processor 2155 manages the rules for processing and forwarding (i.e., switching, routing) packets in some embodiments. For instance, the flow processor 2155 stores rules (e.g., in a machine readable storage medium, such as a disk drive) received from the flow protocol module 2150. In some embodiments, the rules are stored as a set of flow tables (forwarding tables) that each includes a set of flow entries. These flow entries, in some embodiments, include a match (i.e., a set of packet characteristics) and one or more actions (i.e., a set of actions to take on packets that match the set of characteristics). In some embodiments, the flow processor 2125 handles packets for which the managed bridge 2160 (described below) does not have a matching rule. In such cases, the flow processor 2155 matches the packets against its stored rules. When a packet matches a rule, the flow processor 2125 sends the matched rule and the packet to the managed bridge 2160 for the managed bridge to process. This way, when the managed bridge 2160 subsequently receives a similar packet that matches the generated rule, the packet will be matched against the generated exact match rule in the managed bridge and the flow processor 2155 will not have to process the packet.

In some embodiments, the database daemon 2130 is an application that also communicates with the physical controller 2195 in order to configure the managed forwarding element (e.g., the forwarding element daemon 2125 and/or the forwarding element kernel module 2140). For instance, the database daemon 2130 receives configuration information from the physical controller and stores the configuration information in a set of database tables 2145. This configuration information may include tunnel information for creating tunnels to other managed forwarding elements, port information, etc. In some embodiments, the database daemon 2130 communicates with the network controller 2195 through a database communication protocol (e.g., OVSDB). In some cases, the database daemon 2130 may receive requests for configuration information from the forwarding element daemon 2125. The database daemon 2130, in these cases, retrieves the requested configuration information (e.g., from its set of database tables 2145) and sends the configuration information to the forwarding element daemon 2125.

As shown, the database daemon 2130 includes a configuration retriever 2165 and a set of database tables 2145 (which may be stored, e.g., on a hard drive or other storage of the host 2100). The configuration retriever 2165 is responsible for communications with the physical controller 2195. In some embodiments, the configuration retriever receives the configuration information for the managed forwarding element from the controller. In addition, the configuration retriever in some embodiments receives the data tuples for configuring the namespaces 2110 and 2115, and any routing tables, NAT tables, or other services provided by the namespaces. The configuration retriever 2165 also converts these data tuples into database table records to store in the database tables 2145 in some embodiments.

Specifically, the database tables 2145 of some embodiments include a container table, with each record in the database defining a different namespace (or other container) on the host machine. Thus, for the host 2100, the container table would include a row for each of the two namespaces 2110 and 2115. In addition, for each namespace, the database tables store information defining the routing table (e.g., a default route, any additional routes defined for the connected logical switches, and any user-defined static routes). If the router performs NAT, then the database also stores the NAT rules (source NAT and/or destination NAT) for the logical router). Furthermore, for each namespace, the database stores a list of the logical router ports, with IP address, MAC address, netmask, etc. for each port.

The forwarding element kernel module 2140 processes and forwards network data (e.g., packets) between the namespaces running on the host 2100 and network hosts external to the host 2100 (e.g., network data received through the NIC 2170). In some embodiments, the forwarding element kernel module 2140 implements the forwarding tables of the physical control plane for one or more logical networks (specifically, the logical networks to which the namespaces 2110 and 2115 belong). To facilitate the processing of network data, the forwarding element kernel module 2140 communicates with forwarding element daemon 2125 (e.g., to receive flow entries from the flow processor 2155).

FIG. 21 illustrates that the forwarding element kernel module 2140 includes a managed bridge 2160. In addition, in some embodiments, the virtual switch kernel module may include additional bridges, such as physical interface (PIF) bridges. Some embodiments include a PIF bridge for each NIC 2170 in the host machine's hardware. In this case, in some embodiments a PIF bridge is located between the managed bridge 2160 and the NIC 2170.

The managed bridge 2160 of some embodiments performs the actual processing and forwarding of the packets between the namespaces 2110 and 2115 and the VMs and other hosts that communicate with the namespaces. Packets are received at the managed bridge 2160 from the external sources (e.g., the MFEs at the VM hosts) through tunnel ports, such that packets arriving over different tunnels are received at different interfaces of the bridge 2160. Based on the destination logical port appended to the packet (or other information, such as a destination MAC or IP address, etc.), the managed bridge 2160 sends the packet to the appropriate namespace through its interface(s) with the namespace. Similarly, the managed bridge receives packets from the namespaces 2110 and 2115, and processes and forwards these packets using the interface through which the packets are received and destination addresses of the packets. In some embodiments, to process the packets, the managed bridge 2160 stores a subset of the rules stored in the flow processor 2155 (and/or rules derived from rules stored in the flow processor 2155) that are in current or recent use for processing the packets. The managed bridge 2160, in this figure, includes two interfaces to each of the namespaces 2110 and 2115. In some embodiments, when the namespace implements a centralized logical router, the managed bridge includes a separate interface for each logical port of the logical router. Thus, the managed bridge may send a packet to the namespace through one of its interfaces, and after routing by the namespace routing table, the managed bridge receives the packet back through a different interface. On the other hand, in the distributed case where the namespace only implements a L3 gateway, some embodiments only have a single interface to the namespace.

Although FIG. 21 illustrates one managed bridge, the virtual switch kernel module 2140 may include multiple managed bridges. For instance, in some embodiments, the virtual switch kernel module 2140 includes a separate bridge for each logical network that is implemented within the host machine 2100, or for each namespace residing in the host (which will often be the same as each logical network).

Each of the namespaces 2110 and 2115 implements a different logical router or L3 gateway. The namespaces may be an active or a standby implementation of their logical router, although in some embodiments the namespace is not aware of its status as active or standby (i.e., the namespace is provisioned in the same manner whether it is active or standby. As described below, the tunnels on the VM hosts are bundled such that packets will always be sent to the active logical router or L3 gateway implementation. As such, the standby implementations operate as though active, but should not receive traffic unless the gateway hosting its active implementation fails. As indicated in this figure, different namespaces implementing different logical routers or L3 gateways for different logical networks (or for the same logical network) may reside on the same host 2100 in some embodiments. A single host machine can host a first namespace with a logical router and a second namespace with an L3 gateway, a first namespace with an active logical router (or L3 gateway) and a second namespace with a standby logical router (or L3 gateway), a first namespace with a logical router that is part of an active-standby pair and a second namespace with a L3 gateway that is one of several active L3 gateways for a particular logical router, or combinations thereof.

In some embodiments, the namespace may provide multiple services. In this case, the first namespace 2110 includes a routing table 2175, a NAT table 2177, as well as other services 2179. For instance, the other services running on the namespace might provide ARP functionality, or other features associated with a router. In addition, in some embodiments, the namespaces may provide other services for the logical network. The second namespace 2115 only provides a routing table 2180 and other services 2183, without any NAT. As mentioned, some embodiments do not allow the logical routers to use network address translation in the multiple-active L3 gateways configuration.

The namespace daemon 2135 of some embodiments manages the namespaces 2110 and 2115 residing on the host 2100 and the services running in those namespaces (e.g., logical router and L3 gateway service). As shown, the namespace daemon 2135 includes a database monitor 2185 and a routing table generator 2190. In addition, some embodiments include configuration generators or similar modules for other services (e.g., a NAT table generator, configuration generators for DHCP and other services that may be provided in the namespaces).

The database monitor 2185 listens on the database tables 2145 for changes to specific tables that affect the namespaces implementing logical routers. These changes may include the creation of a new namespace, removal of a namespace, modifying the routing table within a namespace, attaching new logical switches to a logical router, etc. When the database monitor 2185 detects a change that affects the namespaces, it either causes the namespace daemon to create a new namespace on the host for a new logical router, instantiate a new process in an existing namespace (e.g., for a newly enabled service), or generate/modify the routing table or other configuration data for a namespace.

When the database monitor 2185 detects new routing table data (either a modification to an existing routing table or a new routing table), the database monitor 2185 provides this data to the routing table generator 2190 (or instructs the routing table generator 2190 to retrieve the new data from the database tables #2845). The routing table generator uses the data tuples stored in the database tables 2145 to build a routing table in the namespace for which the routing table is defined (e.g., as part of a Linux IP stack).

The high availability daemon 2120 monitors the health of the gateway host 2100 and/or the namespaces 2110 and 2115 operating on the host 2100. This daemon is responsible for reporting to the controller when the gateway host 2100 is no longer healthy and should be taken out of use, thereby allowing the controller to modify the bundle flow entries used for tunnel encapsulation at the VM hosts that send packets to the logical routers and L3 gateways implemented on the gateway host 2100.

The high availability daemon 2120 includes a monitor 2193 and a health status modifier 2197 in some embodiments. The monitor 2193 of some embodiments monitors various aspects of the gateway host machine 2100 to determine whether the machine should remain in use or be taken out of use for hosting logical routers and L3 gateways (as well as other services for logical networks). The monitor 2193 may monitor the underlying hardware resources (e.g., processors, memory, etc.) to ensure that these resources are functioning well enough to provide the logical routing services at necessary speeds. In addition, the monitor 2193 ensures that connections to the other host machines (e.g., the VM hosts that send traffic to the gateway host) are functioning properly. Some embodiments monitor the connections by monitoring the physical NICs, and monitoring whether packets are received from these hosts. In addition, the monitor 2193 of some embodiments monitors the software operating on the host. For instance, the monitor checks on the other modules of the virtualization software 2105 and the namespaces 2110 and 2115 to ensure that they have not crashed or otherwise failed. In addition, in some embodiments the high availability daemon 2120 uses BFD to monitor upstream routers (e.g., routers external to the managed network) directly.

When the monitor 2193 determines that the gateway host 2100 should be taken out of use for any reason, the high availability daemon 2120 notifies the physical controller 2195 that manages the gateway host machine 2100. To notify the controller, in some embodiments the health status modifier 2197 modifies the database tables 2145 with information that the database daemon 2165 (e.g., via the configuration retriever 2165) propagates up to the controller 2195. In some embodiments, the health status modifier 2197 modifies a table that includes a health variable for the gateway host 2100 to indicate that the gateway should be inactive. In some embodiments, the health status modifier 2197 modifies a row in the tables 2145 created for each namespace to indicate that the namespace should be considered inactive. When a single namespace crashes, the health status modifier 2197 only modifies the data for the crashed namespace.

The configuration retriever 2165, in some embodiments, detects that the database tables 2145 have been modified and sends updated data tuples to the physical controller 2195. When the controller 2195 receives such an indication, the controller identifies the logical controllers with affected logical routers, enabling these controllers to (i) assign the logical routers or L3 gateways to new gateway hosts, and (ii) generate new flow entries for the MFE hosts that send packets to the logical routers and L3 gateways.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
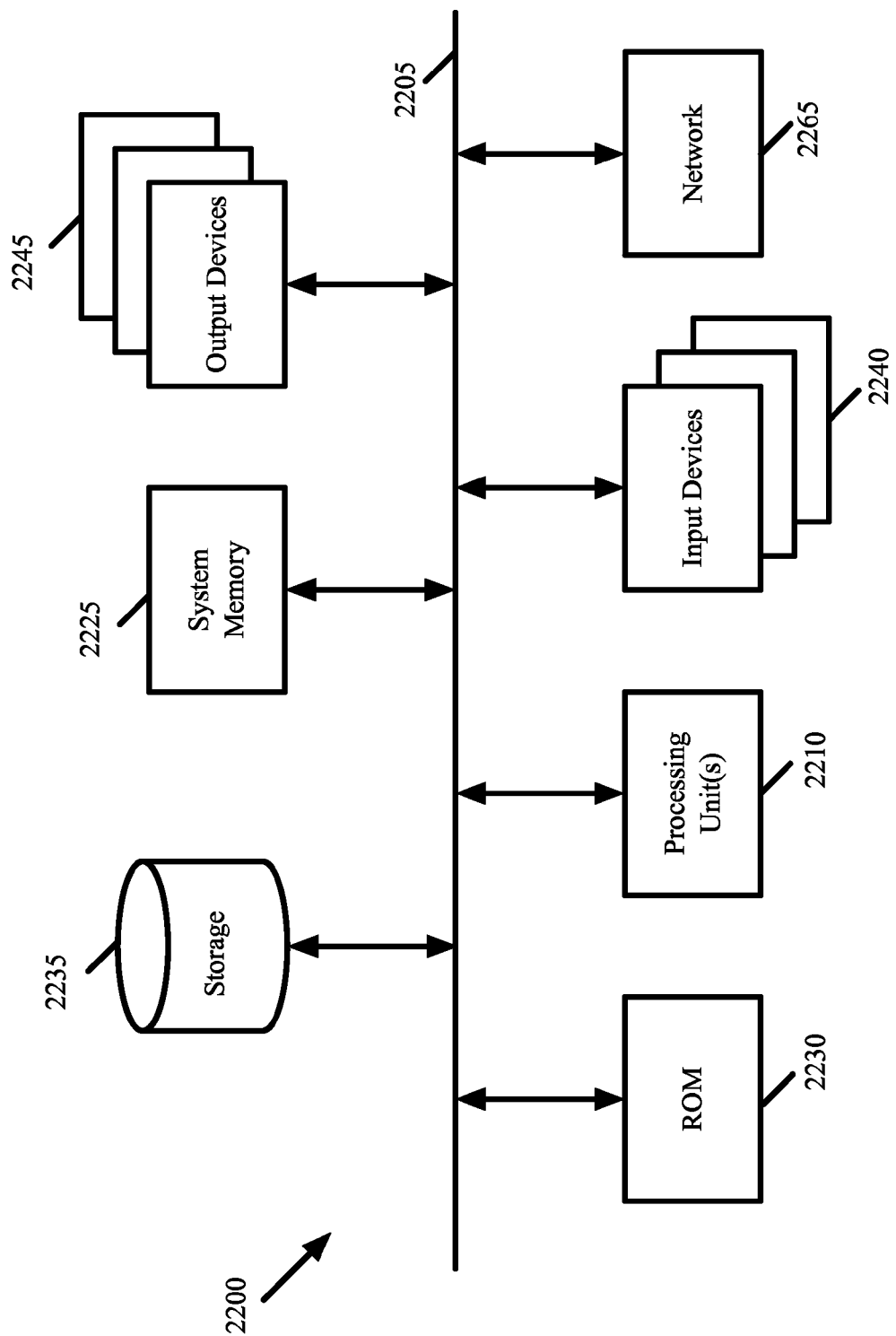
FIG. 22 conceptually illustrates an electronic system with which some embodiments of the invention are implemented.

FIG. 22 conceptually illustrates an electronic system 2200 with which some embodiments of the invention are implemented. The electronic system 2200 can be used to execute any of the control, virtualization, or operating system applications described above. The electronic system 2200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the system memory 2225, and the permanent storage device 2235.

From these various memory units, the processing unit(s) 2210 retrieve instructions to execute and data to process in order to execute the processes of the invention. The processing unit(s) may be a single processor or a multi-core processor in different embodiments.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, etc.) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieve instructions to execute and data to process in order to execute the processes of some embodiments.

The bus 2205 also connects to the input and output devices 2240 and 2245. The input devices enable the user to communicate information and select commands to the electronic system. The input devices 2240 include alphanumeric keyboards and pointing devices (also called "cursor control devices"). The output devices 2245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples electronic system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7, 10, 12, 11, 16, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller in a network control system that manages a plurality of logical networks, a method comprising:
   receiving a specification of a logical network that comprises a logical router, the logical network comprising a plurality of end machines that operate on a first plurality of host machines;
   selecting a second plurality of host machines to host a L3 gateway that implements a connection to an external network for the logical router, the second plurality of host machines selected from a set of host machines designated for hosting logical routers; and
   generating data tuples for provisioning a set of managed forwarding elements operating on the first plurality of host machines that implement the logical network to send data packets, originating at the end machines of the logical network and which require processing by the L3 gateway, to the second plurality of selected host machines in order for L3 gateway implemented at the selected host machines to process the packets and send the packets to the external network, wherein the data tuples specify for the managed forwarding elements to distribute the data packets across the plurality of selected host machines in a load balanced manner.

2. The method of claim 1, wherein the data tuples specify a list of the second plurality of host machines and an algorithm for the managed forwarding elements to select one of the host machines in the second plurality of host machines as a destination for a particular data packet.

3. The method of claim 2, wherein the algorithm comprises a hash function that calculates a hash value using characteristics of the particular data packet and a technique to map the calculated hash value to one of the host machines in the second plurality of host machines.

4. The method of claim 3, wherein the hash function uses a source IP address and a destination IP address as inputs.

5. The method of claim 3, wherein the technique comprises computing the hash value modulo a number of host machines in the second plurality of host machines.

6. The method of claim 3, wherein the technique comprises using a consistent hashing algorithm to select one of the host machines in the second plurality of host machines.

7. The method of claim 3, wherein the technique comprises using a highest random weight algorithm to select one of the host machines in the second plurality of host machines.

8. The method of claim 1, wherein the data tuples comprise flow entries that specify tunnel encapsulations for tunneling the data packets to the selected host machines.

9. The method of claim 1, wherein the logical network comprises at least two logical switches attached to first and second ports of the logical router, wherein the logical router comprises a third port for connecting to external networks.

10. The method of claim 1 further comprising generating data tuples for provisioning the L3 gateway on the host machines.

11. The method of claim 10 further comprising:
   distributing the generated data tuples for provisioning the L3 gateway to the selected host machines; and
   distributing the generated data tuples for provisioning the set of managed forwarding elements to the first plurality of host machines.

12. The method of claim 11, wherein distributing the generated data tuples for provisioning the L3 gateway to the selected host machines comprises:
   identifying, for each of the selected host machines, a network controller that manages the selected host machine; and
   distributing the generated data tuples for provisioning the L3 gateway to the identified network controllers for subsequent distribution to the selected host machines.

13. The method of 10 further comprising generating data tuples for provisioning managed forwarding elements that implement the logical network at the selected host machines.

14. The method of claim 13 further comprising:
   distributing the generated data tuples for provisioning the L3 gateway to the selected host machines using a first protocol; and
   distributing the generated data tuples for provisioning the managed forwarding elements at the selected host machines to the selected host machines using a second protocol different than the first protocol.

15. For a managed forwarding element that operates in a host machine to implement a logical network that includes a logical router, wherein the host machine hosts a virtual machine in the logical network, a method comprising:

receiving a packet from the virtual machine;

determining that the packet requires processing by a L3 gateway in order for the L3 gateway to forward the packet to an external network;

calculating a value based on a specified set of packet characteristics of the received packet; and selecting one of a plurality of gateway host machines as a destination for the packet based on the calculated value, the plurality of gateway machines implementing the L3 gateway that implements a connection of the logical router to the external network.

16. The method of claim 15, wherein determining that the packet requires processing by the L3 gateway comprises:

performing a logical switching operation to logically forward the packet to a logical egress port of a logical switch that interfaces with the logical router; and performing a logical routing operation to logically forward the packet to a logical egress port of the logical router that interfaces with the external network.

17. The method of claim 15 further comprising encapsulating the packet in a tunnel between the managed forwarding element and a second managed forwarding element that operates on the selected gateway host machine.

18. The method of claim 17 further comprising sending the encapsulated packet to the selected gateway host machine.

19. The method of claim 15, wherein calculating the value comprises calculating a hash function that takes a source IP address, destination IP address, source transport port number, destination transport port number, and transport protocol of the packet as inputs.

20. The method of claim 15, wherein a technique used to calculate the value and select one of the plurality of gateway host machines based on the calculated value selects the same gateway host machine for all packets for a same transport connection.

21. The method of claim 20, wherein the technique matches connections to each of the plurality of gateway host machines with an equal frequency.

\* \* \* \* \*